(12) United States Patent
Ion et al.

(10) Patent No.: US 12,511,914 B1
(45) Date of Patent: Dec. 30, 2025

(54) CAMERA ARRANGEMENTS FOR VEHICULAR OBJECT DETECTION AND AVOIDANCE

(71) Applicant: Waymo LLC, Mountain View, CA (US)

(72) Inventors: Lucian Ion, Redwood City, CA (US); Shashank Sharma, Cambridge, MA (US); Jeremy Dittmer, Fairfax Station, VA (US); Nirav Dharia, Milpitas, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 18/989,446

(22) Filed: Dec. 20, 2024

(51) Int. Cl.
| | |
|---|---|
| *G06V 20/58* | (2022.01) |
| *H04N 23/698* | (2023.01) |
| *H04N 23/73* | (2023.01) |
| *H04N 23/90* | (2023.01) |
| *G03B 11/00* | (2021.01) |

(52) U.S. Cl.
CPC ........... *G06V 20/58* (2022.01); *H04N 23/698* (2023.01); *H04N 23/73* (2023.01); *H04N 23/90* (2023.01); *G03B 11/00* (2013.01)

(58) Field of Classification Search
CPC ......... H04N 23/00; G06V 20/00; G03B 11/00
See application file for complete search history.

(56) References Cited

U.S. PATENT DOCUMENTS

| | | | |
|---|---|---|---|
| 5,809,161 A | * | 9/1998 | Auty ...................... G08G 1/054 382/104 |
| 10,331,960 B2 | | 6/2019 | Corcoran |
| 10,768,628 B2 | | 9/2020 | Martin |
| 11,288,824 B2 | | 3/2022 | Wang |
| 11,897,518 B2 | | 2/2024 | Shalev-Shwartz |

(Continued)

FOREIGN PATENT DOCUMENTS

| | | |
|---|---|---|
| EP | 3857865 A1 | 8/2021 |
| EP | 4345419 A2 | 4/2024 |

OTHER PUBLICATIONS

Madhu, Suresh. "Why multi-camera synchronization is a key feature in cameras that enable autonomous mobility." Dec. 14, 2023, retrieved from the Internet https://www.e-consystems.com/blog/camera/applications/why-multi-camera-synchronization-is-a-key-feature-in-cameras-that-enable-autonomous-mobility/#:~:text=Multi%2Dcamera%20synchronization%20creates%20a,view%20of%20the%20surrounding%20area.

*Primary Examiner* — Maryam A Nasri
(74) *Attorney, Agent, or Firm* — McDonnell Boehnen Hulbert & Berghoff LLP

(57) ABSTRACT

Example embodiments relate to camera arrangements for vehicular object detection and avoidance. An example system includes a vehicle and at least one camera of a first camera type attached to the vehicle. The system also includes a plurality of cameras of a second camera type attached to the vehicle. Further, the system includes a plurality of cameras of a third camera type attached to the vehicle. Moreover, the system includes a computing device communicatively coupled to the at least one camera of the first camera type, plurality of cameras of the second camera type, and plurality of cameras of the third camera type. The computing device is configured to identify objects located within a first range of distances from the vehicle, objects located within a second range of distances from the vehicle, and objects located within a third range of distances from the vehicle.

20 Claims, 47 Drawing Sheets

(56) References Cited

U.S. PATENT DOCUMENTS

| | | |
|---|---|---|
| 12,112,497 B2 | 10/2024 | Blau |
| 2017/0227841 A1 | 8/2017 | Niemela |
| 2018/0189574 A1* | 7/2018 | Brueckner ............. H04N 19/10 |
| 2018/0288320 A1 | 10/2018 | Melick |
| 2020/0189567 A1* | 6/2020 | Silver ................. B60W 40/068 |
| 2020/0192403 A1* | 6/2020 | Silver ................... G01S 13/862 |
| 2020/0257306 A1 | 8/2020 | Nisenzon |
| 2020/0372267 A1 | 11/2020 | Corcoran |
| 2022/0381898 A1 | 12/2022 | Zhang |
| 2023/0064179 A1* | 3/2023 | Dong ................ B60W 60/0025 |
| 2023/0165181 A1 | 6/2023 | Scheiner |
| 2023/0379593 A1 | 11/2023 | Nie |

\* cited by examiner

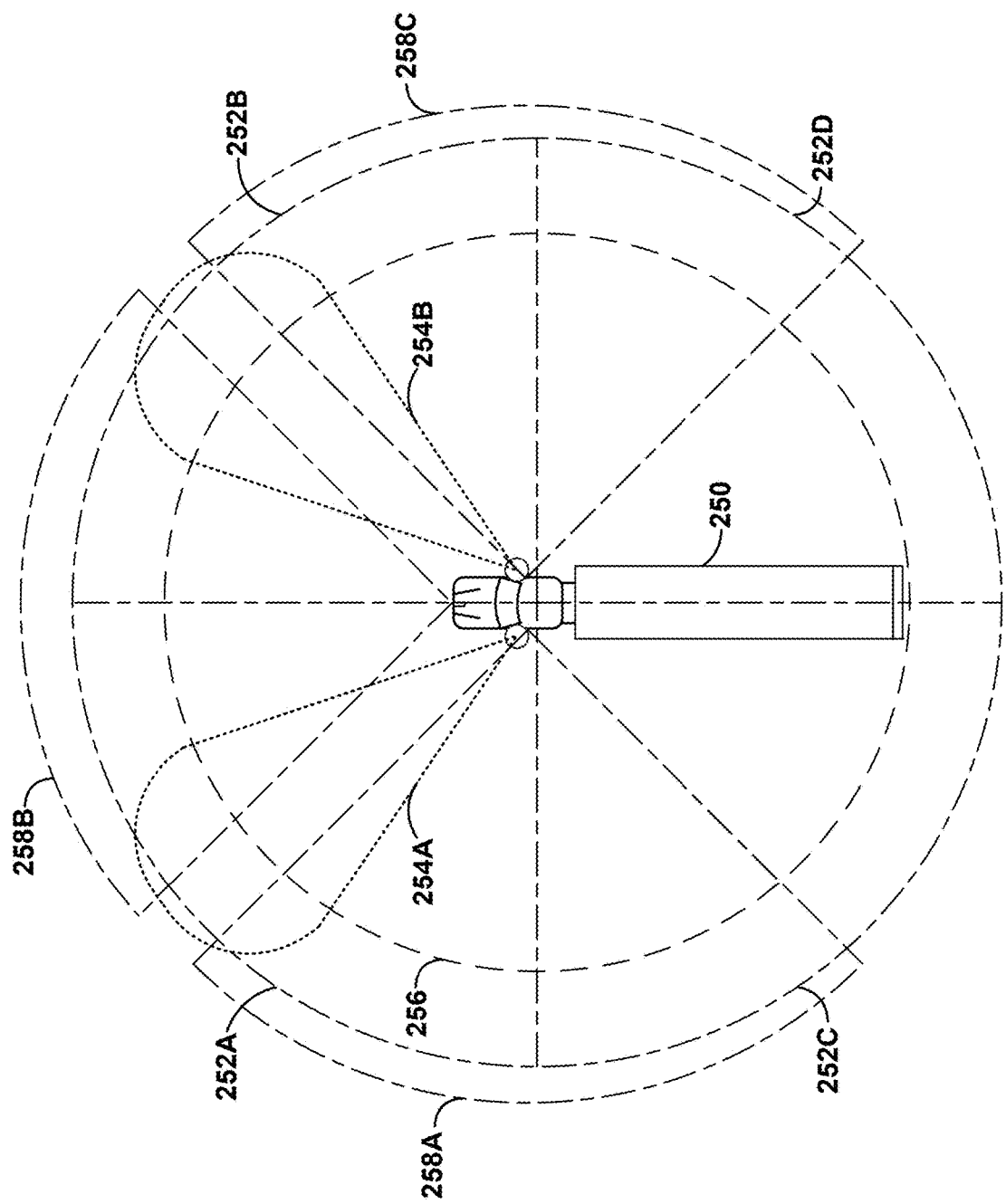

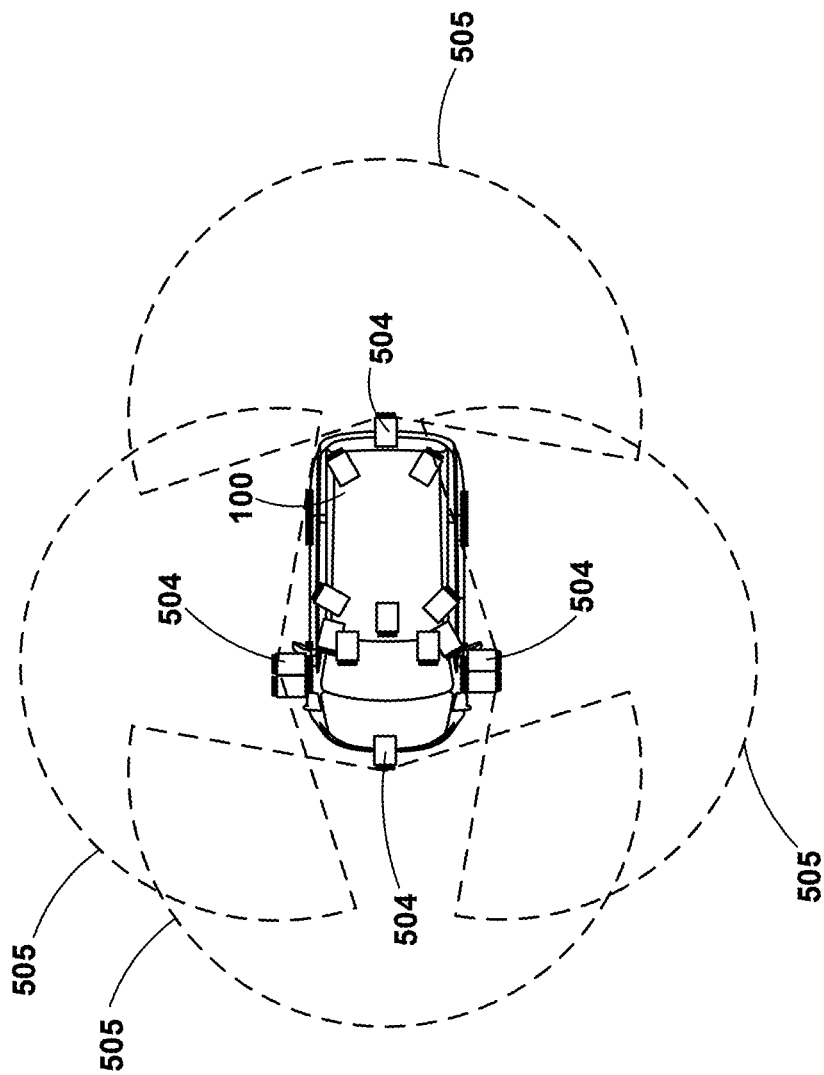
FIG. 11C
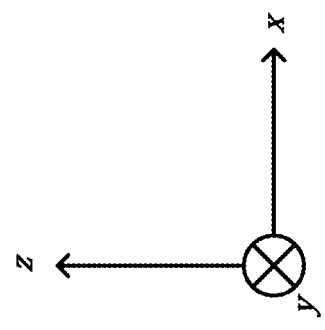

CAMERA ARRANGEMENTS FOR VEHICULAR OBJECT DETECTION AND AVOIDANCE

BACKGROUND

Unless otherwise indicated herein, the description in this section is not prior art to the claims in this application and is not admitted to be prior art by inclusion in this section.

Cameras and image sensors are devices that can be used to capture images of a scene. Some cameras (e.g., film cameras) chemically capture an image on film. Other cameras (e.g., digital cameras) electrically capture image data (e.g., using a charge-coupled device (CCD) or complementary metal-oxide-semiconductor (CMOS) sensors). Images captured by cameras can be analyzed to determine their contents. For example, a processor may execute a machine-learning algorithm in order to identify objects in a scene based on a library of previously classified objects that includes objects' shapes, colors, sizes, etc. (e.g., such a machine-learning algorithm can be applied in computer vision in robotics or other applications).

Cameras can have a variety of features that can distinguish one camera from another. For example, cameras and/or images captured by cameras may be identified by values such as aperture size, f-number, exposure time, shutter speed, depth of field, focal length, International Organization for Standardization (ISO) sensitivity (or gain), pixel size, sensor resolution, exposure distance, etc. These features may be based on the lens, the image sensor, and/or additional facets of the camera. Further, these features may also be adjustable within a single camera (e.g., the aperture of a lens on a camera can be adjusted between photographs).

SUMMARY

The present disclosure relates to techniques that can be used to detect and identify objects, such as objects around a vehicle. Such detection and identification of objects can make use of data, such as images, collected from different types of sensors and/or cameras. These sensors and/or cameras can be located on the vehicle. The choice of the type of camera and/or sensor and the location of cameras and/or sensors on the vehicle can affect the information captured by the camera and/or sensor.

In one aspect, a system is provided. The system includes a vehicle. The system also includes at least one camera of a first camera type attached to the vehicle. Each camera of the first camera type has a first field of view. Additionally, the system includes a plurality of cameras of a second camera type attached to the vehicle. Each camera of the second camera type has a second field of view and the second field of view spans at least 170° in yaw relative to the vehicle. Further, the system includes a plurality of cameras of a third camera type attached to the vehicle. Each camera of the third camera type has a third field of view. A combined field of view of the plurality of cameras of the third camera type spans 360° in yaw relative to the vehicle. The first field of view spans fewer angles in yaw relative to the vehicle than the third field of view and the third field of view spans fewer angles in yaw relative to the vehicle than the second field of view. Moreover, the system includes a computing device communicatively coupled to the at least one camera of the first camera type, the plurality of cameras of the second camera type, and the plurality of cameras of the third camera type. The computing device is configured to identify, based on one or more first images captured by the at least one camera of the first camera type, objects located within a first range of distances from the vehicle. The computing device is also configured to identify, based on one or more second images captured by the plurality of cameras of the second camera type, objects located within a second range of distances from the vehicle. Further, the computing device is configured to identify, based on one or more third images captured by the plurality of cameras of the third camera type, objects located within a third range of distances from the vehicle. The third range of distances includes farther distances from the vehicle than are included in the second range of distances and the first range of distances includes farther distances from the vehicle than are included in the third range of distances.

In another aspect, a method is provided. The method includes receiving, by a computing device, one or more first images captured by at least one camera of a first camera type. Each camera of the first camera type is attached to a vehicle and has a first field of view. Also, the method includes receiving, by the computing device, one or more second images captured by a plurality of cameras of a second camera type. Each camera of the second camera type is attached to the vehicle and has a second field of view. The second field of view spans at least 170° in yaw relative to the vehicle. Further, the method includes receiving, by the computing device, one or more third images captured by a plurality of cameras of a third camera type. Each camera of the third camera type is attached to the vehicle and has a third field of view and a combined field of view of the plurality of cameras of the third camera type spans 360° in yaw relative to the vehicle. The first field of view spans fewer angles in yaw relative to the vehicle than the third field of view and the third field of view spans fewer angles in yaw relative to the vehicle than the second field of view. Moreover, the method includes identifying, by the computing device based on the one or more first images, objects located within a first range of distances from the vehicle. The method also includes identifying, by the computing device based on the one or more second images, objects located within a second range of distances from the vehicle. Additionally, the method includes identifying, by the computing device based on the one or more third images, objects located within a third range of distances from the vehicle. The third range of distances includes farther distances from the vehicle than are included in the second range of distances and the first range of distances includes farther distances from the vehicle than are included in the third range of distances. In addition, the method includes determining, by the computing device, a driving decision for the vehicle based upon the objects located within the first range of distances from the vehicle, the objects located within the second range of distances from the vehicle, or the objects located within the third range of distances from the vehicle.

In yet another aspect, a non-transitory, computer-readable medium, having stored thereon is provided. The program instructions, when executed by a processor, cause the processor to perform operations. The operations include receiving one or more first images captured by at least one camera of a first camera type. Each camera of the first camera type is attached to a vehicle and has a first field of view. The operations also include receiving one or more second images captured by a plurality of cameras of a second camera type. Each camera of the second camera type is attached to the vehicle and has a second field of view and the second field of view spans at least 170° in yaw relative to the vehicle. Further, the operations include receiving one or more third images captured by a plurality of cameras of a third camera type. Each camera of the third camera type is attached to the vehicle and has a third field of view and a combined field of view of the plurality of cameras of the third camera type spans 360° in yaw relative to the vehicle. The first field of view spans fewer angles in yaw relative to the vehicle than the third field of view and the third field of view spans fewer angles in yaw relative to the vehicle than the second field of view. Moreover, the operations include identifying, based on the one or more first images, objects located within a first range of distances from the vehicle. The operations also include identifying, based on the one or more second images, objects located within a second range of distances from the vehicle. In addition, the operations include identifying, based on the one or more third images, objects located within a third range of distances from the vehicle. The third range of distances includes farther distances from the vehicle than are included in the second range of distances and the first range of distances includes farther distances from the vehicle than are included in the third range of distances. Additionally, the operations include determining a driving decision for the vehicle based upon the objects located within the first range of distances from the vehicle, the objects located within the second range of distances from the vehicle, or the objects located within the third range of distances from the vehicle.

These as well as other aspects, advantages, and alternatives will become apparent to those of ordinary skill in the art by reading the following detailed description, with reference, where appropriate, to the accompanying drawings.

BRIEF DESCRIPTION OF THE DRAWINGS

FIG. 2J is an illustration of a field of view for various sensors, according to example embodiments.

FIG. 11C is a simplified illustration of the camera system of FIG. 11A showing the cameras of the second camera type of the camera system, according to example embodiments.

DETAILED DESCRIPTION

Figure 1:
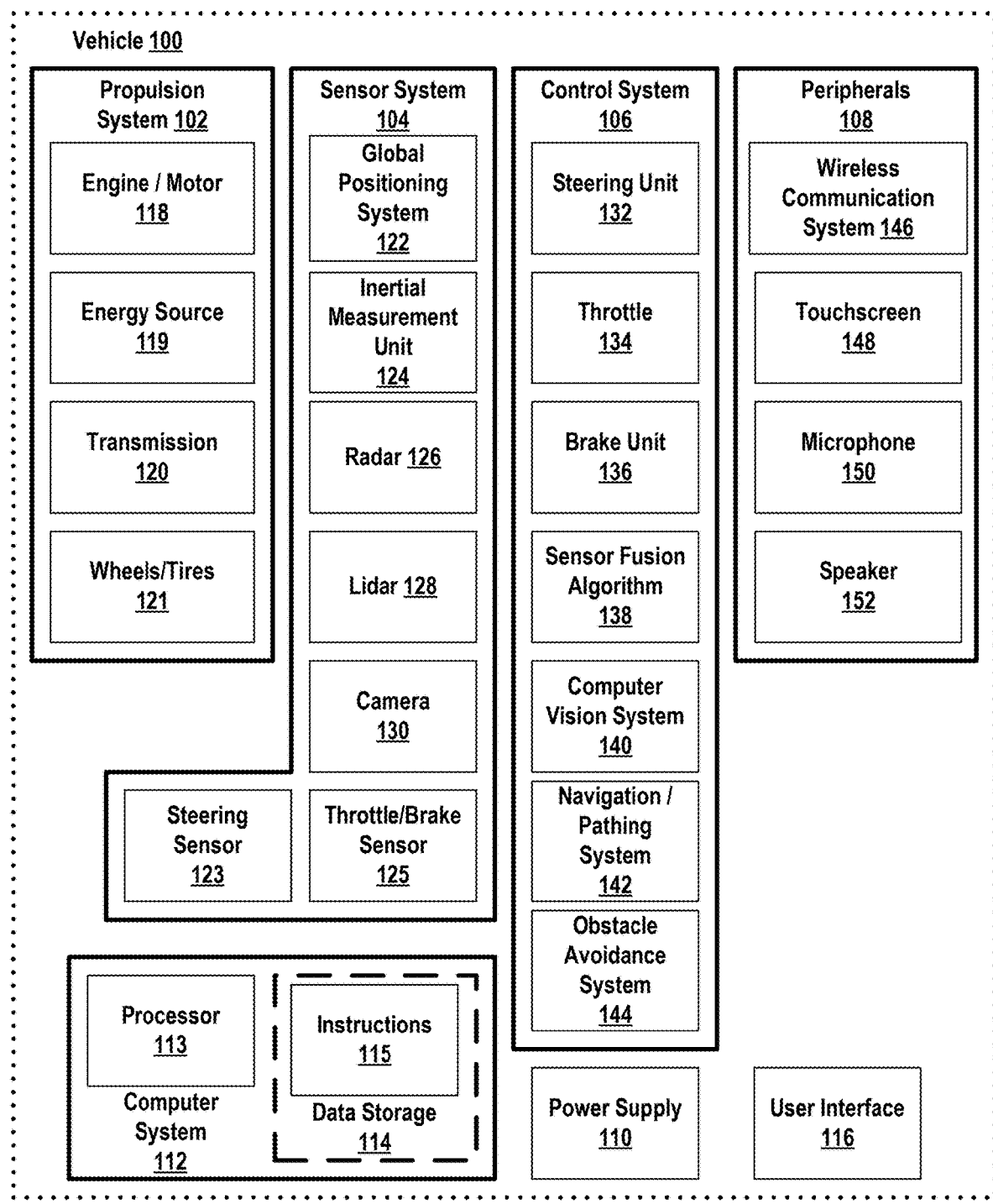
FIG. 1 is a functional block diagram illustrating a vehicle, according to example embodiments.

Example methods and systems are contemplated herein. Any example embodiment or feature described herein is not necessarily to be construed as preferred or advantageous over other embodiments or features. Further, the example embodiments described herein are not meant to be limiting. It will be readily understood that certain aspects of the disclosed systems and methods can be arranged and combined in a wide variety of different configurations, all of which are contemplated herein. In addition, the particular arrangements shown in the figures should not be viewed as limiting. It should be understood that other embodiments might include more or less of each element shown in a given figure. Additionally, some of the illustrated elements may be combined or omitted. Yet further, an example embodiment may include elements that are not illustrated in the figures.

Lidar devices as described herein can include one or more light emitters and one or more detectors used for detecting light that is emitted by the one or more light emitters and reflected by one or more objects in an environment surrounding the lidar device. As an example, the surrounding environment could include an interior or exterior environment, such as an inside of a building or an outside of a building. Additionally or alternatively, the surrounding environment could include an interior of a vehicle. Still further, the surrounding environment could include a vicinity around and/or on a roadway. Examples of objects in the surrounding environment include, but are not limited to, other vehicles, traffic signs, pedestrians, bicyclists, roadway surfaces, buildings, and terrain. Additionally, the one or more light emitters could emit light into a local environment of the lidar itself. For example, light emitted from the one or more light emitters could interact with a housing of the lidar and/or surfaces or structures coupled to the lidar. In some cases, the lidar could be mounted to a vehicle, in which case the one or more light emitters could be configured to emit light that interacts with objects within a vicinity of the vehicle. Further, the light emitters could include optical fiber amplifiers, laser diodes, light-emitting diodes (LEDs), among other possibilities.

Information (e.g., images) can be gathered from multiple cameras and/or sensors. This information can be combined and used for machine vision on a vehicle (e.g., a vehicle operating in an autonomous or semi-autonomous mode). For example, a camera system may use information gathered from these cameras and other sensors to provide alerts to a user or make other decisions regarding the vehicle.

The arrangements of cameras within a camera system used for machine vision on a vehicle (e.g., a vehicle operating in an autonomous or semi-autonomous mode) can be complex. Such a system may need to integrate multiple cameras, sensors, and processors to provide real-time information about the vehicle's surroundings. The cameras and other sensors can be of different types, including: those that capture images with a high resolution, those configured to detect objects a short distance from the vehicle, and those configured to detect objects a long distance from the vehicle.

As such, when designing a camera system, there may be multiple design parameters under consideration. One such set of design parameters is the type of cameras and/or sensors to use in a camera system and the locations of such cameras and/or sensors. There may be multiple, possibly competing, goals when determining the type of cameras and/or sensors to use, as well as when determining the locations of those cameras and/or sensors on the vehicle. One such goal may be improved safety, e.g., the ability of the vehicle to avoid or warn vehicle occupants of potentially dangerous situations. Another goal may be increased efficiency, e.g., the ability to make more complex determinations based upon the same amount of information. This can include decisions that account for conditions that could lead to sensor data quality degradation (e.g., different weather conditions). A further goal may be to reduce the overall cost to produce, train, use, and/or maintain the camera system. In some embodiments described herein, the selection of the types of cameras and/or sensors as well as their locations on the vehicle may advance these goals simultaneously. In some embodiments described herein, the selection of the types of cameras and/or sensors as well as their locations on the vehicle may involve prioritizing one goal over one or more of the others.

Multiple different types of cameras may be attached to a vehicle and used for computer vision (e.g., to capture images used for object detection and/or classification and avoidance). For example, three long-range cameras may be attached to a roof of the vehicle and oriented in a forward direction (e.g., a primary direction of travel of the vehicle). Additionally, such systems may include four cameras configured to detect objects that are located close to the vehicle. Each of these cameras may have a field of view of at least 170° (e.g., a fish-eye camera). Further, such cameras may be attached to a front bumper or side fender bumper of the vehicle (e.g., above a front or rear wheel well of the vehicle) and/or may be oriented in a forward, sideways, or backward direction relative to the direction of travel of the vehicle.

Some embodiments may also include five cameras that, when combined, are capable of detecting objects located at intermediate distances from the vehicle and at any angle in yaw relative to the vehicle (e.g., any angle between 0° and 360°). These five cameras may be attached to the vehicle above one or more front wheels of the vehicle (e.g., adjacent to one of the 170° view cameras) and/or to the roof of the vehicle. Further, the five cameras capable of observing 360° around the vehicle may each be oriented in one or more sideways directions, the forward direction, and/or the backward direction relative to the direction of travel of the vehicle. Given this arrangement of cameras, the system may be simultaneously capable of capturing images that can be used to identify objects that are: (1) at close range relative to the vehicle; (2) at intermediate distances and within a full 360° in yaw relative to the vehicle; and (3) at long range relative to the vehicle and in the forward direction relative to the direction of travel of the vehicle.

In some embodiments described herein, images captured from the one or more cameras may be combined with data gathered by other sensors (e.g., light detection and ranging (lidar) devices). The combination of information from multiple sources, which can enable improved detection of particular types of objects, such as traffic lights and headlights. For example, a lidar device may be attached to the vehicle and configured to generate a point cloud indicative of distances to objects in an environment surrounding the vehicle.

In some embodiments, one of the cameras configured to detect objects that are located at close distances to the vehicle may include a neutral density filter through which images are captured. Such a camera may be oriented relative to the vehicle so as to capture images from pitch angles relative to the vehicle of greater than 20°. Moreover, this camera may be configured to capture a pair of images. The first of these two images may be captured with an exposure time set by an auto-exposure setting of the camera. The second of these two images may be captured with an exposure time longer than a predefined exposure time that is long enough to ensure capture of flickering light sources (e.g., a predefined exposure time of 1/60 seconds or 1/50 seconds) or one that is longer than the exposure time set by the auto-exposure setting of the camera. These two images may be aligned and overlapped with the point cloud generated by the lidar device to produce an overlapping image. The detection of objects at close distances to the car may then be performed based upon the overlapping image.

The following description and accompanying drawings will elucidate features of various example embodiments. The embodiments provided are by way of example, and are not intended to be limiting. As such, the dimensions of the drawings are not necessarily to scale.

Example systems within the scope of the present disclosure will now be described in greater detail. An example system may be implemented in or may take the form of an automobile. Additionally, an example system may also be implemented in or take the form of various vehicles, such as cars, trucks (e.g., pickup trucks, vans, tractors, and tractor trailers), motorcycles, buses, airplanes, helicopters, drones, lawn mowers, earth movers, boats, submarines, all-terrain vehicles, snowmobiles, aircraft, recreational vehicles, amusement park vehicles, farm equipment or vehicles, construction equipment or vehicles, warehouse equipment or vehicles, factory equipment or vehicles, trams, golf carts, trains, trolleys, sidewalk delivery vehicles, and robot devices. Other vehicles are possible as well. Further, in some embodiments, example systems might not include a vehicle.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. Additionally, example vehicle 100 may operate in a partially autonomous (i.e., semi-autonomous) mode in which some functions of the vehicle 100 are controlled by a human driver of the vehicle 100 and some functions of the vehicle 100 are controlled by the computing system. For example, vehicle 100 may also include subsystems that enable the driver to control operations of vehicle 100 such as steering, acceleration, and braking, while the computing system performs assistive functions such as lane-departure warnings/lane-keeping assist or adaptive cruise control based on other objects (e.g., vehicles) in the surrounding environment.

As described herein, in a partially autonomous driving mode, even though the vehicle assists with one or more driving operations (e.g., steering, braking and/or accelerating to perform lane centering, adaptive cruise control, advanced driver assistance systems (ADAS), and emergency braking), the human driver is expected to be situationally aware of the vehicle's surroundings and supervise the assisted driving operations. Here, even though the vehicle may perform all driving tasks in certain situations, the human driver is expected to be responsible for taking control as needed.

Although, for brevity and conciseness, various systems and methods are described below in conjunction with autonomous vehicles, these or similar systems and methods can be used in various driver assistance systems that do not rise to the level of fully autonomous driving systems (i.e. partially autonomous driving systems). In the United States, the Society of Automotive Engineers (SAE) have defined different levels of automated driving operations to indicate how much, or how little, a vehicle controls the driving, although different organizations, in the United States or in other countries, may categorize the levels differently. More specifically, the disclosed systems and methods can be used in SAE Level 2 driver assistance systems that implement steering, braking, acceleration, lane centering, adaptive cruise control, etc., as well as other driver support. The disclosed systems and methods can be used in SAE Level 3 driving assistance systems capable of autonomous driving under limited (e.g., highway) conditions. Likewise, the disclosed systems and methods can be used in vehicles that use SAE Level 4 self-driving systems that operate autonomously under most regular driving situations and require only occasional attention of the human operator. In all such systems, accurate lane estimation can be performed automatically without a driver input or control (e.g., while the vehicle is in motion) and result in improved reliability of vehicle positioning and navigation and the overall safety of autonomous, semi-autonomous, and other driver assistance systems. As previously noted, in addition to the way in which SAE categorizes levels of automated driving operations, other organizations, in the United States or in other countries, may categorize levels of automated driving operations differently. Without limitation, the disclosed systems and methods herein can be used in driving assistance systems defined by these other organizations' levels of automated driving operations.

As shown in FIG. 1, vehicle 100 may include various subsystems, such as propulsion system 102, sensor system 104, control system 106, one or more peripherals 108, power supply 110, computer system 112 (which could also be referred to as a computing system) with data storage 114, and user interface 116. In other examples, vehicle 100 may include more or fewer subsystems, which can each include multiple elements. The subsystems and components of vehicle 100 may be interconnected in various ways. In addition, functions of vehicle 100 described herein can be divided into additional functional or physical components, or combined into fewer functional or physical components within embodiments. For instance, the control system 106 and the computer system 112 may be combined into a single system that operates the vehicle 100 in accordance with various operations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar 126, lidar 128, camera 130, steering sensor 123, and throttle/brake sensor 125, among other possible sensors. In some embodiments, sensor system 104 may also include sensors configured to monitor internal systems of the vehicle 100 (e.g., $O_2$ monitor, fuel gauge, engine oil temperature, and brake wear).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the surrounding environment of vehicle 100. As such, radar 126 may include antennas configured to transmit and receive radio signals. In some embodiments, radar 126 may correspond to a mountable radar configured to obtain measurements of the surrounding environment of vehicle 100.

Lidar 128 may include one or more laser sources, a laser scanner, and one or more detectors, among other system components, and may operate in a coherent mode (e.g., using heterodyne detection) or in an incoherent detection mode (i.e., time-of-flight mode). In some embodiments, the one or more detectors of the lidar 128 may include one or more photodetectors, which may be especially sensitive detectors (e.g., avalanche photodiodes). In some examples, such photodetectors may be capable of detecting single photons (e.g., single-photon avalanche diodes (SPADs)). Further, such photodetectors can be arranged (e.g., through an electrical connection in series) into an array (e.g., as in a silicon photomultiplier (SiPM)). In some examples, the one or more photodetectors are Geiger-mode operated devices and the lidar includes subcomponents designed for such Geiger-mode operation.

Camera 130 may include one or more devices (e.g., still camera, video camera, a thermal imaging camera, a stereo camera, and a night vision camera) configured to capture images of the surrounding environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve and a carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software (e.g., a general purpose processor such as a central processing unit (CPU), a specialized processor such as a graphical processing unit (GPU) or a tensor processing unit (TPU), an application-specific integrated circuit (ASIC), a field programmable gate array (FPGA), a volatile memory, a non-volatile memory, or one or more machine-learned models) operable to process and analyze images in an effort to determine objects that are in motion (e.g., other vehicles, pedestrians, bicyclists, or animals) and objects that are not in motion (e.g., traffic lights, roadway boundaries, speed-bumps, or potholes). As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, interior microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or cellular communication, such as 4G worldwide interoperability for microwave access (WiMAX) or long-term evolution (LTE), or 5G. Alternatively, wireless communication system 146 may communicate with a wireless local area network (WLAN) using WIFI® or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory, computer-readable medium, such as data storage 114. In some embodiments, computer system 112 may represent a plurality of computing devices that may serve to control individual components or subsystems of vehicle 100 in a distributed fashion.

In some embodiments, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, or control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of a surrounding environment of vehicle 100 operating in an autonomous or semi-autonomous mode. The state of the surrounding environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar 126 and/or lidar 128, and/or some other environmental mapping, ranging, and/or positioning sensor system may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A-2E show an example vehicle 200 (e.g., a fully autonomous vehicle or semi-autonomous vehicle) that can include some or all of the functions described in connection with vehicle 100 in reference to FIG. 1. Although vehicle 200 is illustrated in FIGS. 2A-2E as a van with side view mirrors for illustrative purposes, the present disclosure is not so limited. For instance, the vehicle 200 can represent a truck, a car, a semi-trailer truck, a motorcycle, a golf cart, an off-road vehicle, a farm vehicle, or any other vehicle that is described elsewhere herein (e.g., buses, boats, airplanes, helicopters, drones, lawn mowers, earth movers, submarines, all-terrain vehicles, snowmobiles, aircraft, recreational vehicles, amusement park vehicles, farm equipment, construction equipment or vehicles, warehouse equipment or vehicles, factory equipment or vehicles, trams, trains, trolleys, sidewalk delivery vehicles, and robot devices).

The example vehicle 200 may include one or more sensor systems 202, 204, 206, 208, 210, 212, 214, and 218. In some embodiments, sensor systems 202, 204, 206, 208, 210, 212, 214, and/or 218 could represent one or more optical systems (e.g. cameras), one or more lidars, one or more radars, one or more inertial sensors, one or more humidity sensors, one or more acoustic sensors (e.g., microphones and sonar devices), or one or more other sensors configured to sense information about an environment surrounding the vehicle 200. In other words, any sensor system now known or later created could be coupled to the vehicle 200 and/or could be utilized in conjunction with various operations of the vehicle 200. As an example, a lidar could be utilized in self-driving or other types of navigation, planning, perception, and/or mapping operations of the vehicle 200. In addition, sensor systems 202, 204, 206, 208, 210, 212, 214, and/or 218 could represent a combination of sensors described herein (e.g., one or more lidars and radars; one or more lidars and cameras; one or more cameras and radars; or one or more lidars, cameras, and radars).

Note that the number, location, and type of sensor systems (e.g., 202 and 204) depicted in FIGS. 2A-E are intended as a non-limiting example of the location, number, and type of such sensor systems of an autonomous or semi-autonomous vehicle. Alternative numbers, locations, types, and configurations of such sensors are possible (e.g., to comport with vehicle size, shape, aerodynamics, fuel economy, aesthetics, or other conditions, to reduce cost, or to adapt to specialized environmental or application circumstances). For example, the sensor systems (e.g., 202 and 204) could be disposed in various other locations on the vehicle (e.g., at location 216) and could have fields of view that correspond to internal and/or surrounding environments of the vehicle 200.

The sensor system 202 may be mounted atop the vehicle 200 and may include one or more sensors configured to detect information about an environment surrounding the vehicle 200, and output indications of the information. For example, sensor system 202 can include any combination of cameras, radars, lidars, inertial sensors, humidity sensors, and acoustic sensors (e.g., microphones and sonar devices). The sensor system 202 can include one or more movable mounts that could be operable to adjust the orientation of one or more sensors in the sensor system 202. In one embodiment, the movable mount could include a rotating platform that could scan sensors so as to obtain information from each direction around the vehicle 200. In another embodiment, the movable mount of the sensor system 202 could be movable in a scanning fashion within a particular range of angles and/or azimuths and/or elevations. The sensor system 202 could be mounted atop the roof of a car, although other mounting locations are possible.

Additionally, the sensors of sensor system 202 could be distributed in different locations and need not be collocated in a single location. Furthermore, each sensor of sensor system 202 can be configured to be moved or scanned independently of other sensors of sensor system 202. Additionally or alternatively, multiple sensors may be mounted at one or more of the sensor locations 202, 204, 206, 208, 210, 212, 214, and/or 218. For example, there may be two lidar devices mounted at a sensor location and/or there may be one lidar device and one radar mounted at a sensor location.

The one or more sensor systems 202, 204, 206, 208, 210, 212, 214, and/or 218 could include one or more lidar devices. For example, the lidar devices could include a plurality of light-emitter devices arranged over a range of angles with respect to a given plane (e.g., the x-y plane). For example, one or more of the sensor systems 202, 204, 206, 208, 210, 212, 214, and/or 218 may be configured to rotate or pivot about an axis (e.g., the z-axis) perpendicular to the given plane so as to illuminate an environment surrounding the vehicle 200 with light pulses. Based on detecting various aspects of reflected light pulses (e.g., the elapsed time of flight, polarization, and intensity), information about the surrounding environment may be determined.

In an example embodiment, sensor systems 202, 204, 206, 208, 210, 212, 214, and/or 218 may be configured to provide respective point cloud information that may relate to physical objects within the surrounding environment of the vehicle 200. While vehicle 200 and sensor systems 202, 204, 206, 208, 210, 212, 214, and 218 are illustrated as including certain features, it will be understood that other types of sensor systems are contemplated within the scope of the present disclosure. Further, the example vehicle 200 can include any of the components described in connection with vehicle 100 of FIG. 1.

In an example configuration, one or more radars can be located on vehicle 200. Similar to radar 126 described above, the one or more radars may include antennas configured to transmit and receive radio waves (e.g., electromagnetic waves having frequencies between 30 Hz and 300 GHz). Such radio waves may be used to determine the distance to and/or velocity of one or more objects in the surrounding environment of the vehicle 200. For example, one or more sensor systems 202, 204, 206, 208, 210, 212, 214, and/or 218 could include one or more radars. In some examples, one or more radars can be located near the rear of the vehicle 200 (e.g., sensor systems 208 and 210), to actively scan the environment near the back of the vehicle 200 for the presence of radio-reflective objects. Similarly, one or more radars can be located near the front of the vehicle 200 (e.g., sensor systems 212 or 214) to actively scan the environment near the front of the vehicle 200. A radar can be situated, for example, in a location suitable to illuminate a region including a forward-moving path of the vehicle 200 without occlusion by other features of the vehicle 200. For example, a radar can be embedded in and/or mounted in or near the front bumper, front headlights, cowl, and/or hood, etc. Furthermore, one or more additional radars can be located to actively scan the side and/or rear of the vehicle 200 for the presence of radio-reflective objects, such as by including such devices in or near the rear bumper, side panels, rocker panels, and/or undercarriage, etc.

The vehicle 200 can include one or more cameras. For example, the one or more sensor systems 202, 204, 206, 208, 210, 212, 214, and/or 218 could include one or more cameras. The camera can be a photosensitive instrument, such as a still camera, a video camera, a thermal imaging camera, a stereo camera, a night vision camera, etc., that is configured to capture a plurality of images of the surrounding environment of the vehicle 200. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity. In some embodiments, the camera can include, for example, a range detector configured to generate a two-dimensional image indicating distance from the camera to a number of points in the surrounding environment. To this end, the camera may use one or more range detecting techniques. For example, the camera can provide range information by using a structured light technique in which the vehicle 200 illuminates an object in the surrounding environment with a predetermined light pattern, such as a grid or checkerboard pattern and uses the camera to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 200. Other mounting locations and viewing angles of the camera can also be used, either inside or outside the vehicle 200. Further, the camera can have associated optics operable to provide an adjustable field of view. Still further, the camera can be mounted to vehicle 200 with a movable mount to vary a pointing angle of the camera, such as via a pan/tilt mechanism.

The vehicle 200 may also include one or more acoustic sensors (e.g., one or more of the sensor systems 202, 204, 206, 208, 210, 212, 214, 216, 218 may include one or more acoustic sensors) used to sense a surrounding environment of vehicle 200. Acoustic sensors may include microphones (e.g., piezoelectric microphones, condenser microphones, ribbon microphones, or microelectromechanical systems (MEMS) microphones) used to sense acoustic waves (i.e., pressure differentials) in a fluid (e.g., air) of the environment surrounding the vehicle 200. Such acoustic sensors may be used to identify sounds in the surrounding environment (e.g., sirens, human speech, animal sounds, or alarms) upon which control strategy for vehicle 200 may be based. For example, if the acoustic sensor detects a siren (e.g., an ambulatory siren or a fire engine siren), vehicle 200 may slow down and/or navigate to the edge of a roadway.

Although not shown in FIGS. 2A-2E, the vehicle 200 can include a wireless communication system (e.g., similar to the wireless communication system 146 of FIG. 1 and/or in addition to the wireless communication system 146 of FIG. 1). The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

The vehicle 200 may include one or more other components in addition to or instead of those shown. The additional components may include electrical or mechanical functionality.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions. For example, a route taken by a vehicle from one destination to another may be modified based on driving conditions. Additionally or alternatively, the velocity, acceleration, turn angle, follow distance (i.e., distance to a vehicle ahead of the present vehicle), lane selection, etc. could all be modified in response to changes in the driving conditions.

Figure 2A:
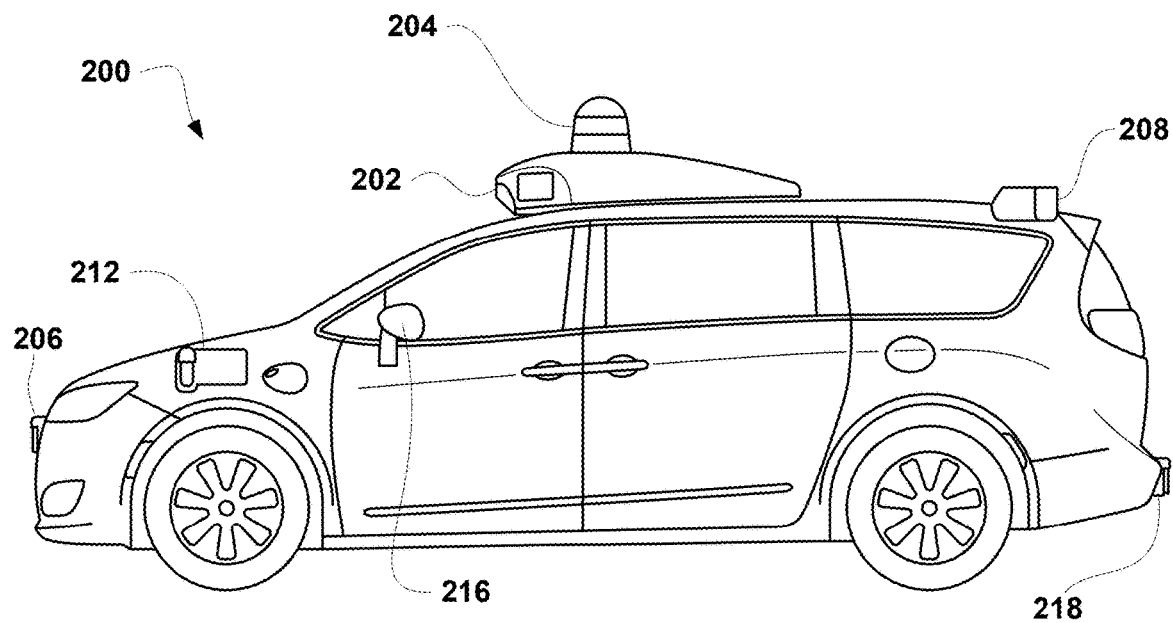
FIG. 2A is an illustration of a physical configuration of a vehicle, according to example embodiments.
Figure 2B:
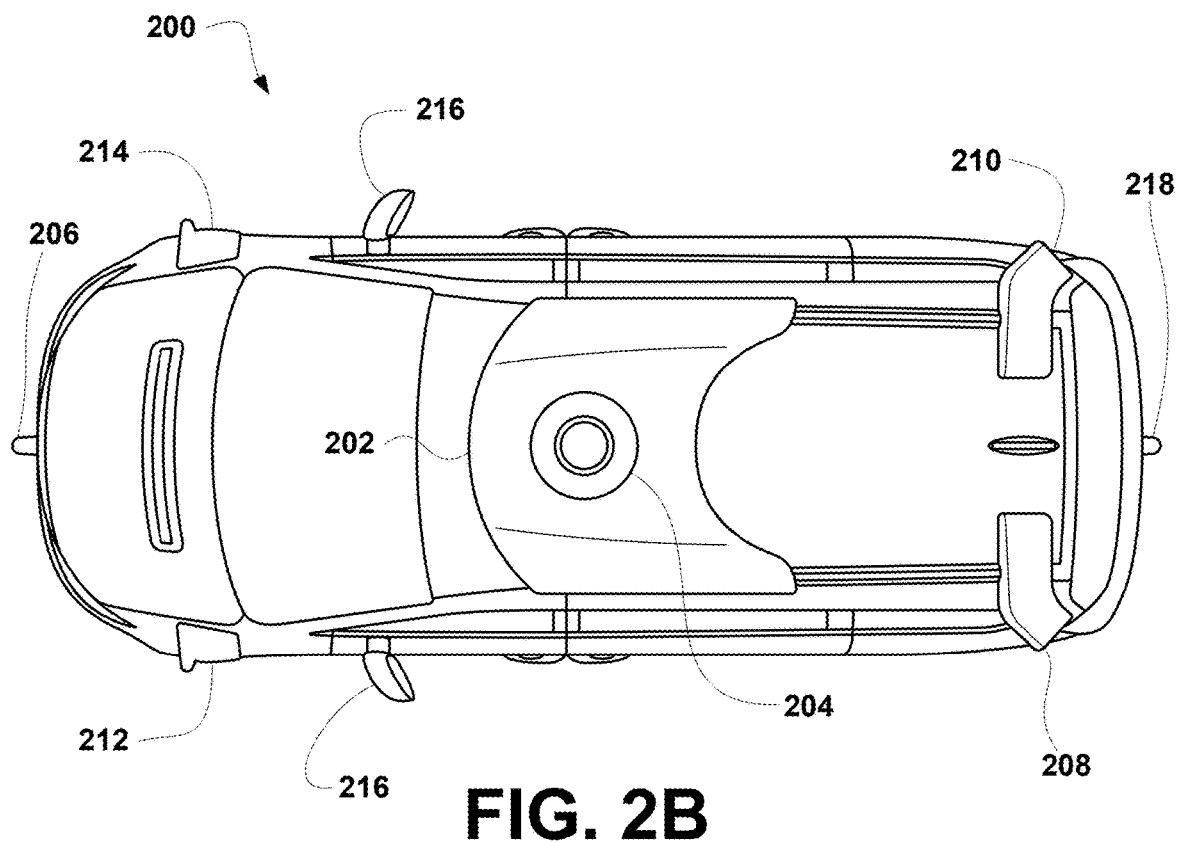
FIG. 2B is an illustration of a physical configuration of a vehicle, according to example embodiments.
Figure 2C:
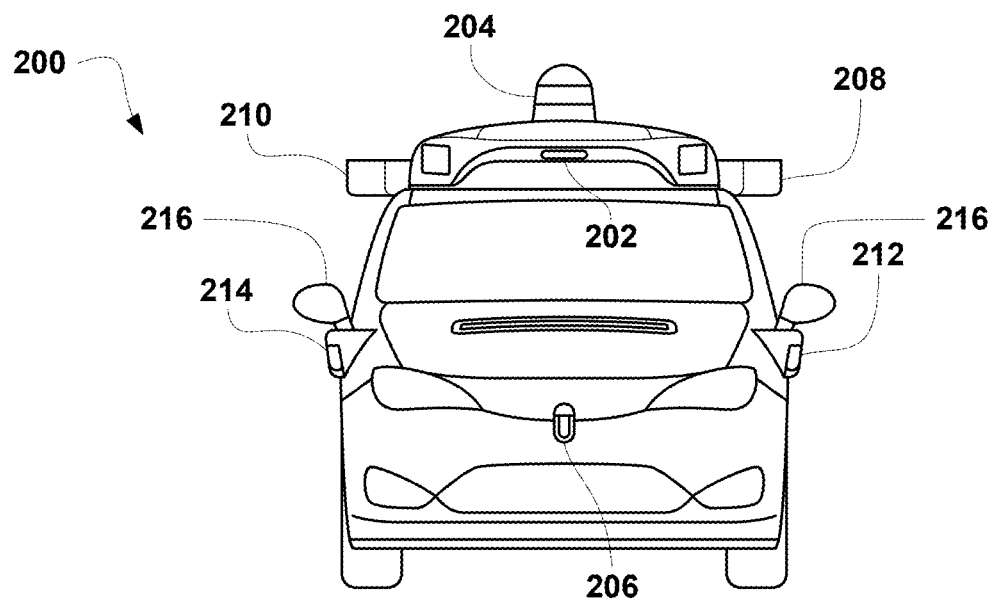
FIG. 2C is an illustration of a physical configuration of a vehicle, according to example embodiments.
Figure 2D:
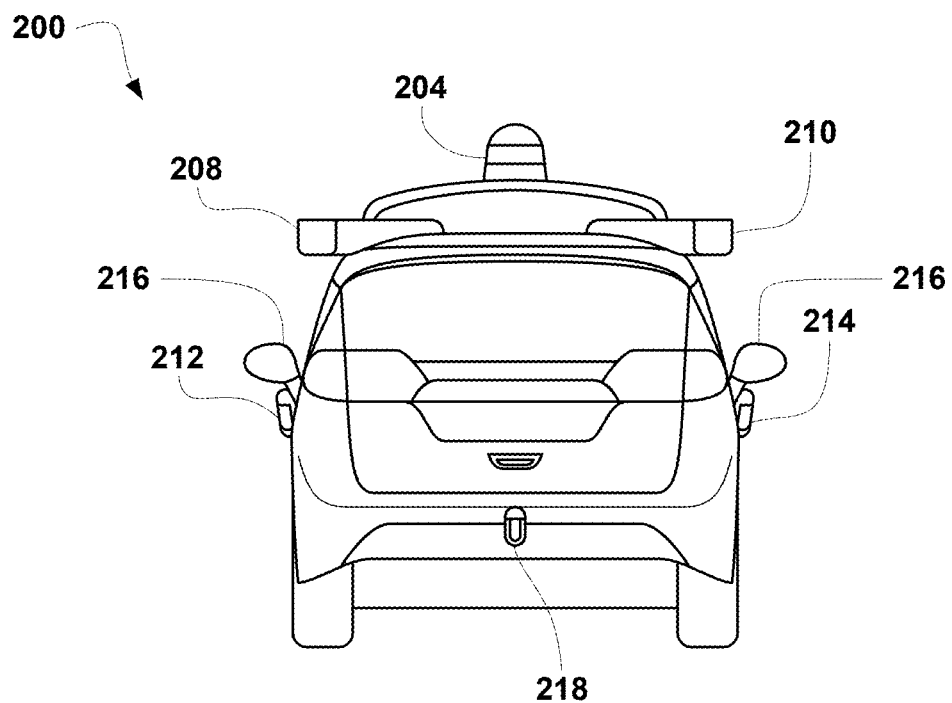
FIG. 2D is an illustration of a physical configuration of a vehicle, according to example embodiments.
Figure 2E:
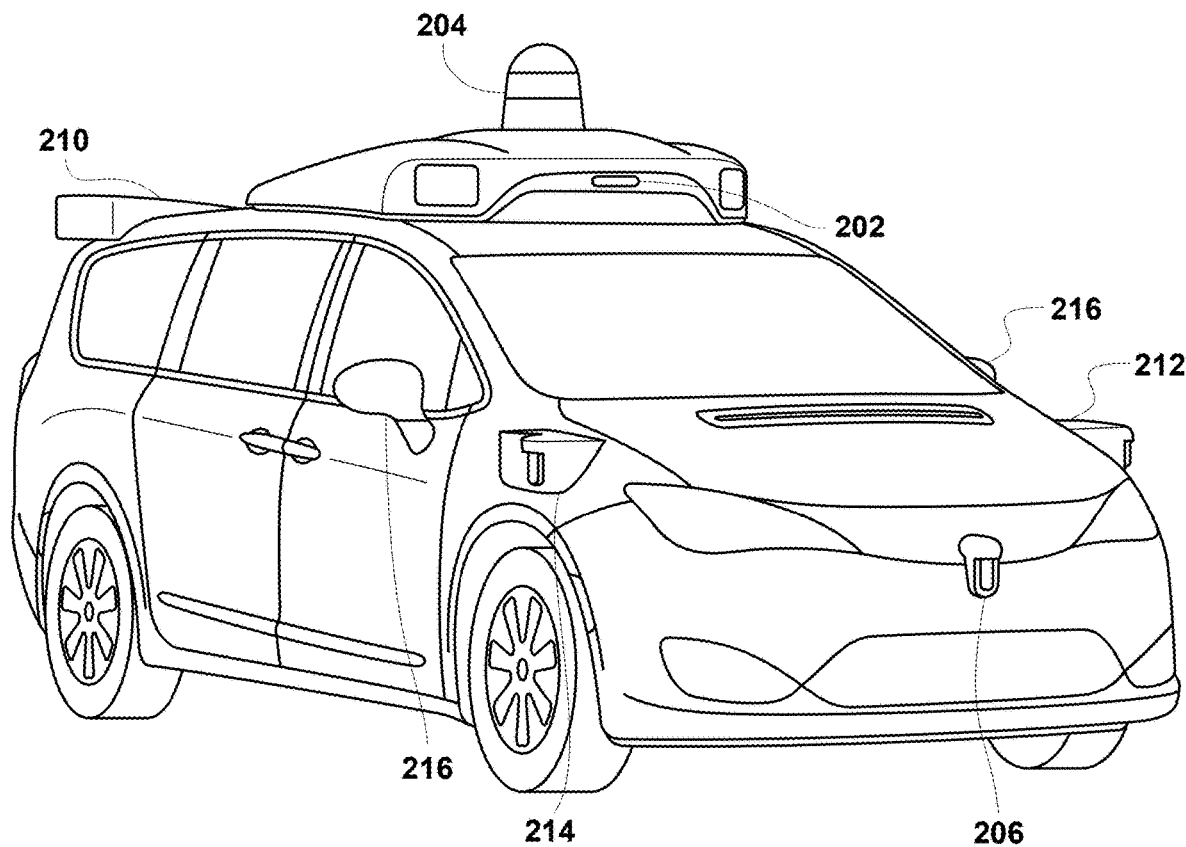
FIG. 2E is an illustration of a physical configuration of a vehicle, according to example embodiments.
Figure 2F:
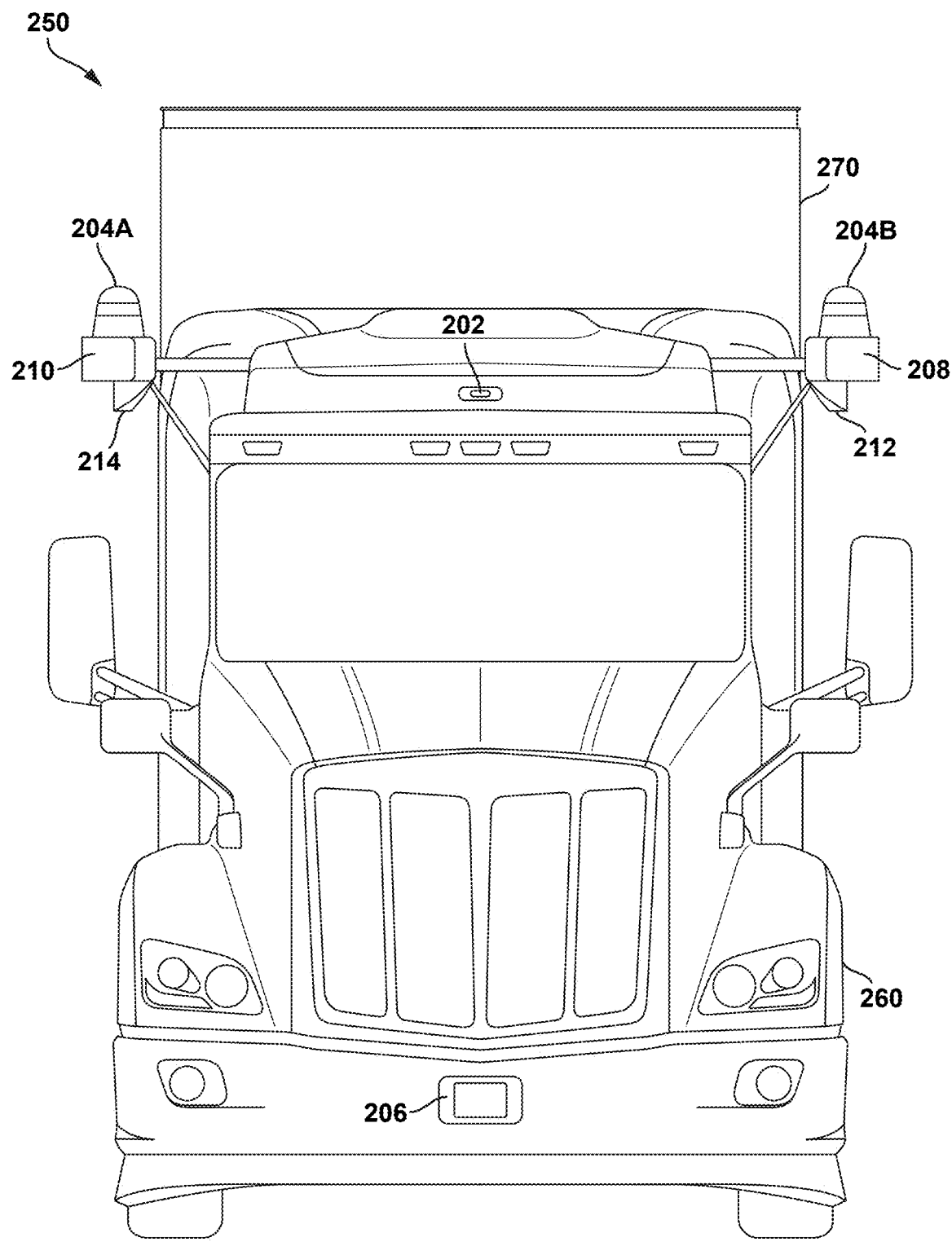
FIG. 2F is an illustration of a physical configuration of a vehicle, according to example embodiments.
Figure 2G:
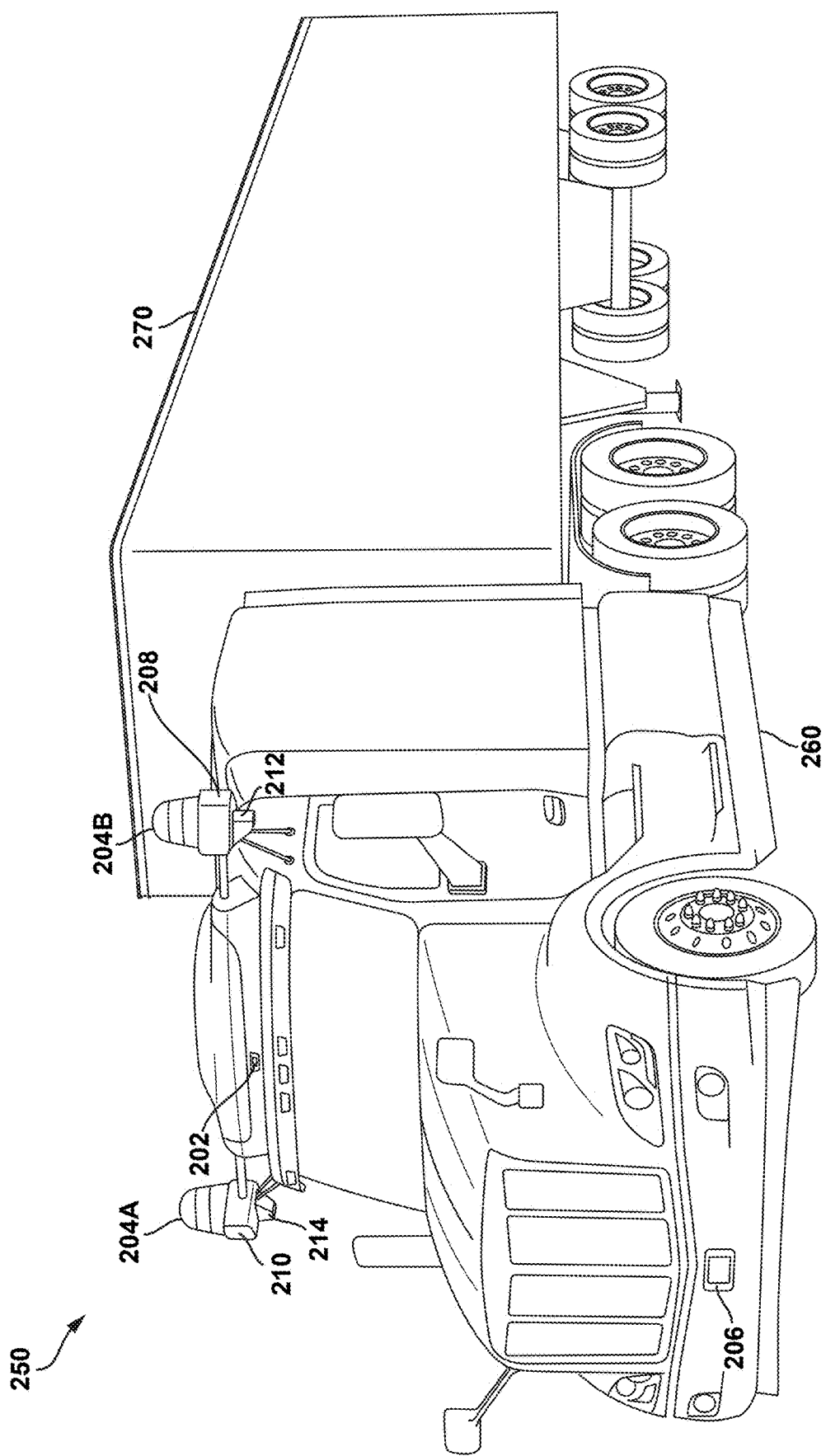
FIG. 2G is an illustration of a physical configuration of a vehicle, according to example embodiments.
Figure 2H:
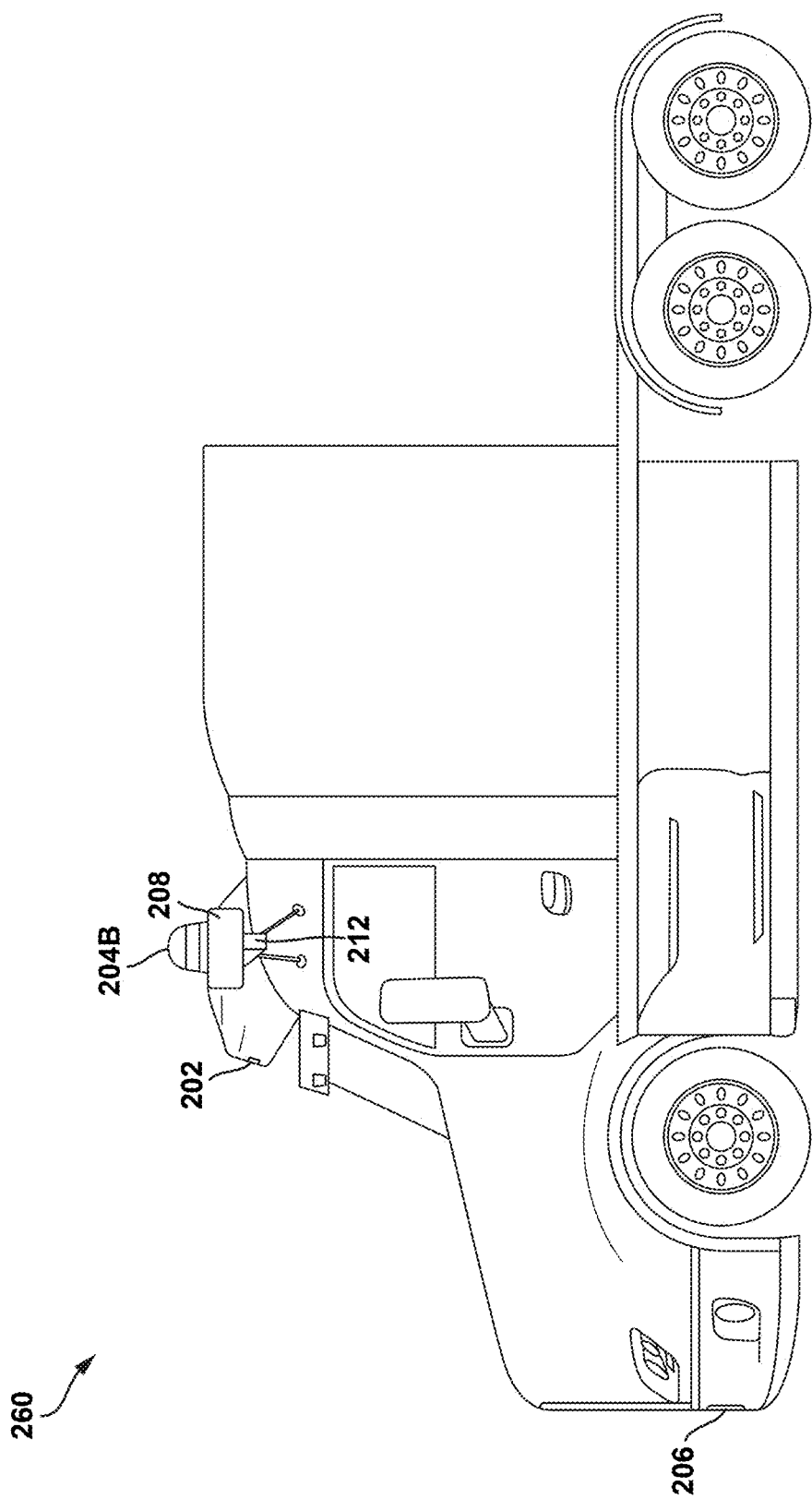
FIG. 2H is an illustration of a physical configuration of a vehicle, according to example embodiments.
Figure 2I:
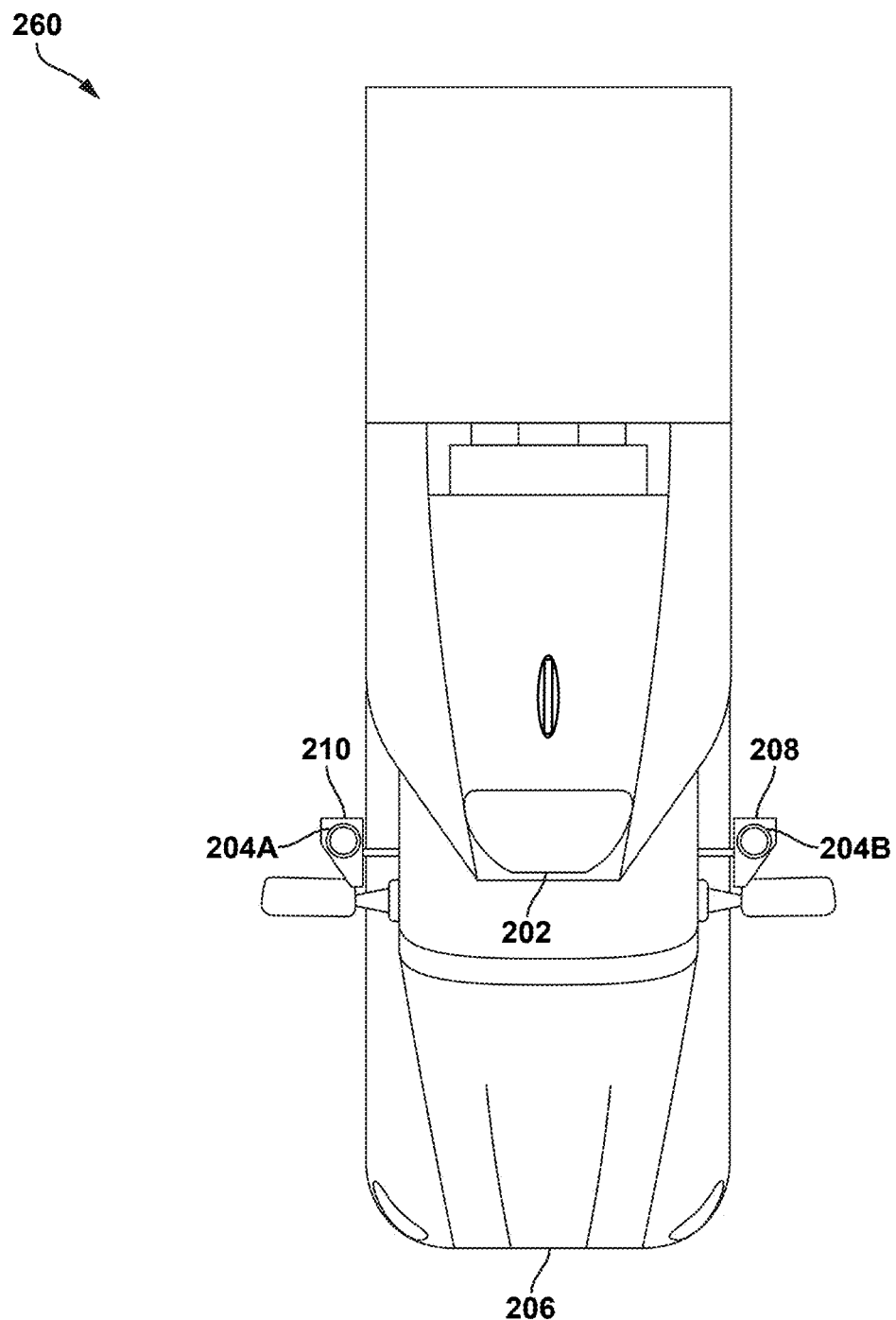
FIG. 2I is an illustration of a physical configuration of a vehicle, according to example embodiments.

As described above, in some embodiments, the vehicle 200 may take the form of a van, but alternate forms are also possible and are contemplated herein. As such, FIGS. 2F-2I illustrate embodiments where a vehicle 250 takes the form of a semi-truck. For example, FIG. 2F illustrates a front-view of the vehicle 250 and FIG. 2G illustrates an isometric view of the vehicle 250. In embodiments where the vehicle 250 is a semi-truck, the vehicle 250 may include a tractor portion 260 and a trailer portion 270 (illustrated in FIG. 2G). FIGS. 2H and 2I provide a side view and a top view, respectively, of the tractor portion 260. Similar to the vehicle 200 illustrated above, the vehicle 250 illustrated in FIGS. 2F-2I may also include a variety of sensor systems (e.g., similar to the sensor systems 202, 206, 208, 210, 212, 214 shown and described with reference to FIGS. 2A-2E). In some embodiments, whereas the vehicle 200 of FIGS. 2A-2E may only include a single copy of some sensor systems (e.g., the sensor system 204), the vehicle 250 illustrated in FIGS. 2F-2I may include multiple copies of that sensor system (e.g., the sensor systems 204A and 204B, as illustrated).

While drawings and description throughout may reference a given form of vehicle (e.g., the semi-truck vehicle 250 or the van vehicle 200), it is understood that embodiments described herein can be equally applied in a variety of vehicle contexts (e.g., with modifications employed to account for a form factor of vehicle). For example, sensors and/or other components described or illustrated as being part of the van vehicle 200 could also be used (e.g., for navigation and/or obstacle detection and avoidance) in the semi-truck vehicle 250

FIG. 2J illustrates various sensor fields of view (e.g., associated with the vehicle 250 described above). As described above, vehicle 250 may contain a plurality of sensors/sensor units. The locations of the various sensors may correspond to the locations of the sensors disclosed in FIGS. 2F-2I, for example. However, in some instances, the sensors may have other locations. Sensors location reference numbers are omitted from FIG. 2J for simplicity of the drawing. For each sensor unit of vehicle 250, FIG. 2J illustrates a representative field of view (e.g., fields of view labeled as 252A, 252B, 252C, 252D, 254A, 254B, 256, 258A, 258B, and 258C). The field of view of a sensor may include an angular region (e.g., an azimuthal angular region and/or an elevational angular region) over which the sensor may detect objects.

Figure 2K:
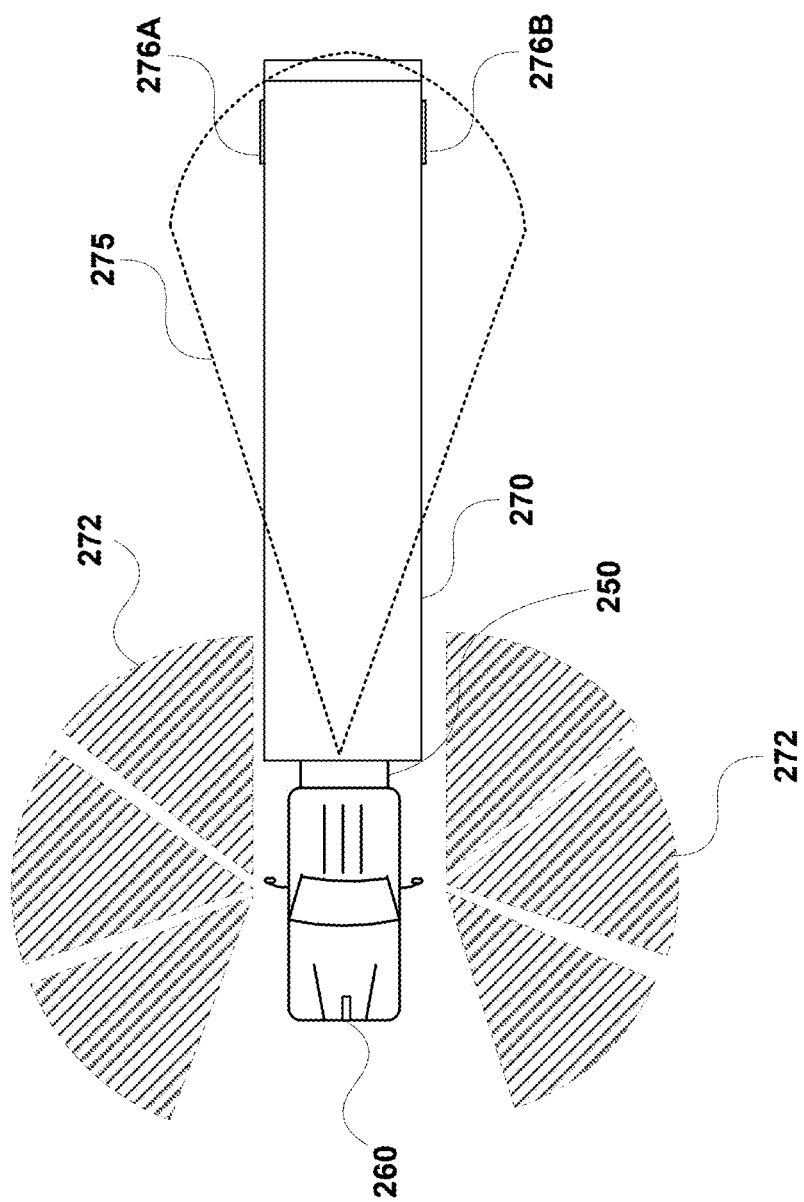
FIG. 2K is an illustration of beam steering for a sensor, according to example embodiments.

FIG. 2K illustrates beam steering for a sensor of a vehicle (e.g., the vehicle 250 shown and described with reference to FIGS. 2F-2J), according to example embodiments. In various embodiments, a sensor unit of vehicle 250 may be a radar, a lidar, a sonar, etc. Further, in some embodiments, during the operation of the sensor, the sensor may be scanned within the field of view of the sensor. Various different scanning angles for an example sensor are shown as regions 272, which each indicate the angular region over which the sensor is operating. The sensor may periodically or iteratively change the region over which it is operating. In some embodiments, multiple sensors may be used by vehicle 250 to measure regions 272. In addition, other regions may be included in other examples. For instance, one or more sensors may measure aspects of the trailer 270 of vehicle 250 and/or a region directly in front of vehicle 250.

At some angles, region of operation 275 of the sensor may include rear wheels 276A, 276B of trailer 270. Thus, the sensor may measure rear wheel 276A and/or rear wheel 276B during operation. For example, rear wheels 276A, 276B may reflect lidar signals or radar signals transmitted by the sensor. The sensor may receive the reflected signals from rear wheels 276A, 276. Therefore, the data collected by the sensor may include data from the reflections off the wheel.

In some instances, such as when the sensor is a radar, the reflections from rear wheels 276A, 276B may appear as noise in the received radar signals. Consequently, the radar may operate with an enhanced signal to noise ratio in instances where rear wheels 276A, 276B direct radar signals away from the sensor.

Figure 3:
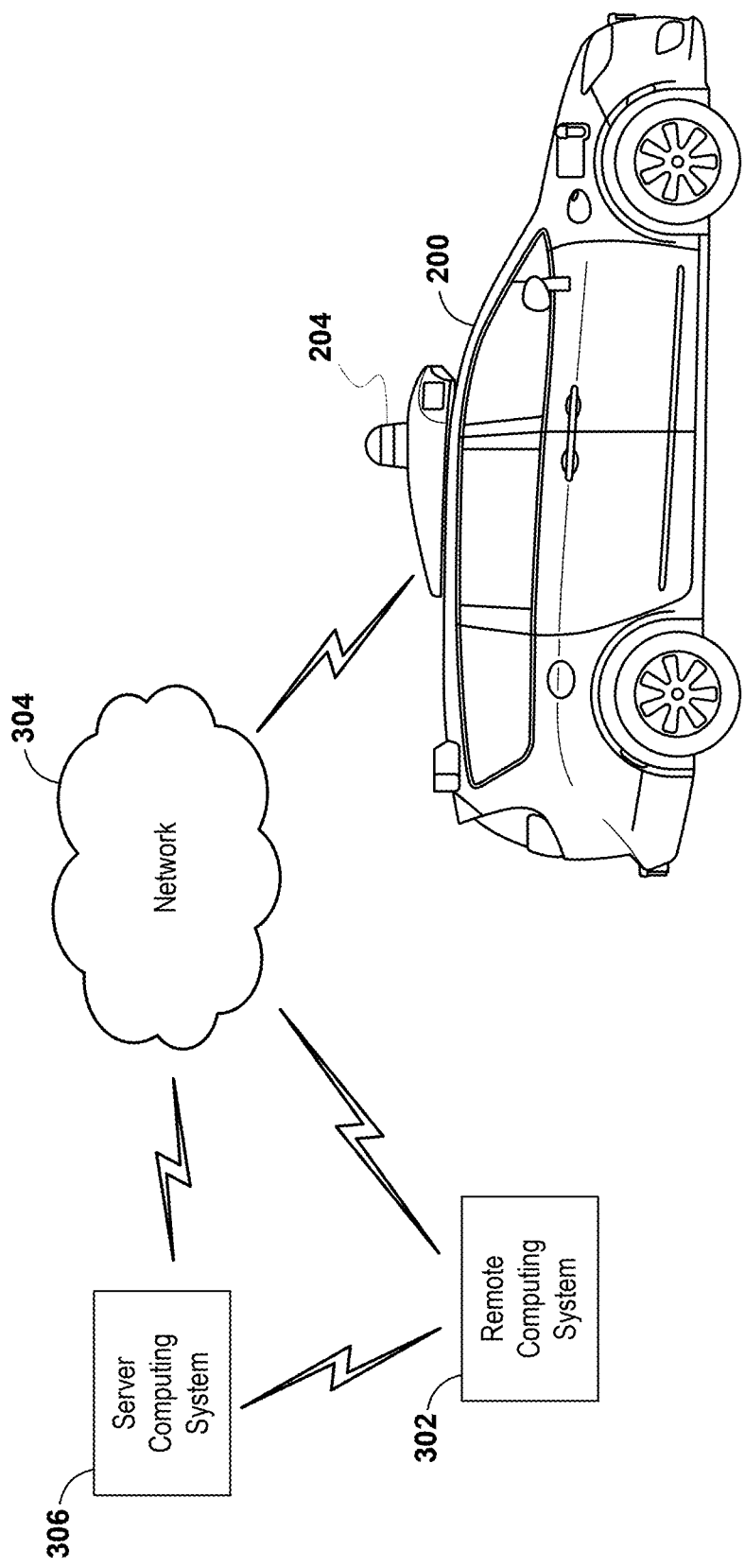
FIG. 3 is a conceptual illustration of wireless communication between various computing systems related to an autonomous or semi-autonomous vehicle, according to example embodiments.

FIG. 3 is a conceptual illustration of wireless communication between various computing systems related to an autonomous or semi-autonomous vehicle, according to example embodiments. In particular, wireless communication may occur between remote computing system 302 and vehicle 200 via network 304. Wireless communication may also occur between server computing system 306 and remote computing system 302, and between server computing system 306 and vehicle 200.

Vehicle 200 can correspond to various types of vehicles capable of transporting passengers or objects between locations, and may take the form of any one or more of the vehicles discussed above. In some instances, vehicle 200 may operate in an autonomous or semi-autonomous mode that enables a control system to safely navigate vehicle 200 between destinations using sensor measurements. When operating in an autonomous or semi-autonomous mode, vehicle 200 may navigate with or without passengers. As a result, vehicle 200 may pick up and drop off passengers between desired destinations.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some embodiments, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a computing system (e.g., remote computing system 302, server computing system 306, or a computing system local to vehicle 200) may operate to use a camera to capture images of the surrounding environment of an autonomous or semi-autonomous vehicle. In general, at least one computing system will be able to analyze the images and possibly control the autonomous or semi-autonomous vehicle.

In some embodiments, to facilitate autonomous or semi-autonomous operation, a vehicle (e.g., vehicle 200) may receive data representing objects in an environment surrounding the vehicle (also referred to herein as "environment data") in a variety of ways. A sensor system on the vehicle may provide the environment data representing objects of the surrounding environment. For example, the vehicle may have various sensors, including a camera, a radar, a lidar, a microphone, a radio unit, and other sensors. Each of these sensors may communicate environment data to a processor in the vehicle about information each respective sensor receives.

In one example, a camera may be configured to capture still images and/or video. In some embodiments, the vehicle may have more than one camera positioned in different orientations. Also, in some embodiments, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar may be configured to transmit an electromagnetic signal that will be reflected by various objects near the vehicle, and then capture electromagnetic signals that reflect off the objects. The captured reflected electromagnetic signals may enable the radar (or processing system) to make various determinations about objects that reflected the electromagnetic signal. For example, the distances to and positions of various reflecting objects may be determined. In some embodiments, the vehicle may have more than one radar in different orientations. The radar may be configured to store captured information to a memory for later processing by a processing system of the vehicle. The information captured by the radar may be environment data.

In another example, a lidar may be configured to transmit an electromagnetic signal (e.g., infrared light, such as that from a gas or diode laser, or other possible light source) that will be reflected by target objects near the vehicle. The lidar may be able to capture the reflected electromagnetic (e.g., infrared light) signals. The captured reflected electromagnetic signals may enable the range-finding system (or processing system) to determine a range to various objects. The lidar may also be able to determine a velocity or speed of target objects and store it as environment data.

Additionally, in an example, a microphone may be configured to capture audio of the environment surrounding the vehicle. Sounds captured by the microphone may include emergency vehicle sirens and the sounds of other vehicles. For example, the microphone may capture the sound of the siren of an ambulance, fire engine, or police vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some embodiments it is desirable to transmit the first electromagnetic radiation signal with a signaling mode that requests a response from devices located near the autonomous or semi-autonomous vehicle. The processing system may be able to detect nearby devices based on the responses communicated back to the radio unit and use this communicated information as a portion of the environment data.

In some embodiments, the processing system may be able to combine information from the various sensors in order to make further determinations of the surrounding environment of the vehicle. For example, the processing system may combine data from both radar information and a captured image to determine if another vehicle or pedestrian is in front of the autonomous or semi-autonomous vehicle. In other embodiments, other combinations of sensor data may be used by the processing system to make determinations about the surrounding environment.

While operating in an autonomous mode (or semi-autonomous mode), the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously or semi-autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the surrounding environment (e.g., if there is actually a stop sign or if there is actually no stop sign present), (ii) confirm whether the vehicle's identification of the object is correct, (iii) correct the identification if the identification was incorrect, and/or (iv) provide a supplemental instruction (or modify a present instruction) for the autonomous or semi-autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this, the vehicle may analyze the environment data representing objects of the surrounding environment to determine at least one object having a detection confidence below a threshold. A processor in the vehicle may be configured to detect various objects of the surrounding environment based on environment data from various sensors. For example, in one embodiment, the processor may be configured to detect objects that may be important for the vehicle to recognize. Such objects may include pedestrians, bicyclists, street signs, other vehicles, indicator signals on other vehicles, and other various objects detected in the captured environment data.

The detection confidence may be indicative of a likelihood that the determined object is correctly identified in the surrounding environment, or is present in the surrounding environment. For example, the processor may perform object detection of objects within image data in the received environment data, and determine that at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the surrounding environment in various ways depending on the source of the environment data. In some embodiments, the environment data may come from a camera and be image or video data. In other embodiments, the environment data may come from a lidar. The vehicle may analyze the captured image or video data to identify objects in the image or video data. The methods and apparatuses may be configured to monitor image and/or video data for the presence of objects of the surrounding environment. In other embodiments, the environment data may be radar, audio, or other data. The vehicle may be configured to identify objects of the surrounding environment based on the radar, audio, or other data.

In some embodiments, the techniques the vehicle uses to detect objects may be based on a set of known data. For example, data related to environmental objects may be stored to a memory located in the vehicle. The vehicle may compare received data to the stored data to determine objects. In other embodiments, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other embodiments, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some embodiments, the vehicle may react as if the detected object is present despite the low confidence level. In other embodiments, the vehicle may react as if the detected object is not present.

When the vehicle detects an object of the surrounding environment, it may also calculate a confidence associated with the specific detected object. The confidence may be calculated in various ways depending on the embodiment. In one example, when detecting objects of the surrounding environment, the vehicle may compare environment data to predetermined data relating to known objects. The closer the match between the environment data and the predetermined data, the higher the confidence. In other embodiments, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304), and in some embodiments, via a server (e.g., server computing system 306). The human operator of the remote computing system may in turn use the environment data as a basis for responding to the request.

In some embodiments, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of the vehicle (e.g., a speed and/or direction), among other possible adjustments.

In other embodiments, even if the vehicle detects an object having a confidence that meets or exceeds the threshold, the vehicle may operate in accordance with the detected object (e.g., come to a stop if the object is identified with high confidence as a stop sign), but may be configured to request remote assistance at the same time as (or at a later time from) when the vehicle operates in accordance with the detected object.

Figure 4A:
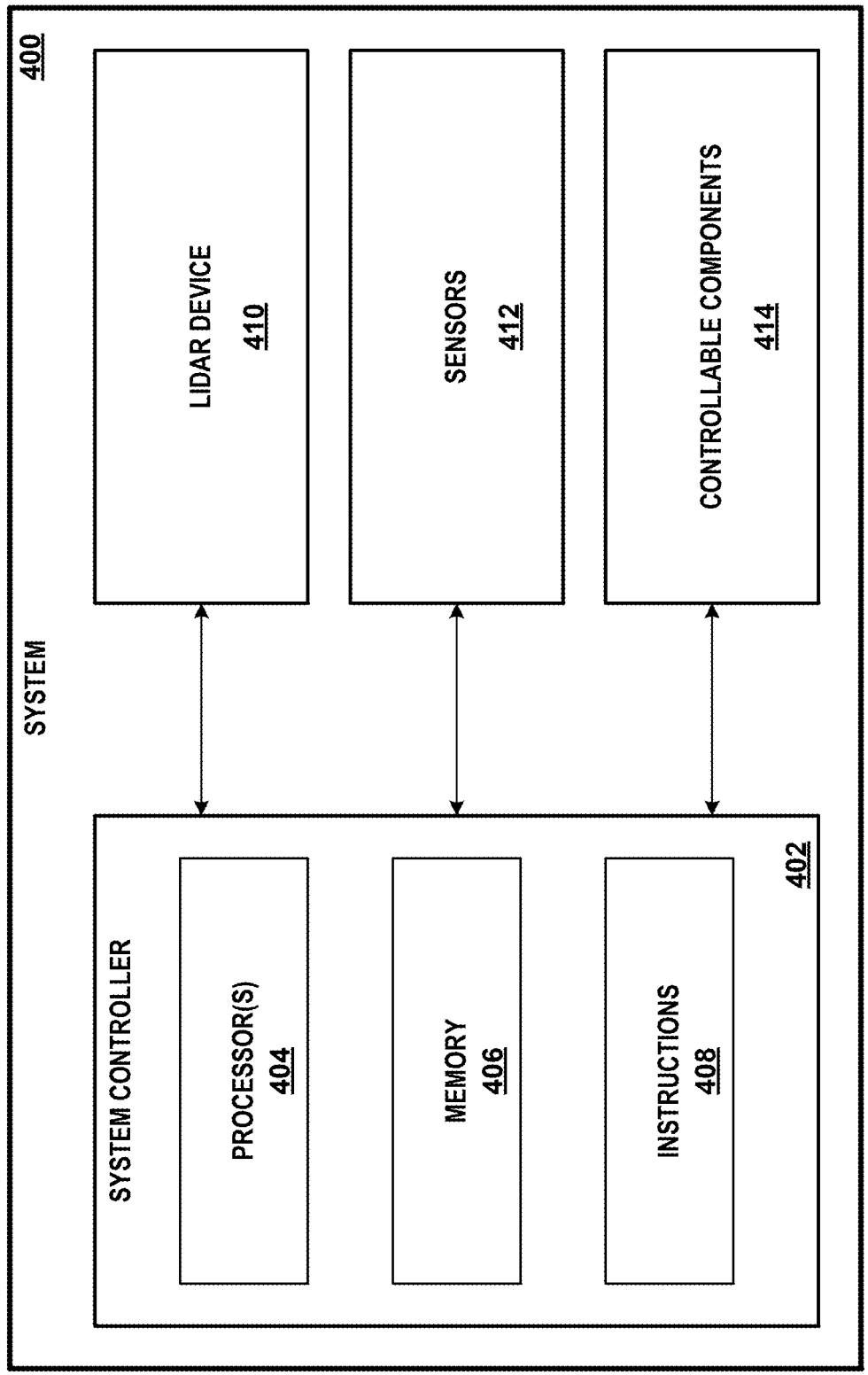
FIG. 4A is a block diagram of a system including a lidar device, according to example embodiments.

FIG. 4A is a block diagram of a system, according to example embodiments. In particular, FIG. 4A shows a system 400 that includes a system controller 402, a lidar device 410, a plurality of sensors 412, and a plurality of controllable components 414. System controller 402 includes processor(s) 404, a memory 406, and instructions 408 stored on the memory 406 and executable by the processor(s) 404 to perform functions.

The processor(s) 404 can include one or more processors, such as one or more general-purpose microprocessors (e.g., having a single core or multiple cores) and/or one or more special purpose microprocessors. The one or more processors may include, for instance, one or more central processing units (CPUs), one or more microcontrollers, one or more graphical processing units (GPUs), one or more tensor processing units (TPUs), one or more ASICs, and/or one or more field-programmable gate arrays (FPGAs). Other types of processors, computers, or devices configured to carry out software instructions are also contemplated herein.

The memory 406 may include a computer-readable medium, such as a non-transitory, computer-readable medium, which may include without limitation, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc.

The lidar device 410, described further below, includes a plurality of light emitters configured to emit light (e.g., in light pulses) and one or more light detectors configured to detect light (e.g., reflected portions of the light pulses). The lidar device 410 may generate three-dimensional (3D) point cloud data from outputs of the light detector(s), and provide the 3D point cloud data to the system controller 402. The system controller 402, in turn, may perform operations on the 3D point cloud data to determine the characteristics of a surrounding environment (e.g., relative positions of objects within a surrounding environment, edge detection, object detection, and proximity sensing).

Similarly, the system controller 402 may use outputs from the plurality of sensors 412 to determine the characteristics of the system 400 and/or characteristics of the surrounding environment. For example, the sensors 412 may include one or more of a GPS, an IMU, an image capture device (e.g., a camera), a light sensor, a heat sensor, and other sensors indicative of parameters relevant to the system 400 and/or the surrounding environment. The lidar device 410 is depicted as separate from the sensors 412 for purposes of example, and may be considered as part of or as the sensors 412 in some examples.

Based on characteristics of the system 400 and/or the surrounding environment determined by the system controller 402 based on the outputs from the lidar device 410 and the sensors 412, the system controller 402 may control the controllable components 414 to perform one or more actions. For example, the system 400 may correspond to a vehicle, in which case the controllable components 414 may include a braking system, a turning system, and/or an accelerating system of the vehicle, and the system controller 402 may change aspects of these controllable components based on characteristics determined from the lidar device 410 and/or sensors 412 (e.g., when the system controller 402 controls the vehicle in an autonomous or semi-autonomous mode). Within examples, the lidar device 410 and the sensors 412 are also controllable by the system controller 402.

Figure 4B:
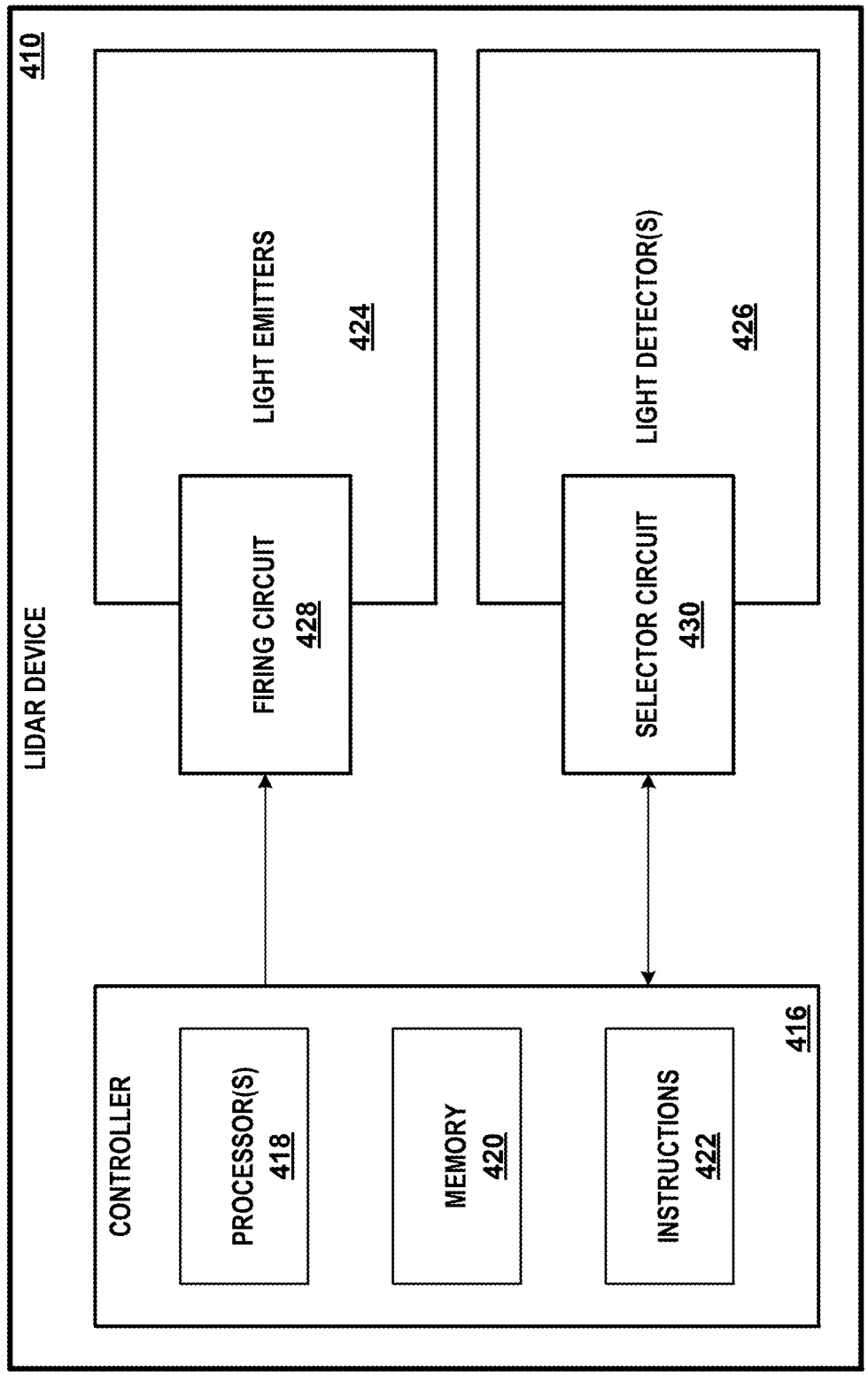
FIG. 4B is a block diagram of a lidar device, according to example embodiments.

FIG. 4B is a block diagram of a lidar device, according to an example embodiment. In particular, FIG. 4B shows a lidar device 410, having a controller 416 configured to control a plurality of light emitters 424 and one or more light detector(s), e.g., a plurality of light detectors 426, etc. The lidar device 410 further includes a firing circuit 428 configured to select and provide power to respective light emitters of the plurality of light emitters 424 and may include a selector circuit 430 configured to select respective light detectors of the plurality of light detectors 426. The controller 416 includes processor(s) 418, a memory 420, and instructions 422 stored on the memory 420.

Similar to processor(s) 404, the processor(s) 418 can include one or more processors, such as one or more general-purpose microprocessors and/or one or more special purpose microprocessors. The one or more processors may include, for instance, one or more CPUs, one or more microcontrollers, one or more GPUs, one or more TPUs, one or more ASICs, and/or one or more FPGAs. Other types of processors, computers, or devices configured to carry out software instructions are also contemplated herein.

Similar to memory 406, the memory 420 may include a computer-readable medium, such as a non-transitory, computer-readable medium, such as, but not limited to, ROM, PROM, EPROM, EEPROM, non-volatile random-access memory (e.g., flash memory), a SSD, a HDD, a CD, a DVD, a digital tape, R/W CDs, R/W DVDs, etc.

The instructions 422 are stored on memory 420 and executable by the processor(s) 418 to perform functions related to controlling the firing circuit 428 and the selector circuit 430, for generating 3D point cloud data, and for processing the 3D point cloud data (or perhaps facilitating processing the 3D point cloud data by another computing device, such as the system controller 402).

The controller 416 can determine 3D point cloud data by using the light emitters 424 to emit pulses of light. A time of emission is established for each light emitter and a relative location at the time of emission is also tracked. Aspects of a surrounding environment of the lidar device 410, such as various objects, reflect the pulses of light. For example, when the lidar device 410 is in a surrounding environment that includes a road, such objects may include vehicles, signs, pedestrians, road surfaces, or construction cones. Some objects may be more reflective than others, such that an intensity of reflected light may indicate a type of object that reflects the light pulses. Further, surfaces of objects may be at different positions relative to the lidar device 410, and thus take more or less time to reflect portions of light pulses back to the lidar device 410. Accordingly, the controller 416 may track a detection time at which a reflected light pulse is detected by a light detector and a relative position of the light detector at the detection time. By measuring time differences between emission times and detection times, the controller 416 can determine how far the light pulses travel prior to being received, and thus a relative distance of a corresponding object. By tracking relative positions at the emission times and detection times the controller 416 can determine an orientation of the light pulse and reflected light pulse relative to the lidar device 410, and thus a relative orientation of the object. By tracking intensities of received light pulses, the controller 416 can determine how reflective the object is. The 3D point cloud data determined based on this information may thus indicate relative positions of detected reflected light pulses (e.g., within a coordinate system, such as a Cartesian coordinate system) and intensities of each reflected light pulse.

The firing circuit 428 is used for selecting light emitters for emitting light pulses. The selector circuit 430 similarly is used for sampling outputs from light detectors.

As described above, a camera system may include multiple cameras and/or sensors, each with different properties based on differences in one or more components of the cameras. For example, each camera may include one or more lenses housed within a lens barrel of the camera. Each camera may also include one or more image sensors. Each image sensor may receive light from the scene via the one or more lenses housed within the lens barrel and a mirror. A camera may also include additional components (e.g., shutter buttons, viewfinders, flashes, batteries, electronic storage for recording captured images, display screens, or selection buttons).

In some embodiments, the lens barrel of one or more of the cameras may be configured to rotate about its axis to modify the relative positions of the one or more lenses within the lens barrel, thereby adjusting a field of view and/or a zoom of the camera. For example, one or more of the components of the camera may be electronically controlled (e.g., a camera controller may adjust one or more of the lenses within the lens barrel to modify a zoom of the camera, such as during an auto-focus procedure).

A camera may only include an image sensor behind one or more lenses (e.g., a telecentric lens). Other arrangements are also possible. In some embodiments, for instance, the camera may include one or more optical filters (e.g., polarization filters, chromatic filters, or neutral-density filters) and/or one or more electronic stages and/or motors configured to adjust the position of one or more components of the camera.

As described previously, in some embodiments, the camera may be used for object detection and avoidance within an autonomous vehicle (e.g., like the camera 130 illustrated and described with reference to FIG. 1). FIGS. 5A-5D illustrate example cameras that may be incorporated (e.g., in various numbers and/or positions) into the camera systems disclosed herein.

Figure 5A:
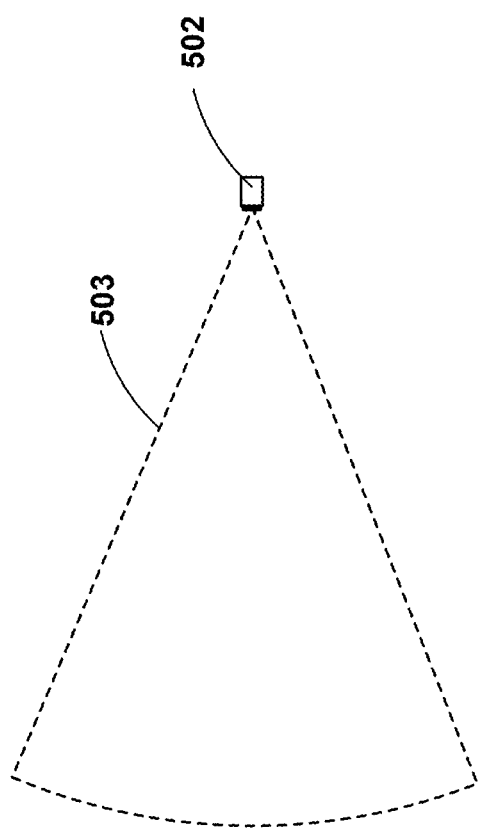
FIG. 5A is an illustration of a camera of a first camera type and associated first field of view, according to example embodiments.

FIG. 5A is an illustration of a camera of a first camera type 502 that has an associated first field of view 503, according to example embodiments. In some embodiments, the camera of the first camera type 502 may be mounted on a vehicle, such as vehicle 100. In some embodiments, images captured by the camera of the first camera type 502 can be used to identify objects at a first range of distances from the vehicle.

Figure 5B:
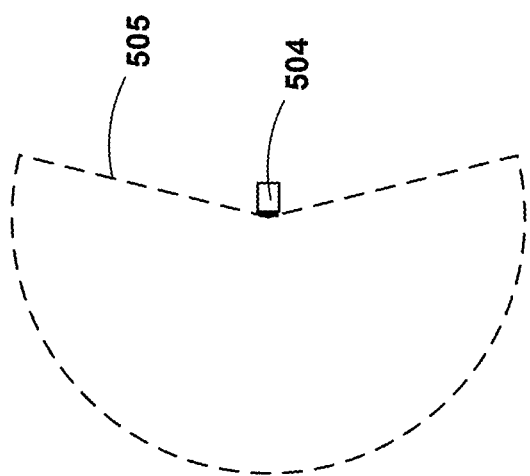
FIG. 5B is an illustration of a camera of a second camera type and associated second field of view, according to example embodiments.
Figure 5C:
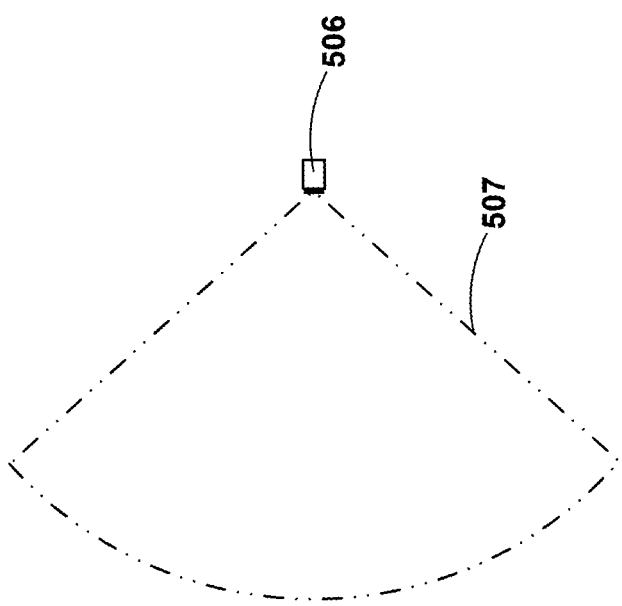
FIG. 5C is an illustration of a camera of a third camera type and associated third field of view, according to example embodiments.

FIG. 5B is an illustration of a camera of a second camera type 504 that has an associated second field of view 505, according to example embodiments. The camera of the second camera type 504 may be mounted on a vehicle, such as vehicle 100. The second field of view 505 may span greater angles in yaw relative to vehicle 100 (e.g., an angular direction about the z-axis) than the first field of view 503. In some embodiments, the second field of view 505 spans at least 170° in yaw relative to vehicle 100. Images captured by the camera of the second camera type 504 may be used to identify objects at a second range of distances from vehicle 100. In some embodiments, the first range of distances includes farther distances from vehicle 100 than are included in the second range of distances FIG. 5C is an illustration of a camera of a third camera type 506 that has an associated third field of view 507, according to example embodiments. The camera of the third camera type 506 may be mounted on a vehicle, such as vehicle 100. In some embodiments, a combined field of view of a plurality of cameras of the third camera type 506 may span 360° in yaw relative to vehicle 100. The first field of view 503 may span fewer angles in yaw relative to vehicle 100 than the third field of view 507. The third field of view 507 may span fewer angles in yaw relative to vehicle 100 than the second field of view 505. Images captured by the camera of the third camera type 506 may be used to identify objects at a third range of distances from vehicle 100. In some embodiments, the third range of distances may include farther distances from vehicle 100 than are included in the second range of distances. The first range of distances may include farther distances from vehicle 100 than are included in the third range of distances.

The camera of the first camera type 502, the camera of the second camera type 504, and/or the camera of the third camera type 506 may have camera lenses with focal lengths in the range from about 1.5 mm to about 25 mm. Further, the camera of the first camera type 502, the camera of the second camera type 504, and/or the camera of the third camera type 506 may have total dynamic ranges less than 120 decibels. The camera of the first camera type 502 may have an image resolution of about 17 megapixels. The camera of the second camera type 504 may have an image resolution of about 2 megapixels. The camera of the third camera type 506 may have an image resolution of about 8 megapixels.

Figure 5D:
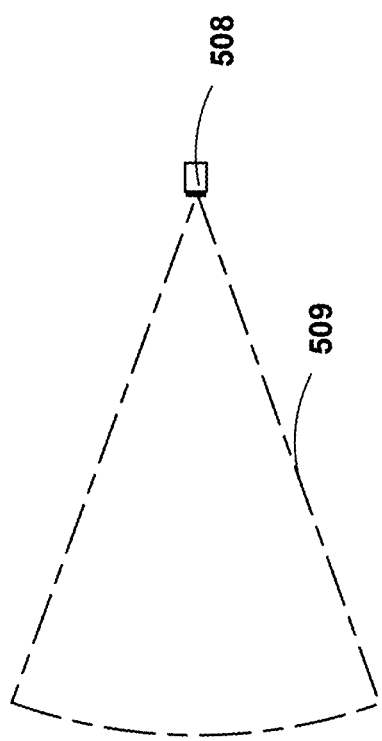
FIG. 5D is an illustration of a camera of a fourth camera type and associated fourth field of view, according to example embodiments.

FIG. 5D is an illustration of a camera of a fourth camera type 508 that has an associated fourth field of view 509, according to example embodiments. The camera of the fourth camera type 508 may be mounted on a vehicle, such as vehicle 100. The fourth field of view 509 may span greater angles in yaw relative to vehicle 100 than the first field of view 503. The fourth field of view 509 may span fewer angles in yaw relative to vehicle 100 than the third field of view 507. Images captured by the camera of the fourth camera type 508 may be used to identify objects at a fourth range of distances from vehicle 100. In some embodiments, the fourth range of distances may include farther distances from vehicle 100 than are included in the third range of distances. The first range of distances may include farther distances from vehicle 100 than are included in the fourth range of distances.

Figure 6A:
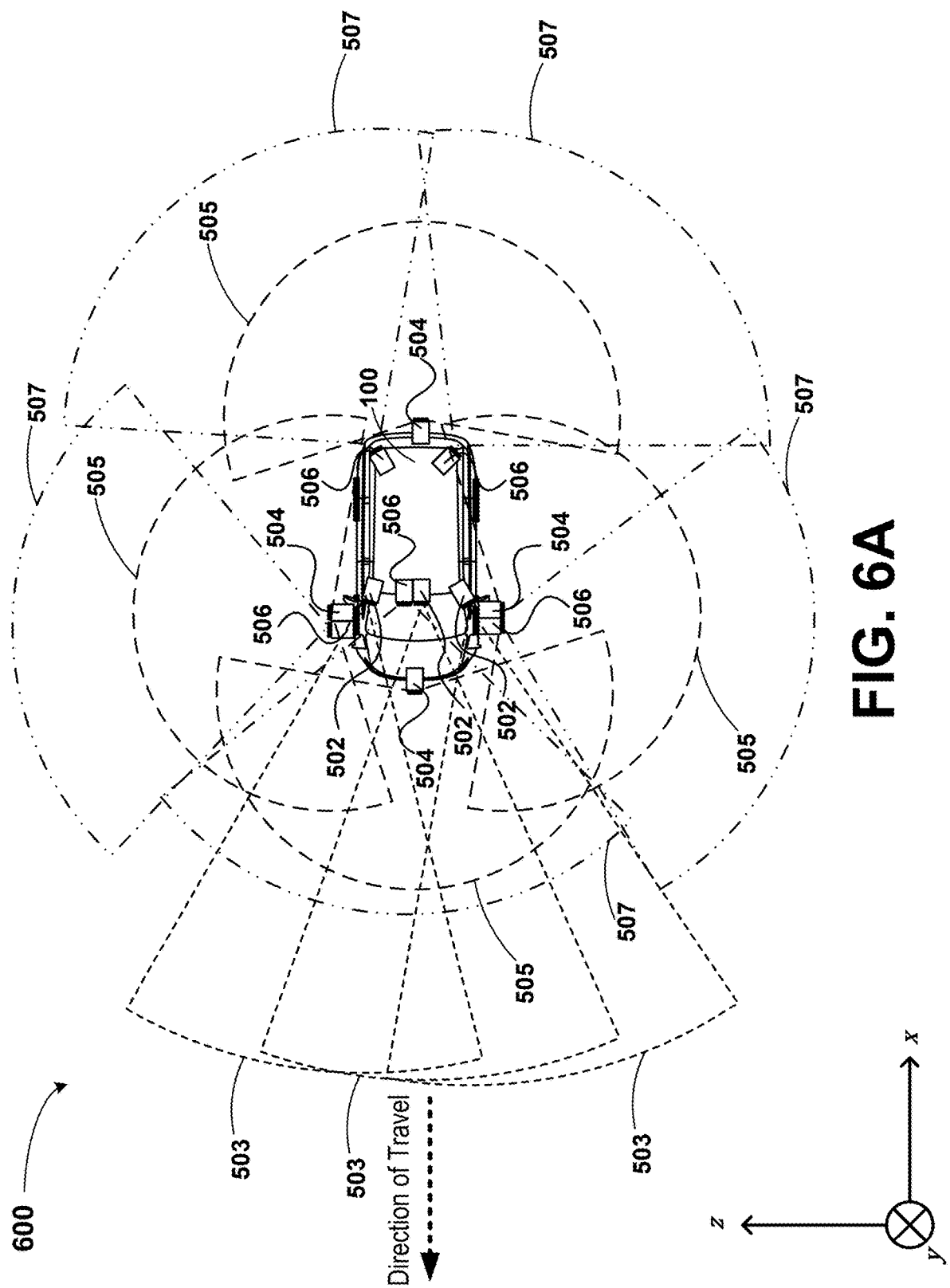
FIG. 6A is an illustration of a camera system, according to example embodiments.

FIG. 6A is an illustration of a camera system 600, according to example embodiments. As illustrated, multiple cameras may be mounted on vehicle 100. As seen in FIG. 6A, in some example embodiments, there may be three cameras of the first camera type 502. Each camera of the first camera type 502 may have an associated first field of view 503. Each of these cameras of the first camera type 502 may be oriented in a forward direction relative to a direction of travel of vehicle 100. While the direction of travel illustrated in FIG. 6A is the negative x-direction, other directions of travel are also possible. For example, the direction of travel may alternatively be the positive x-direction (e.g., the vehicle 100 may be traveling in reverse). Further, other numbers of cameras of the first camera type 502 (e.g., one, two, four, five, etc.) and/or other attachment locations of the camera(s) of the first camera type 502 (e.g., on an underside of vehicle 100 or an inside of vehicle 100) are also possible.

As used herein, the phrase "oriented in the forward direction" means that the central optical axis of the respective field of view is approximately oriented in the forward direction relative to the direction of travel of the vehicle or at least parallel to the forward direction relative to the direction of travel of the vehicle. Similarly, as used herein, the phrase "oriented in the backward direction" means that the central optical axis of the respective field of view is approximately oriented in the backward direction relative to the direction of travel of the vehicle or at least parallel to the backward direction relative to the direction of travel of the vehicle. Further, as used herein, the phrases "one or more sideways directions" and "one or more transverse directions" mean that the central optical axis of the respective field of view is approximately oriented 90° in yaw relative to the direction of travel of the vehicle. Moreover, as used herein, the phrase "oriented at least partially" in the direction means that at least a portion of the field of view overlaps with that direction (but not necessarily the central axis of the respective field of view). For example, "oriented at least partially in the forward direction" means that at least a portion of the field of view overlaps with the forward direction relative to the direction of travel of the vehicle.

As illustrated in FIG. 6A, in some embodiments, the camera system 600 may contain four cameras of the second camera type 504. Each camera of the second camera type 504 may have an associated second field of view 505. One of the cameras of the second camera type 504 may be oriented in the forward direction relative to the direction of travel of vehicle 100. One of the cameras of the second camera type 504 may be oriented in a backward direction relative to the direction of travel of vehicle 100. Two cameras, each a camera of the second camera type 504, may be oriented in one or more sideways directions (e.g., parallel to the y-axis) relative to the direction of travel of vehicle 100. Other numbers of cameras of the second camera type 504 (e.g., one, two, three, or five) and/or other attachment locations of the camera(s) of the second camera type 504 (e.g., on an underside of vehicle 100 or an inside of vehicle 100) are also possible.

As illustrated in FIG. 6A, in some embodiments, the camera system 600 may have five cameras of the third camera type 506. Each camera of the third camera type 506 may have an associated third field of view 507. In some embodiments, a camera of the third camera type 506 may be oriented in the forward direction relative to the direction of travel of vehicle 100. Two cameras, each a camera of the third camera type 506, may be oriented at least partially in the backward direction relative to the direction of travel of vehicle 100. Further, two cameras, each a camera of the third camera type 506, may be oriented in the one or more sideways directions relative to the direction of travel of vehicle 100. Other numbers of cameras of the third camera type 506 (e.g., one, two, three, four, six, etc.) and/or other attachment locations of the camera(s) of the third camera type 506 (e.g., on an underside of vehicle 100 or an inside of vehicle 100) are also possible.

A camera of the first camera type 502 may be attached to the vehicle adjacent to a camera of the third camera type 506. As used herein, the phrase "adjacent to" means within 10 centimeters of. However, in some embodiments, cameras may be closer or farther from each other (e.g., within 1 meter of one another or within 1 centimeter of one another). In addition, two cameras of the second camera type 504 may each be attached to vehicle 100 adjacent to a camera of the third camera type 506. Using fewer cameras in a camera system may increase the speed with which such a camera system can detect and/or recognize objects (e.g., because the camera system would process less data to make a determination, since fewer cameras are used to capture images). FIG. 6A depicts a substantial amount of information. As such, for clarity, FIGS. 6B-6D are provided to illustrate the camera system 600 of FIG. 6A, but with all but one of the camera types removed from the drawing (e.g., to remove clutter).

Figure 6B:
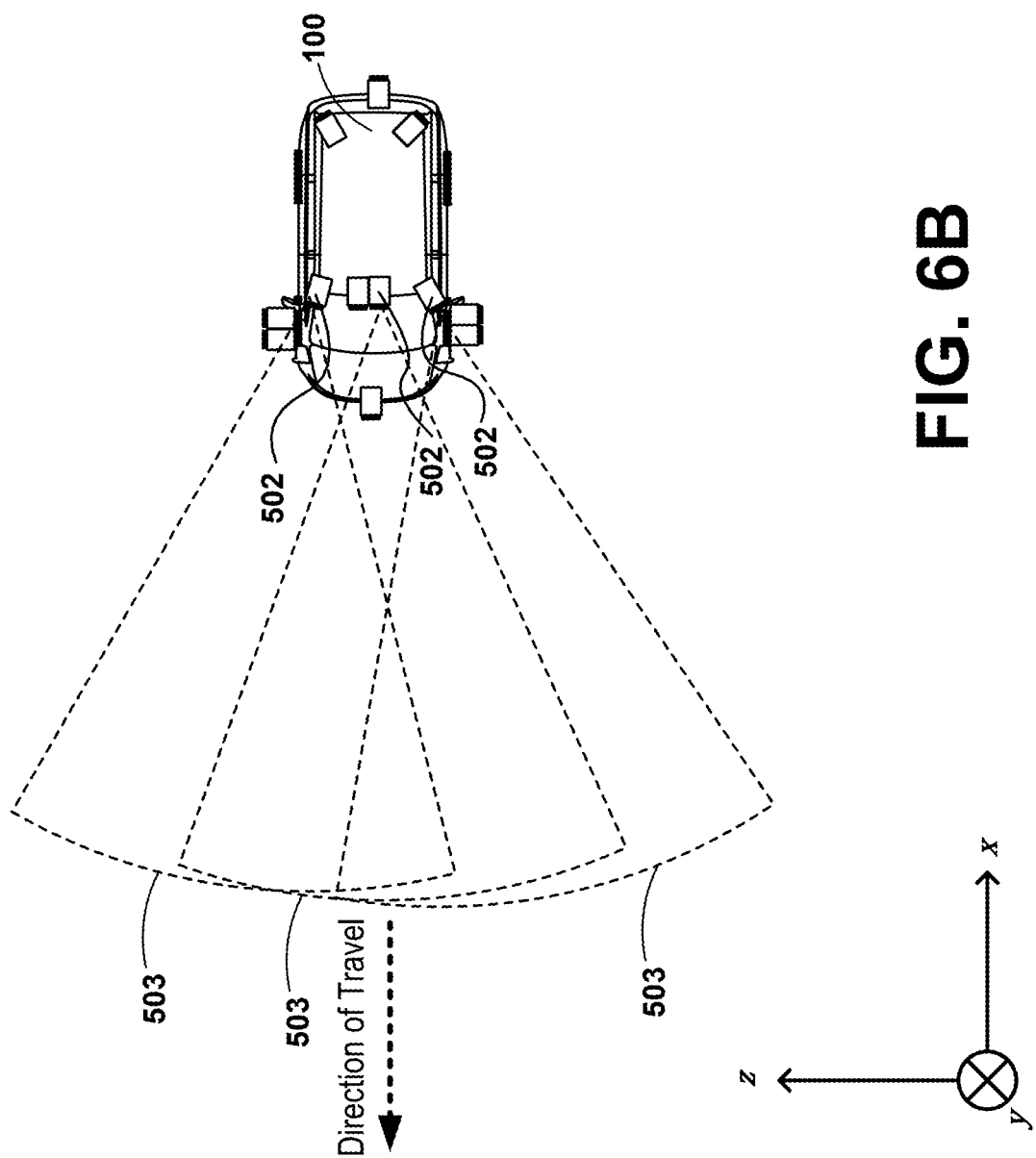
FIG. 6B is a simplified illustration of the camera system of FIG. 6A showing the cameras of the first camera type of the camera system, according to example embodiments.

FIG. 6B is a simplified illustration of the camera system 600 of FIG. 6A, showing the cameras of the first camera type 502 of the camera system 600, according to example embodiments. Each of the cameras of the first camera type 502 may be mounted on the roof of vehicle 100. Doing so may allow objects at farther distances from vehicle 100 to be captured by the camera system 600. Other attachment locations (e.g., above or within a tire well or near a sideview mirror) are also possible. Two cameras of the first camera type 502 may be oriented at least partially in the forward direction relative to the direction of travel of vehicle 100. Doing so may provide a combined field of view that spans greater angles in yaw relative to vehicle 100, thereby facilitating detection of objects that may enter the forward-moving path of vehicle 100.

Figure 6C:
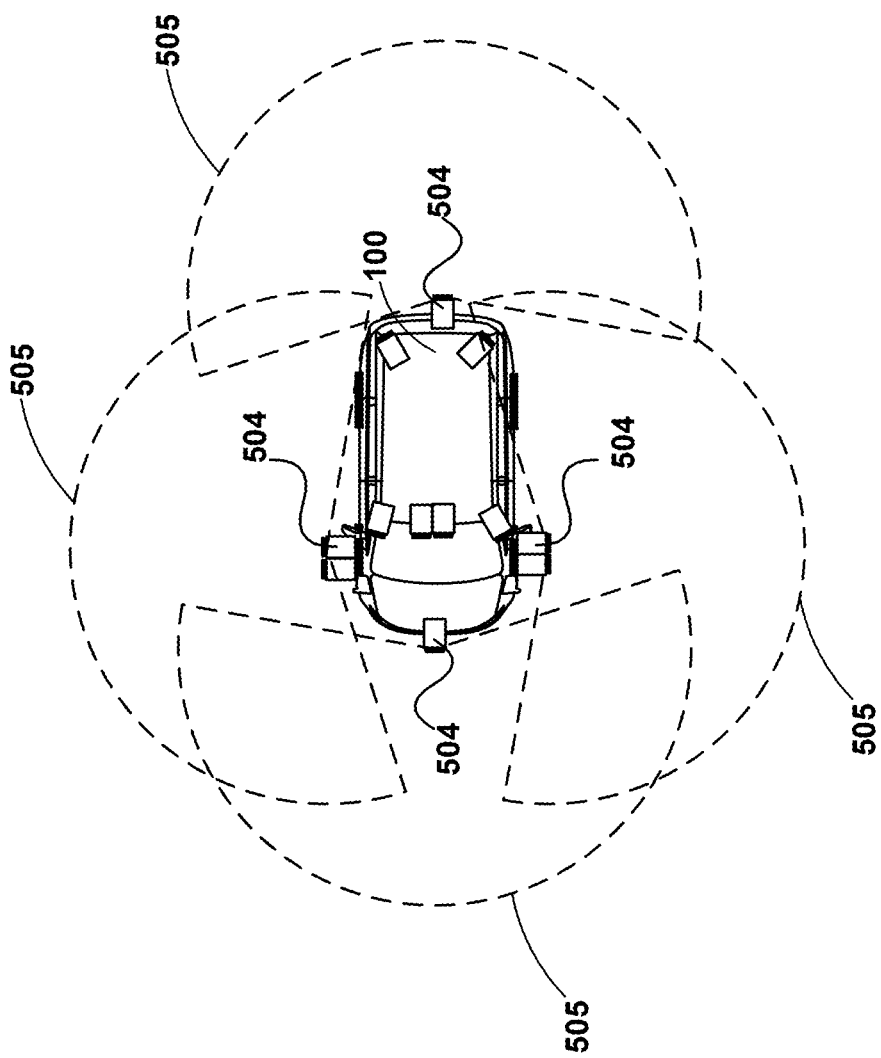
FIG. 6C is a simplified illustration of the camera system of FIG. 6A showing the cameras of the second camera type of the camera system, according to example embodiments.

FIG. 6C is a simplified illustration of the camera system 600 of FIG. 6A, showing the cameras of the second camera type 504 of the camera system 600, according to example embodiments. According to FIG. 6C, there may be four cameras of the second camera type 504. As can be seen from FIG. 6A, the combined field of view for the cameras of the second camera type 504 may span 360° in yaw relative to vehicle 100. Doing so may facilitate the detection of objects located close to vehicle 100 in the area surrounding vehicle 100. One of the cameras of the second camera type 504 may be attached to a front bumper of vehicle 100. One of the cameras of the second camera type 504 may be attached to a rear bumper of vehicle 100. Two of the cameras of the second camera type 504 may be attached to one or more side bumpers of vehicle 100 (e.g., above a front wheel well of vehicle 100). Positioning the cameras of the second camera type 504 in this manner may facilitate the detection of objects that are close to the road surface (e.g., less than 1 meter above the road surface) that may cross the direction of travel of vehicle 100. Other attachment locations (e.g., within a tire well or near a sideview mirror) are also possible.

Figure 6D:
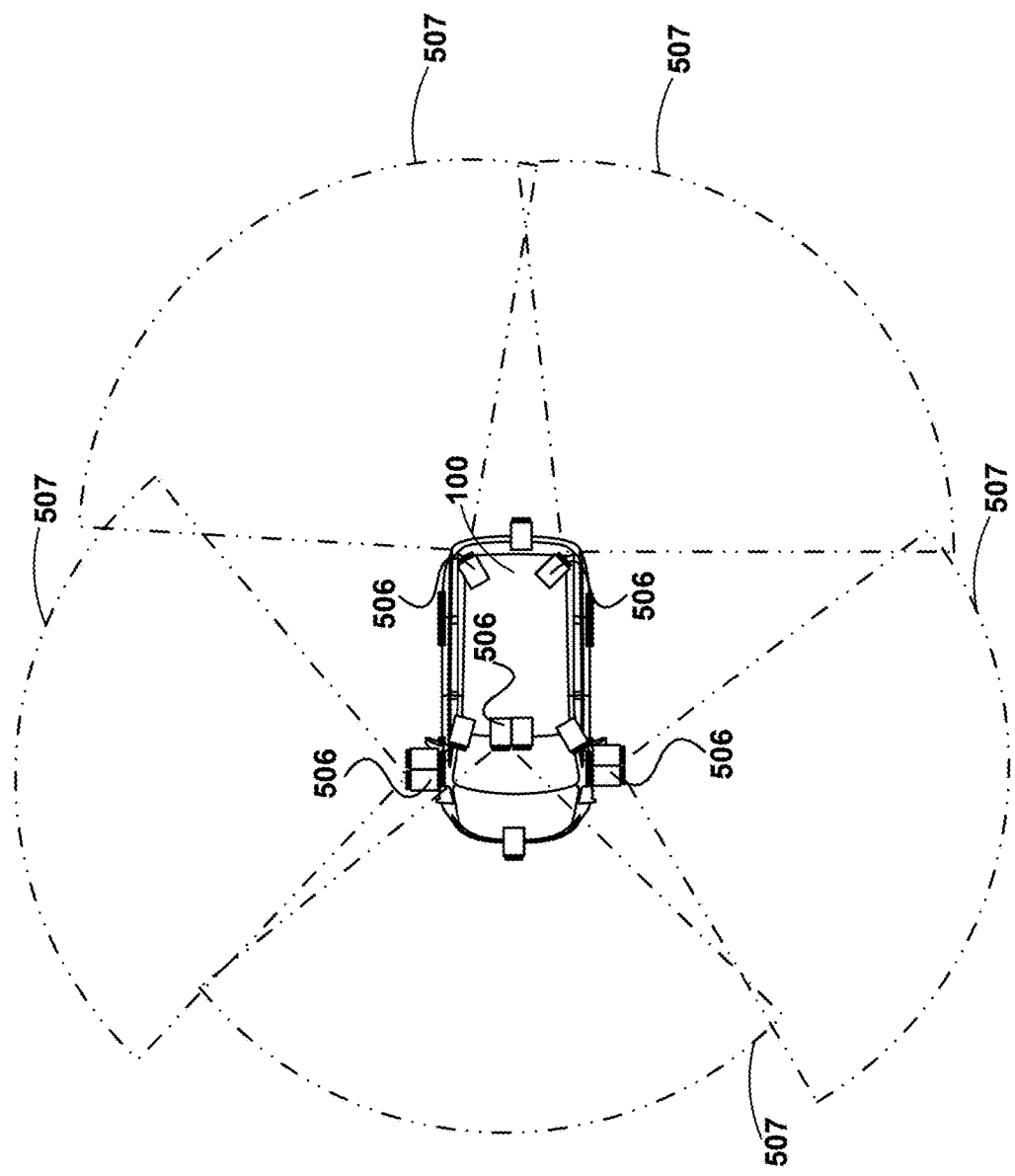
FIG. 6D is a simplified illustration of the camera system of FIG. 6A showing the cameras of the third camera type of the camera system, according to example embodiments.

FIG. 6D is a simplified illustration of the camera system 600 of FIG. 6A, showing the cameras of the third camera type 506 of the camera system 600, according to example embodiments. As can be seen from FIG. 6D there may be five cameras of the third camera type 506 and the combined field of view of the cameras of the third camera type 506 may span 360° in yaw relative to vehicle 100. Three cameras of the third camera type 506 may be attached to the roof of vehicle 100. Two cameras of the third camera type 506 may each be attached to one or more side bumpers of vehicle 100 (e.g., above the front wheel well of vehicle 100). Such a configuration may facilitate detection of objects within the third range of distances that may cross the direction of travel of vehicle 100. Other attachment locations (e.g., within a tire well or near a sideview mirror) are also possible.

Figure 7A:
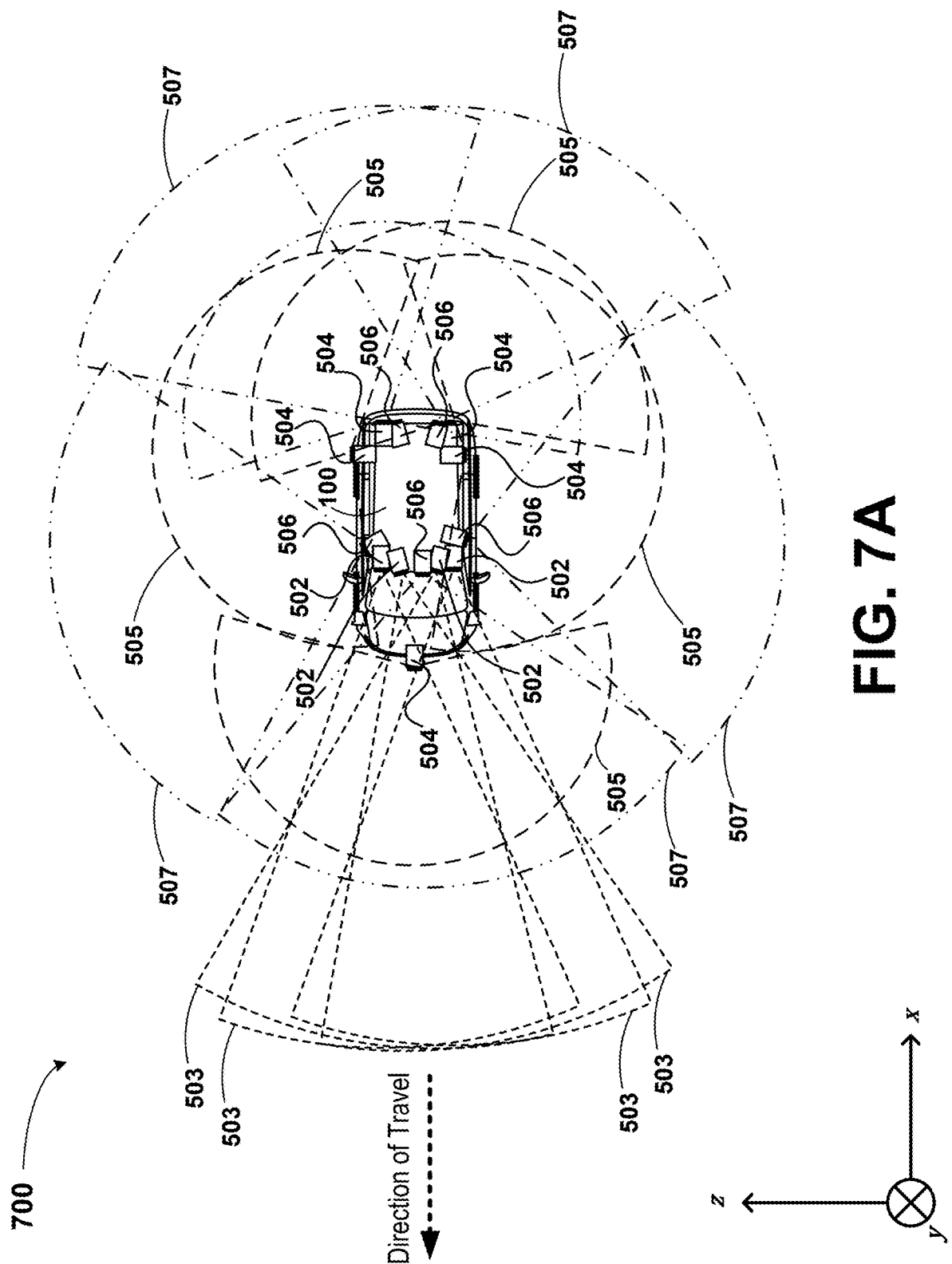
FIG. 7A is an illustration of a camera system, according to example embodiments.

FIG. 7A is an illustration of a camera system 700, according to example embodiments. As can be seen from FIG. 7A, there may be four cameras of the first camera type 502 attached to vehicle 100, each of which have a first field of view 503. Each of the cameras of the first camera type 502 may be oriented at least partially in the forward direction relative to the direction of travel of vehicle 100. The inclusion of more than one camera of the first camera type 502 may facilitate the detection of objects in the forward direction relative to the direction of travel of vehicle 100 because each camera of the first camera type 502 may be able to independently detect objects in the forward direction relative to the direction of travel of vehicle 100. While the direction of travel illustrated in FIG. 7A is the negative x-direction, other directions of travel are also possible. For example, the direction of travel may alternatively be the positive x-direction (e.g., the vehicle 100 may be traveling in reverse). Further, other numbers of cameras of the first camera type 502 (e.g., one, two, four, five, etc.) and/or other attachment locations of the camera(s) of the first camera type 502 (e.g., on an underside of vehicle 100 or an inside of vehicle 100) are also possible.

As seen in FIG. 7A, there may be five cameras of the second camera type 504 attached to vehicle 100, each of which have a second field of view 505. One camera of the second camera type 504 may be oriented in the forward direction relative to the direction of travel of vehicle 100.

Two cameras of the second camera type 504 may each be oriented in one or more sideways directions relative to the direction of travel of vehicle 100. Two cameras of the second camera type 504 may each be oriented in the backward direction relative to the direction of travel of vehicle 100. Such a configuration may facilitate the detection of objects within a second range of distances in the backward direction relative to the direction of travel of vehicle 100 because the field of view for three cameras of the second camera type 504 may overlap in one or more areas behind vehicle 100 and each camera of the second camera type 504 may be able to independently detect objects in the backward direction relative to the direction of travel of vehicle 100. Other numbers of cameras of the second camera type 504 (e.g., one, two, three, four, or six) and/or other attachment locations of the camera(s) of the second camera type 504 (e.g., on an underside of vehicle 100 or an inside of vehicle 100) are also possible.

As also depicted in FIG. 7A, there may also be five cameras of the third camera type 506 attached to vehicle 100, each of which have a third field of view 507. A camera of the third camera type 506 may be oriented in the forward direction relative to the direction of travel of vehicle 100. Two cameras of the third camera type 506 may each be oriented at least partially in the backward direction relative to the direction of travel of vehicle 100. Also, two cameras of the third camera type 506 may each be oriented at least partially in the one or more sideways directions relative to the direction of travel of vehicle 100. Other numbers of cameras of the third camera type 506 (e.g., one, two, three, four, or six) and/or other attachment locations of the camera(s) of the third camera type 506 (e.g., on an underside of vehicle 100 or an inside of vehicle 100) are also possible.

Further, as depicted in FIG. 7A, at least three cameras of the first camera type 502 may each be attached to vehicle 100 adjacent to at least three cameras of the third camera type 506. Moreover, at least two cameras of the second camera type 504 may each be attached to vehicle 100 adjacent to at least two cameras of the third camera type 506. FIG. 7A depicts a substantial amount of information. As such, for clarity, FIGS. 7B-7D are provided to illustrate the camera system 700 of FIG. 7A, but with all but one of the camera types removed from the drawing (e.g., to remove clutter).

Figure 7B:
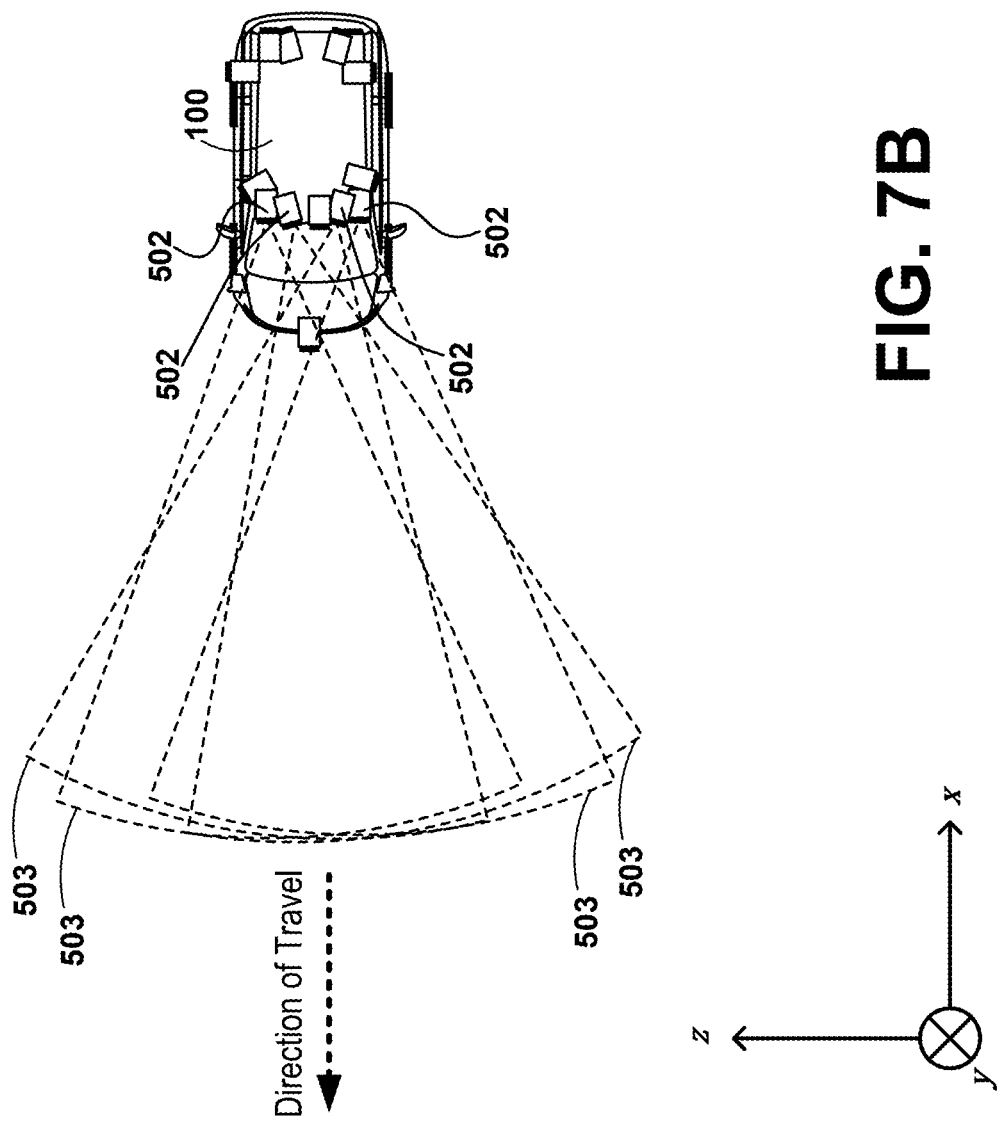
FIG. 7B is a simplified illustration of the camera system of FIG. 7A showing the cameras of the first camera type of the camera system, according to example embodiments.

FIG. 7B is a simplified illustration of the camera system 700 of FIG. 7A showing the cameras of the first camera type 502 of the camera system 700, according to example embodiments. As depicted in FIG. 7B, four cameras of the first camera type 502 may each be attached to the roof of vehicle 100. Other attachment locations (e.g., above or within a tire well or near a sideview mirror) are also possible.

Figure 7C:
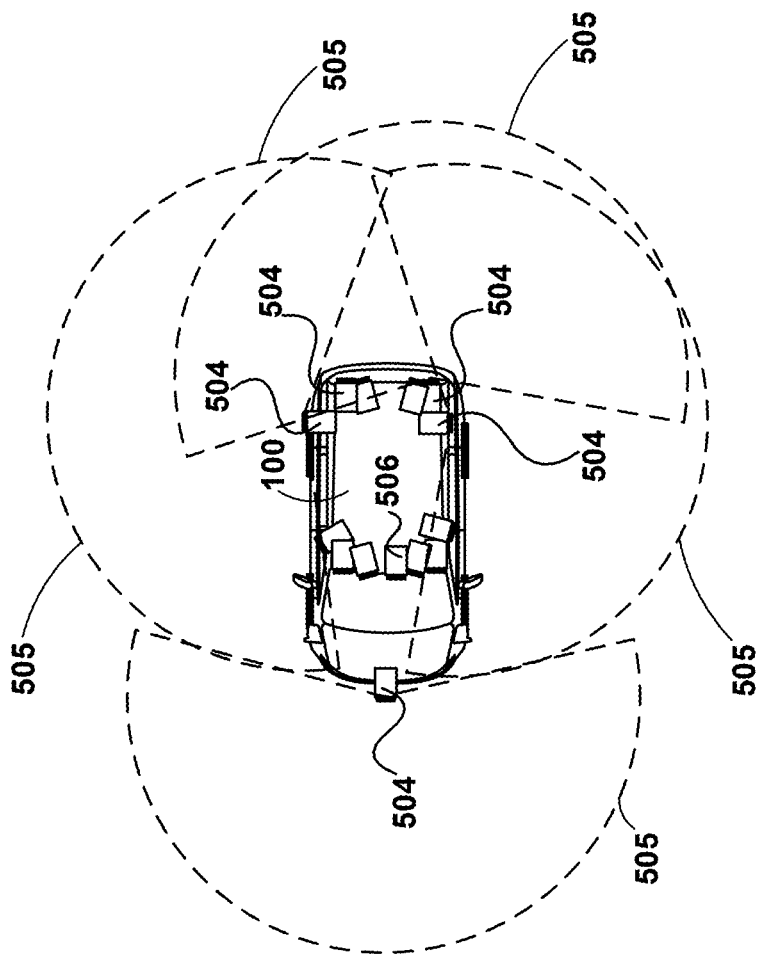
FIG. 7C is a simplified illustration of the camera system of FIG. 7A showing the cameras of the second camera type of the camera system, according to example embodiments.

FIG. 7C is a simplified illustration of the camera system 700 of FIG. 7A showing the cameras of the second camera type 504 of the camera system 700, according to example embodiments. As depicted in FIG. 7C, one camera of the second camera type 504 may be attached to the front bumper of vehicle 100. Further, as depicted in FIG. 7C, four cameras of the second camera type 504 may each be attached to the roof of vehicle 100. Moreover, as depicted in FIG. 7C, two cameras of the second camera type 504 may be attached to the vehicle above the rear wheel wells of vehicle 100. Such a configuration may facilitate the detection of objects within a second range of distances in the backward direction relative to the direction of travel of vehicle 100 because the field of view for three cameras of the second camera type 504 may overlap in one or more areas behind vehicle 100 and each camera of the second camera type 504 may be able to independently detect objects within a second range of distances from vehicle 100. Other attachment locations (e.g., above or within a tire well or near a sideview mirror) are also possible.

Figure 7D:
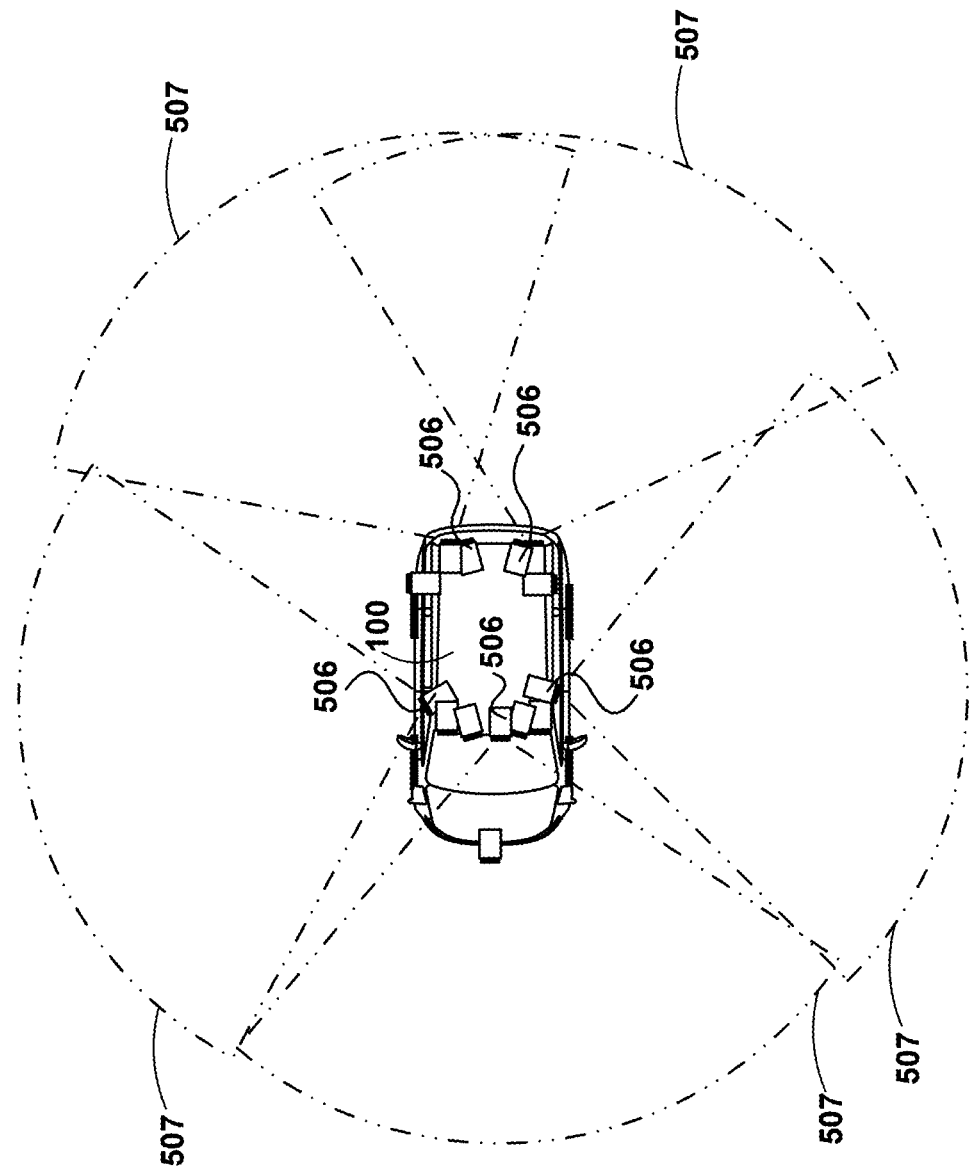
FIG. 7D is a simplified illustration of the camera system of FIG. 7A showing the cameras of the third camera type of the camera system, according to example embodiments.
Figure 7D:
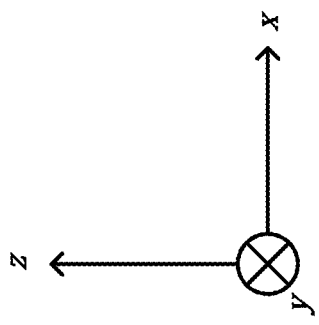

FIG. 7D is a simplified illustration of the camera system 700 of FIG. 7A showing the cameras of the third camera type 506 of the camera system 700, according to example embodiments. As depicted in FIG. 7D, five cameras of the third camera type 506 may be attached to the roof of vehicle 100. Attaching all cameras of the third camera type 506 to the roof may facilitate the detection of objects within a third range of distances and spanning 360° in yaw relative to vehicle 100 because all cameras of the third camera type 506 may be at approximately the same distance from the road surface. If all cameras of the third camera type 506 are at approximately the same distance from the road surface, a computing device, such as the system controller 402, there may be less reason to compensate for a difference in distance from the road surface across cameras of the third camera type 506 when using images captured by the cameras of the third camera type 506 to detect objects within a third range of distances from vehicle 100. Other attachment locations (e.g., above or within a tire well or near a sideview mirror) are also possible.

Figure 8A:
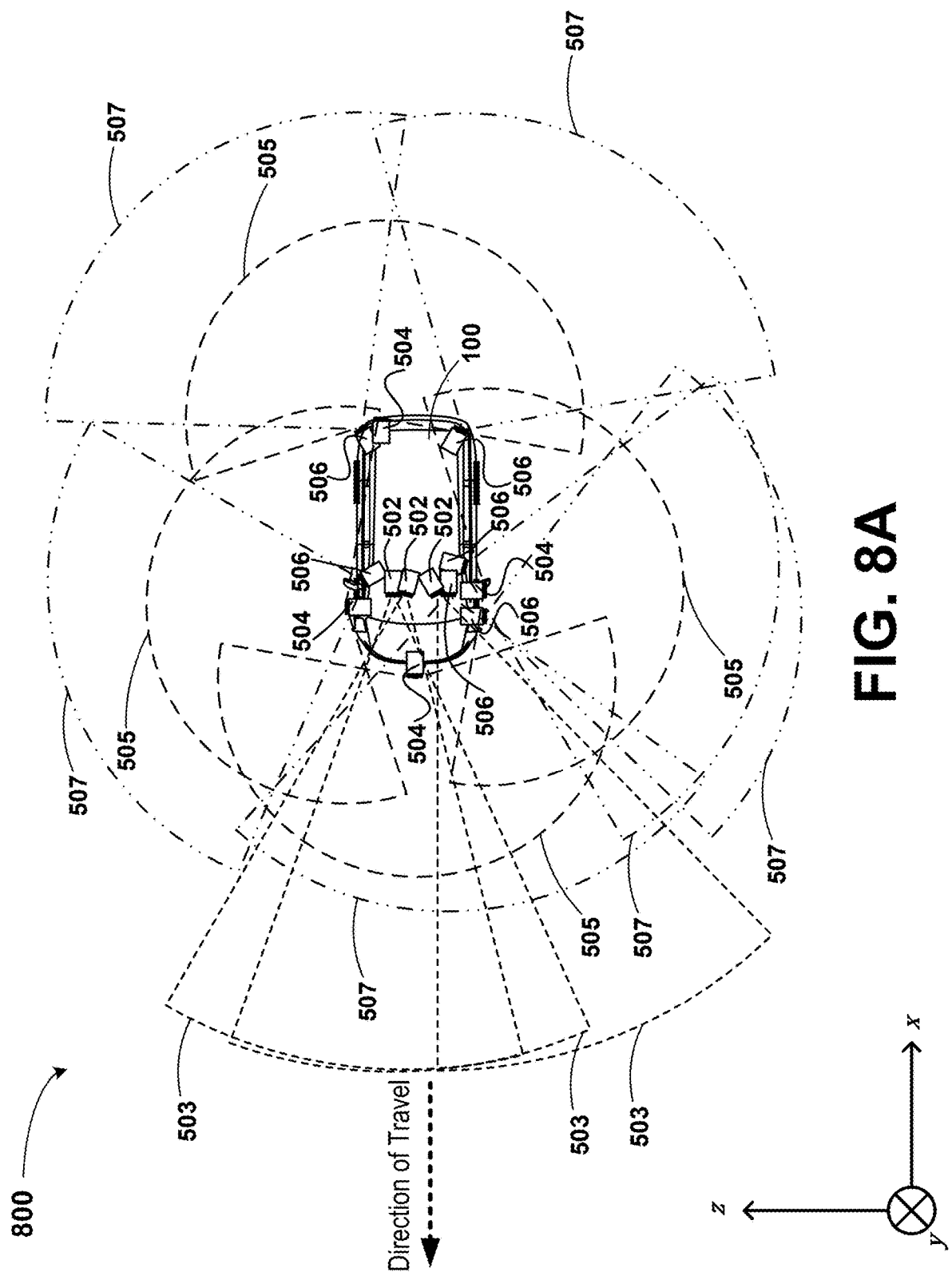
FIG. 8A is an illustration of a camera system, according to example embodiments.

FIG. 8A is an illustration of a camera system 800, according to example embodiments. As depicted in FIG. 8A, there may be three cameras of the first camera type 502 each oriented at least partially in the forward direction relative to the direction of travel of vehicle 100. Each camera of the first camera type 502 may have an associated first field of view 503. While the direction of travel illustrated in FIG. 8A is the negative x-direction, other directions of travel are also possible. For example, the direction of travel may alternatively be the positive x-direction (e.g., the vehicle 100 may be traveling in reverse). Further, other numbers of cameras of the first camera type 502 (e.g., one, two, four, or five) and/or other attachment locations of the camera(s) of the first camera type 502 (e.g., on an underside of vehicle 100 or an inside of vehicle 100) are also possible.

Further, as depicted in FIG. 8A, there may be four cameras of the second camera type 504, each with an associated second field of view 505. One of the cameras of the second camera type 504 may be oriented in the forward direction relative to the direction of travel of vehicle 100. One of the cameras of the second camera type 504 may be oriented in the backward direction relative to the direction of travel of vehicle 100. Two of the cameras of the second camera type 504 may each be oriented in one or more sideways directions relative to the direction of travel of vehicle 100. Other numbers of cameras of the second camera type 504 (e.g., one, two, three, or five) and/or other attachment locations of the camera(s) of the second camera type 504 (e.g., on an underside of vehicle 100 or an inside of vehicle 100) are also possible.

Moreover, as seen in FIG. 8A, there may be six cameras of the third camera type 506, each with an associated third field of view 507. One camera of the third camera type 506 may be oriented in the forward direction relative to the direction of travel of vehicle 100. Two cameras of the third camera type 506 may be oriented at least partially in the backward direction relative to the direction of travel of vehicle 100. Further, three cameras of the third camera type 506 may be each oriented at least partially in the one or more sideways directions relative to the direction of travel of vehicle 100. Such a configuration may facilitate the detection of objects within the third range of distances from vehicle 100 that are located on the one side of vehicle 100 (e.g., the right side of vehicle 100, the left side of vehicle 100, the driver side of vehicle 100, or the passenger side of vehicle 100). A reason for this may be that the field of view for three cameras of the third camera type 506 may overlap in one or more regions on one side of vehicle 100 and each camera of the third camera type 506 may be able to independently detect objects within a third range of distances from vehicle 100. Facilitating the detection of objects within the third range of distances from vehicle 100 may, thereby, facilitate vehicle 100 executing a turning maneuver (e.g., turn to the left or the right). Other numbers of cameras of the third camera type 506 (e.g., one, two, three, four, five, or seven) and/or other attachment locations of the camera(s) of the third camera type 506 (e.g., on an underside of vehicle 100 or an inside of vehicle 100) are also possible.

Further, as can be seen in FIG. 8A, at least one camera of the first camera type 502 can be attached to vehicle 100 adjacent to at least one camera of the third camera type 506. Moreover, at least two cameras of the second camera type 504 can be attached to vehicle 100 adjacent to at least two cameras of the third camera type 506.

Figure 8B:
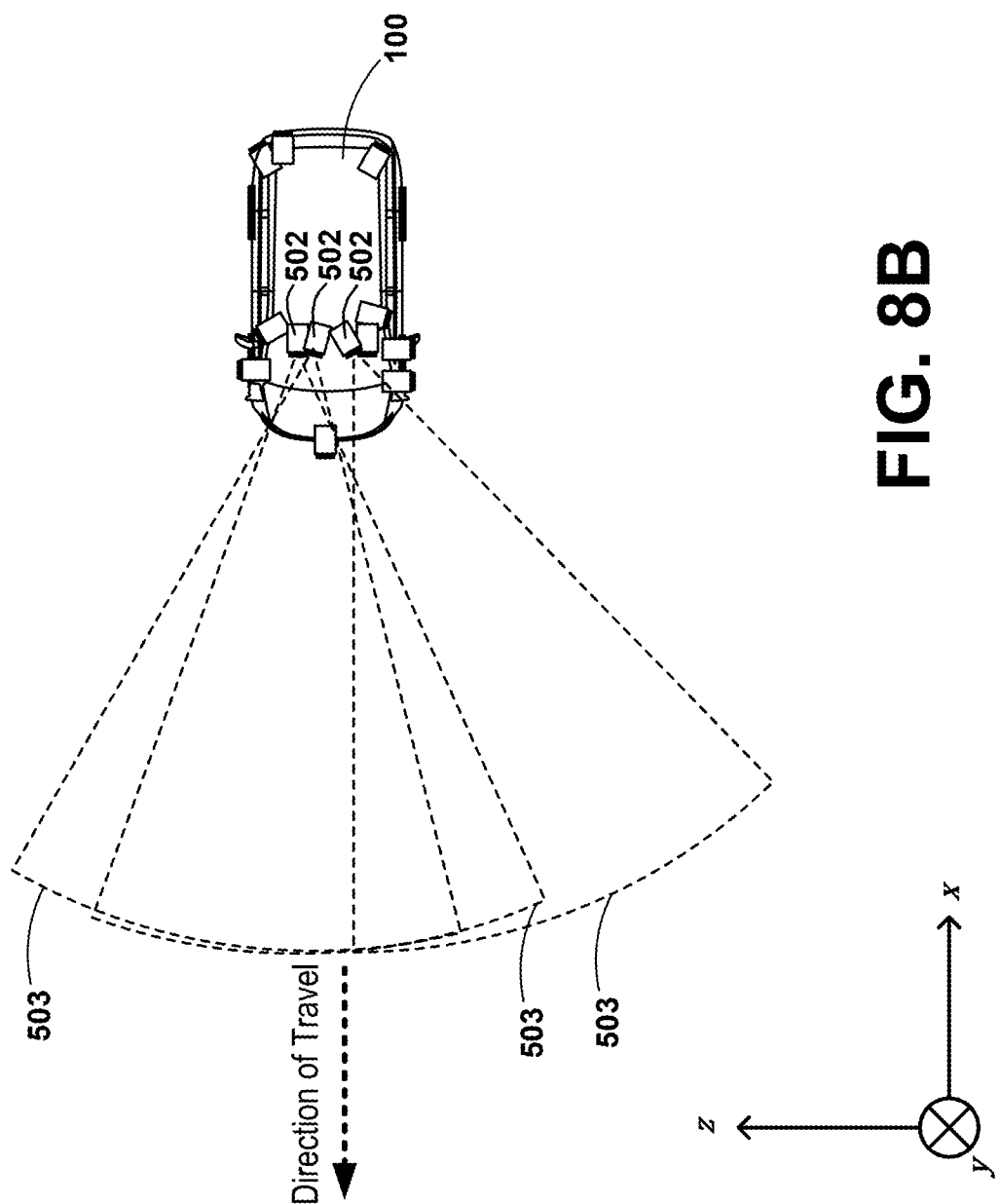
FIG. 8B is a simplified illustration of the camera system of FIG. 8A showing the cameras of the first camera type of the camera system, according to example embodiments.

FIG. 8B is a simplified illustration of the camera system 800 of FIG. 8A showing the cameras of the first camera type 502 of the camera system 800, according to example embodiments. As depicted in FIG. 8B, each of the cameras of the first camera type 502 may be attached to the roof of vehicle 100. Other attachment locations (e.g., above or within a tire well or near a sideview mirror) are also possible.

Figure 8C:
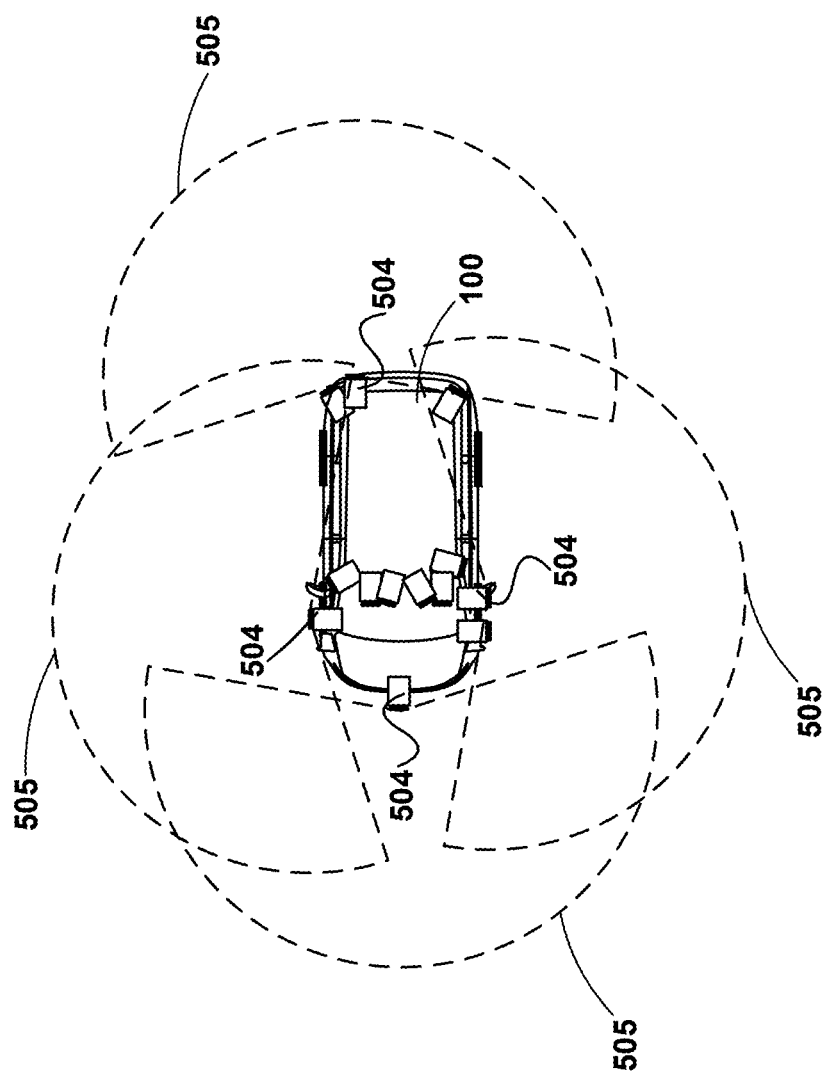
FIG. 8C is a simplified illustration of the camera system of FIG. 8A showing the cameras of the second camera type of the camera system, according to example embodiments.

FIG. 8C is a simplified illustration of the camera system 800 of FIG. 8A showing the cameras of the second camera type 504 of the camera system 800, according to example embodiments. One camera of the second camera type 504 may be attached to the front bumper of vehicle 100. Further, two cameras of the second camera type 504 may each be attached to one or more side bumpers of vehicle 100 (e.g. above one or more wheel wells of vehicle 100). Moreover, one camera of the second camera type 504 may be attached to the roof of vehicle 100. Other attachment locations (e.g., within a tire well or near a sideview mirror) are also possible.

Figure 8D:
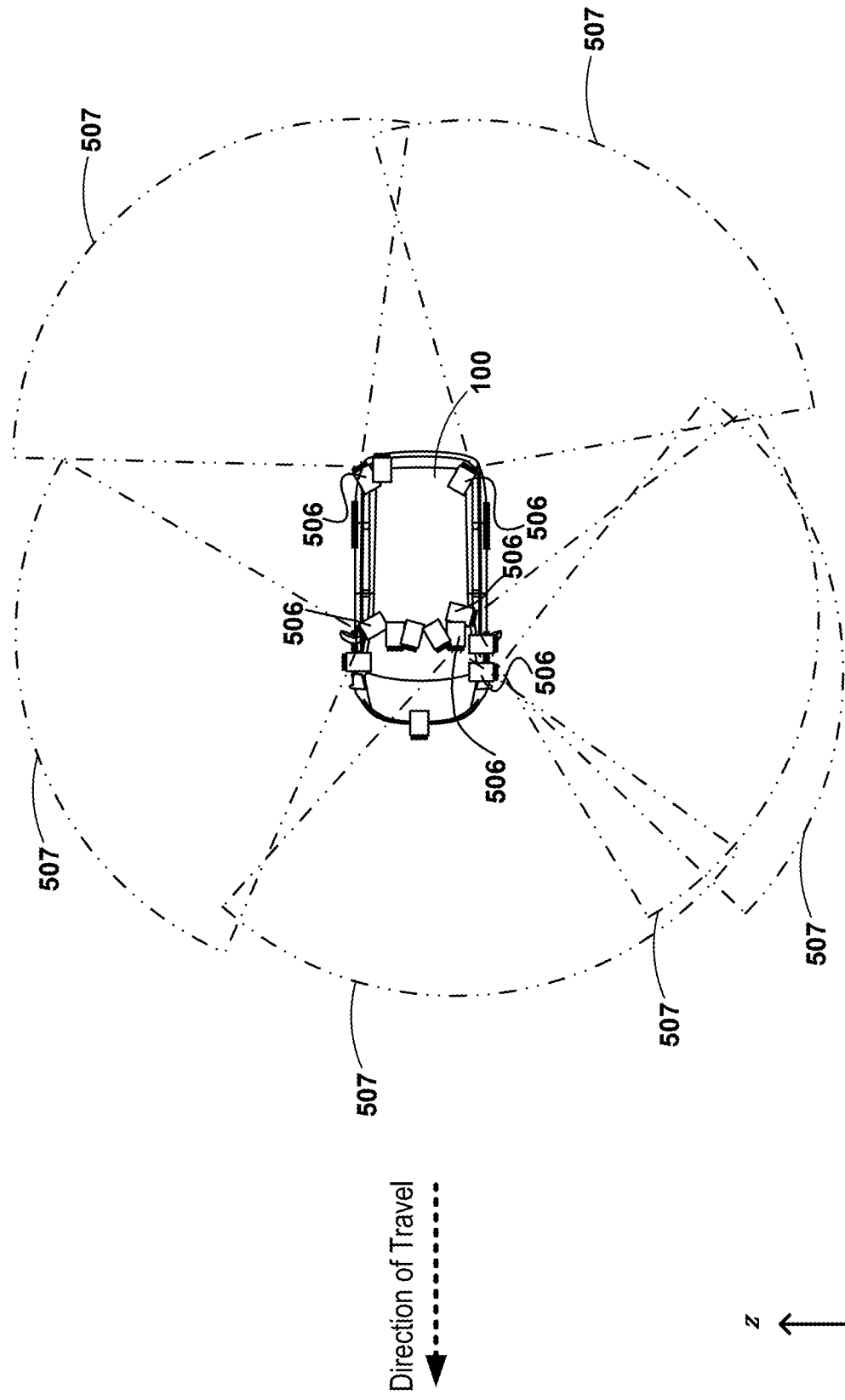
FIG. 8D is a simplified illustration of the camera system of FIG. 8A showing the cameras of the third camera type of the camera system, according to example embodiments.

FIG. 8D is a simplified illustration of the camera system 800 of FIG. 8A showing the cameras of the third camera type 506 of the camera system 800, according to example embodiments. As depicted in FIG. 8D, five cameras of the third camera type 506 can be attached to the roof of vehicle 100. Attaching five cameras of the third camera type 506 to the roof of vehicle 100 may facilitate the detection of objects within a third range of distances and spanning 360° in yaw relative to vehicle 100 because these cameras of the third camera type 506 may be at approximately the same distance from the road surface. If these cameras of the third camera type 506 are at approximately the same distance from the road surface, a computing device, such as the system controller 402, may not need to compensate for a difference in distance from the road surface across cameras of third camera type 506 when using images captured by the cameras of the third camera type 506 to detect objects within a third range of distances from vehicle 100. Further, one camera of the second camera type 504 can be attached to the side bumper of vehicle 100 (e.g. above a front left wheel well of vehicle 100). Other attachment locations (e.g., within a tire well or near a sideview mirror) are also possible.

Figure 9A:
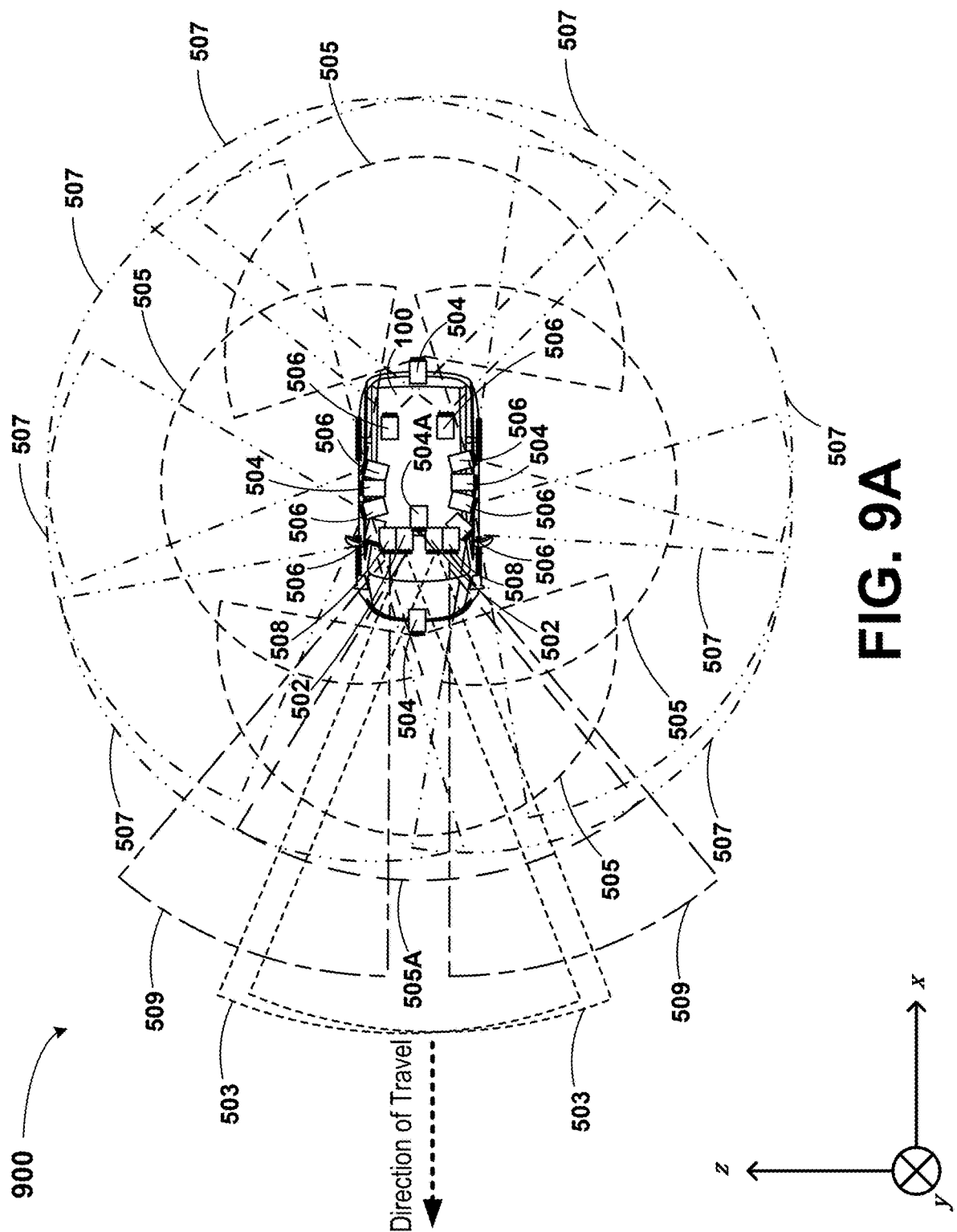
FIG. 9A is an illustration of a camera system, according to example embodiments.

FIG. 9A is an illustration of a camera system 900, according to example embodiments. As depicted in FIG. 9A, there may be two cameras of the first camera type 502, each with an associated first field of view 503. Each camera of the first camera type 502 may be oriented in the forward direction relative to the direction of travel of vehicle 100. While the direction of travel illustrated in FIG. 9A is the negative x-direction, other directions of travel are also possible. For example, the direction of travel may alternatively be the positive x-direction (e.g., the vehicle 100 may be traveling in reverse). Further, other numbers of cameras of the first camera type 502 (e.g., one, three, four, or five) and/or other attachment locations of the camera(s) of the first camera type 502 (e.g., on an underside of vehicle 100 or an inside of vehicle 100) are also possible.

Further, there may be four cameras of the second camera type 504, each with an associated second field of view 505. One camera of the second camera type 504 may be oriented in the forward direction relative to the direction of travel of vehicle 100. Moreover, one camera of the second camera type 504 may be oriented in the backward direction relative to the direction of travel of vehicle 100. In addition, two cameras of the second camera type 504 may be oriented in one or more sideways directions relative to the direction of travel relative to vehicle 100. Further, other numbers of cameras of the second camera type 504 (e.g., one, two, three, or five) and/or other attachment locations of the camera(s) of the second camera type 504 (e.g., on an underside of vehicle 100 or an inside of vehicle 100) are also possible.

As depicted in FIG. 9A, there may be eight cameras of the third camera type 506, each with an associated third field of view 507. Of these, two cameras of the third camera type 506 may be oriented at least partially in the forward direction relative to the direction or travel of vehicle 100. Further, two cameras of the third camera type 506 may be oriented at least partially in the backward direction relative to the direction of travel of vehicle 100. Moreover, four cameras of the third camera type 506 may each be oriented in one or more sideways directions relative to the direction of travel of vehicle 100. In addition, there may be two cameras of the fourth camera type 508, each with an associated fourth field of view 509. These cameras of the fourth camera type 508 may be oriented at least partially in the forward direction relative to the direction of travel of vehicle 100. Including both cameras of the first camera type 502 and cameras of the fourth camera type 508 oriented in the forward direction or at least partially in the forward direction relative to the direction of travel of vehicle 100 may facilitate detection of objects that are at least partially in the forward direction relative to the direction of travel of vehicle 100. Other numbers of cameras of the third camera type 506 (e.g., one, two, three, four, five, six, seven, or nine) and/or other attachment locations of the camera(s) of the third camera type 506 (e.g., on an underside of vehicle 100 or an inside of vehicle 100) are also possible.

As depicted in FIG. 9A, two cameras of the first camera type 502 may each be attached to vehicle 100 adjacent to a camera of the fourth camera type 508. Each camera of the fourth camera type 508 may also be attached to vehicle 100 adjacent to a camera of the third camera type 506. Further, two cameras of the second camera type 504 may each be attached to vehicle 100 adjacent to two cameras of the third camera type 506.

Figure 9B:
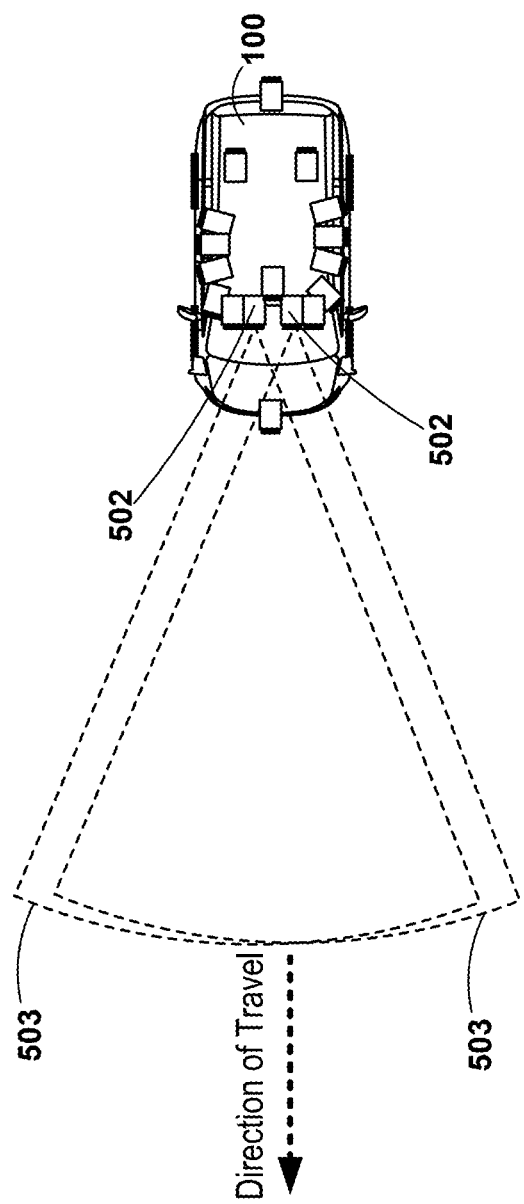
FIG. 9B is a simplified illustration of the camera system of FIG. 9A showing the cameras of the first camera type of the camera system, according to example embodiments.

FIG. 9B is a simplified illustration of the camera system 900 of FIG. 9A showing the cameras of the first camera type 502 of the camera system 900, according to example embodiments. As shown in FIG. 9B, two cameras of the first camera type can be attached to the roof of vehicle 100. Other attachment locations (e.g., above or within a tire well or near a sideview mirror) are also possible.

Figure 9C:
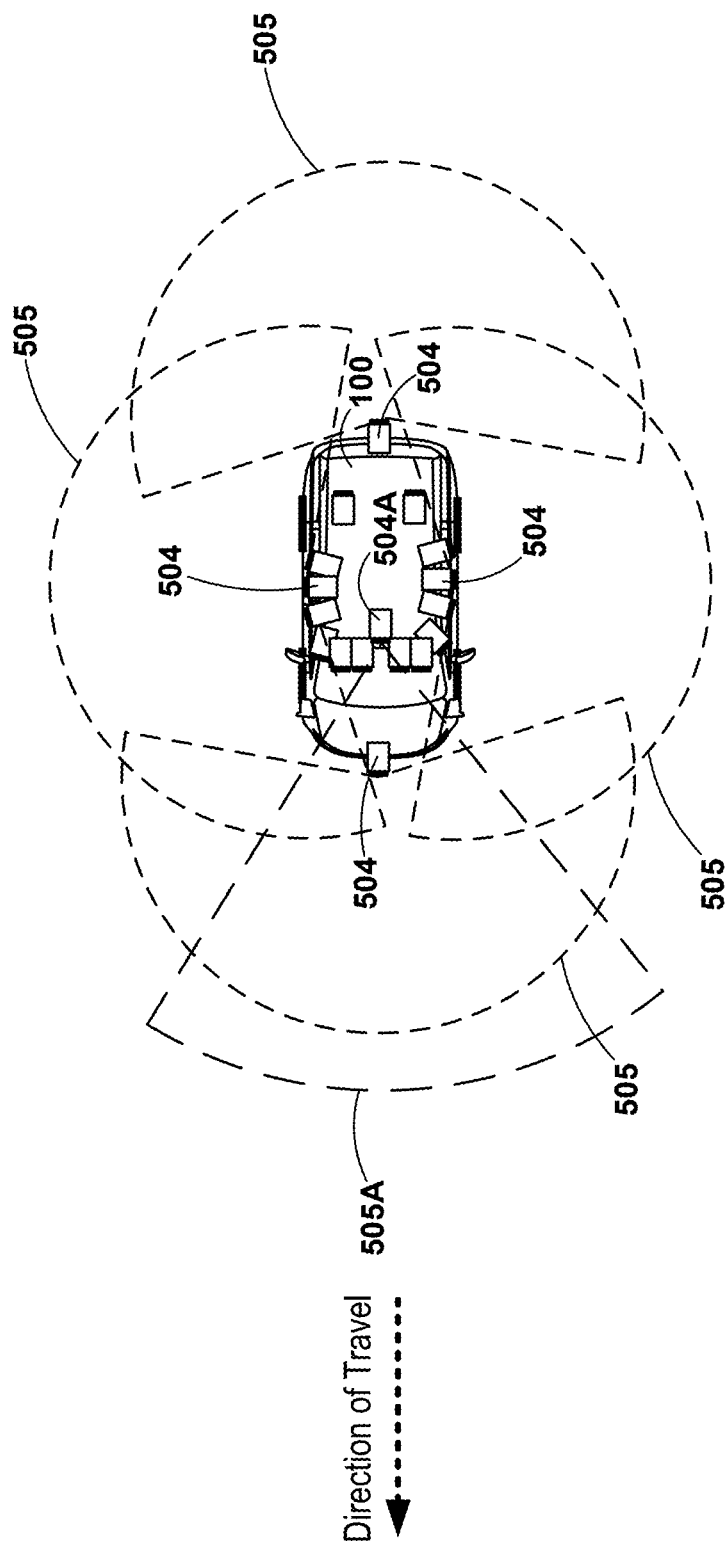
FIG. 9C is a simplified illustration of the camera system of FIG. 9A showing the cameras of the second camera type of the camera system, according to example embodiments.

FIG. 9C is a simplified illustration of the camera system 900 of FIG. 9A showing the cameras of the second camera type 504 of the camera system 900, according to example embodiments. One camera of the second camera type 504 can be attached to the roof of vehicle 100. Further, one camera of the second camera type 504 can be attached to the front bumper of vehicle 100. Moreover, one camera of the second camera type 504 can be attached to the rear bumper of vehicle 100. Other attachment locations (e.g., above or within a tire well or near a sideview mirror) are also possible.

As depicted in FIG. 9C, there may be a first predetermined camera 504A of the plurality of cameras of the second camera type 504 attached to the roof of vehicle 100 with an associated first predetermined camera field of view 505A. The first predetermined camera 504A of the plurality of cameras of the second camera type 504 may be a camera of the second camera type 504 that includes a neutral density filter through which images are captured. The first predetermined camera 504A of the plurality of cameras of the second camera type 504 may be oriented relative to vehicle 100 so as to capture images from pitch angles relative to vehicle 100 (e.g., rotations about the z-axis) of greater than 5° in the forward direction relative to the direction of travel of vehicle 100. Such an orientation can facilitate detection of objects, such as traffic lights, as described in greater detail below. Other attachment locations (e.g., above a tire well or near a sideview mirror) are also possible.

Figure 9D:
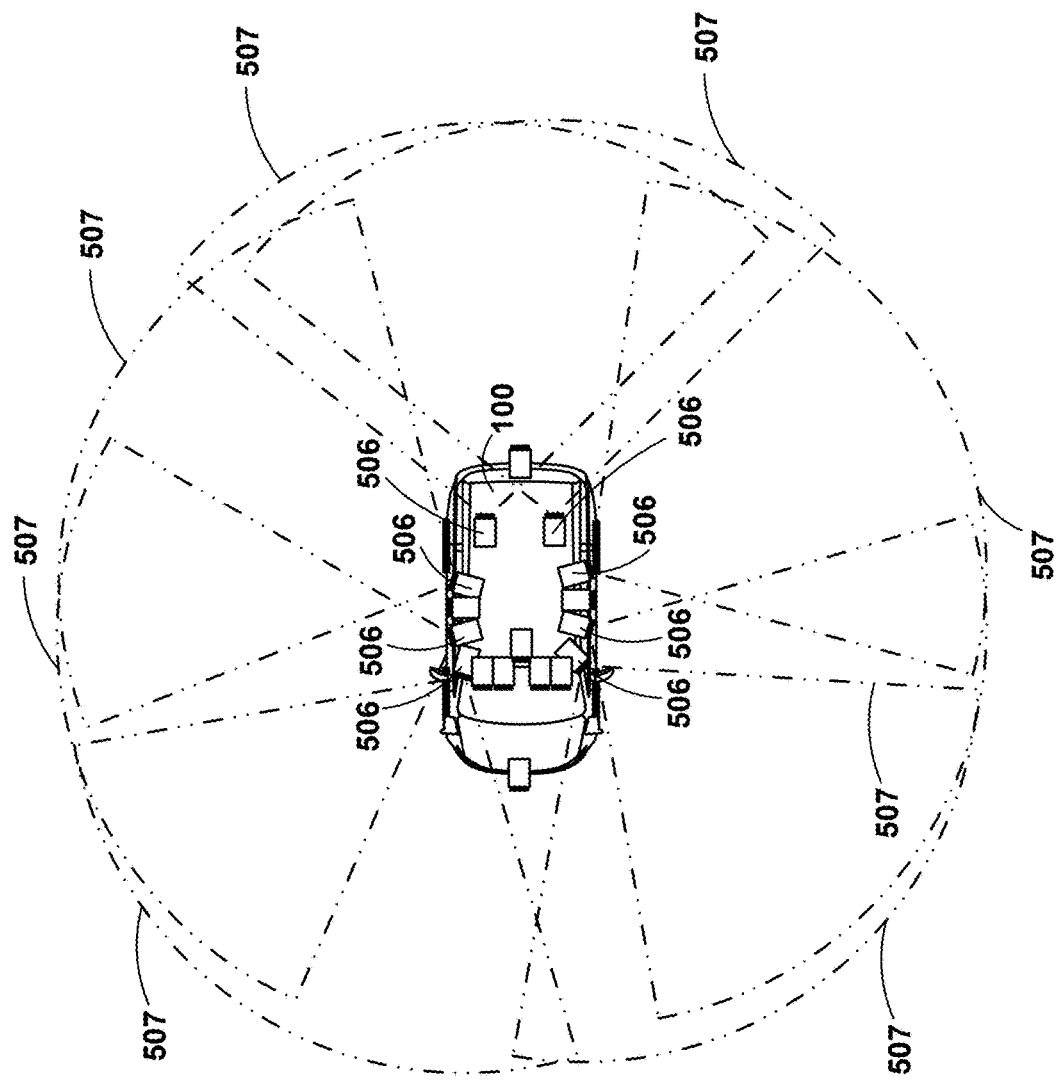
FIG. 9D is a simplified illustration of the camera system of FIG. 9A showing the cameras of the third camera type of the camera system, according to example embodiments.

FIG. 9D is a simplified illustration of the camera system 900 of FIG. 9A showing the cameras of the third camera type 506 of the camera system 900, according to example embodiments. As depicted in FIG. 9D, eight cameras of the third camera type 506 may be attached to the roof of vehicle 100. Attaching eight cameras of the third camera type 506 to the roof of vehicle 100 may facilitate the detection of objects within a third range of distances and spanning 360° in yaw relative to vehicle 100 because these cameras of the third camera type 506 may be at approximately the same distance from the road surface. If these cameras of the third camera type 506 are at approximately the same distance from the road surface, a computing device, such as the system controller 402, may not need to compensate for a difference in distance from the road surface across cameras of third camera type 506 when using images captured by the cameras of the third camera type 506 to detect objects within a third range of distances from vehicle 100. Other attachment locations (e.g., above or within a tire well or near a sideview mirror) are also possible. Such a configuration may facilitate detection of objects within the third range of distances from vehicle 100 spanning 360° in yaw relative to vehicle 100 because the field of view for two or more cameras of the third camera type 506 may overlap through an area spanning 360° in yaw relative to vehicle 100 and each camera of the third camera type 506 may be able to independently detect objects within a third range of distances from vehicle 100.

Figure 9E:
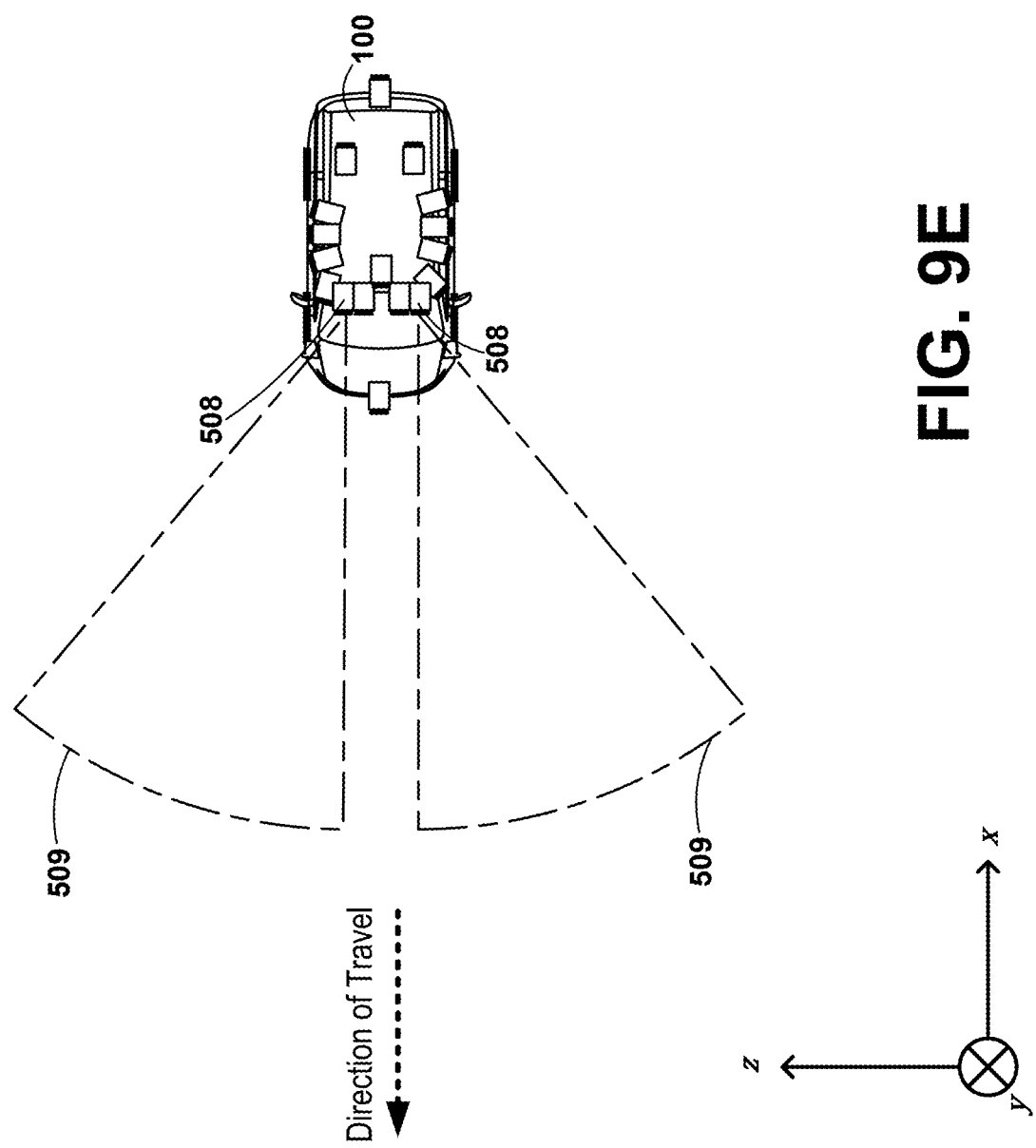
FIG. 9E is a simplified illustration of the camera system of FIG. 9A showing the cameras of the fourth camera type of the camera system, according to example embodiments.

FIG. 9E is a simplified illustration of the camera system 900 of FIG. 9A showing the cameras of the fourth camera type 508 of the camera system 900, according to example embodiments. As depicted in FIG. 9E, two cameras of the fourth camera type 508 may be attached to the roof of vehicle 100. Other attachment locations (e.g., above or within a tire well or near a sideview mirror) are also possible.

Figure 10A:
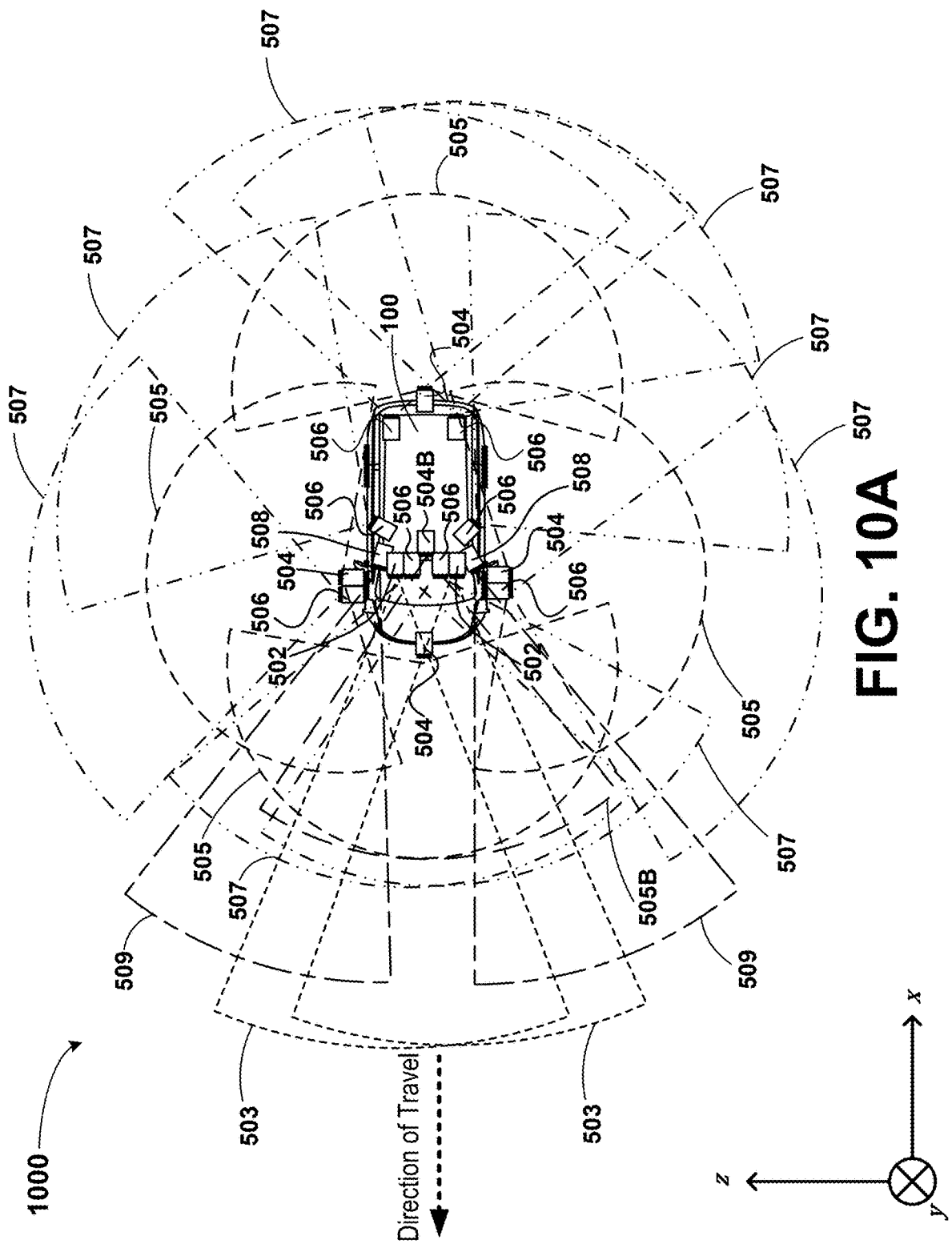
FIG. 10A is an illustration of a camera system, according to example embodiments.

FIG. 10A is an illustration of a camera system 1000, according to example embodiments. As depicted in FIG. 10A, a camera system 1000 may include two cameras of the first camera type 502, each with an associated first field of view 503. Each camera of the first camera type 502 may be oriented in the forward direction relative to the direction of travel of vehicle 100. While the direction of travel illustrated in FIG. 10A is the negative x-direction, other directions of travel are also possible. For example, the direction of travel may alternatively be the positive x-direction (e.g., the vehicle 100 may be traveling in reverse). Further, other numbers of cameras of the first camera type 502 (e.g., one, three, four, or five) and/or other attachment locations of the camera(s) of the first camera type 502 (e.g., on an underside of vehicle 100 or an inside of vehicle 100) are also possible.

Further, as depicted in FIG. 10A, the camera system 1000 may include four cameras of the second camera type 504, each with an associated second field of view 505. One camera of the second camera type 504 may be oriented in the forward direction relative to the direction of travel of vehicle 100. Moreover, one camera of the second camera type 504 may be oriented in the backward direction relative to the direction of travel of vehicle 100. In addition, two cameras of the second camera type 504 may be oriented in one or more sideways directions relative to the direction of travel relative to vehicle 100. Further, other numbers of cameras of the second camera type 504 (e.g., one, two, three, or five) and/or other attachment locations of the camera(s) of the second camera type 504 (e.g., on an underside of vehicle 100 or an inside of vehicle 100) are also possible.

As depicted in FIG. 10A, there may be eight cameras of the third camera type 506, each with an associated third field of view 507. Of these, two cameras of the third camera type 506 may be oriented at least partially in the forward direction relative to the direction or travel of vehicle 100. Further, two cameras of the third camera type 506 may be oriented at least partially in the backward direction relative to the direction of travel of vehicle 100. Moreover, four cameras of the third camera type 506 may each be oriented in one or more sideways directions relative to the direction of travel of vehicle 100. Such a configuration may facilitate detection of objects within the third range of distances from vehicle 100 that enter the rear-moving path of vehicle 100 because the field of view for three cameras of the third camera type 506 may overlap in one or more areas behind vehicle 100 and each camera of the third camera type 506 may be able to independently detect objects within a third range of distances from vehicle 100. Other numbers of cameras of the third camera type 506 (e.g., one, two, three, four, five, six, seven, or nine) and/or other attachment locations of the camera(s) of the third camera type 506 (e.g., on an underside of vehicle 100 or an inside of vehicle 100) are also possible.

In some example embodiments, there may be two cameras of the fourth camera type 508, each with an associated fourth field of view 509. These cameras of the fourth camera type 508 may be oriented at least partially in the forward direction relative to the direction of travel of vehicle 100. Including both cameras of the first camera type 502 and cameras of the fourth camera type 508 oriented in the forward direction or at least partially in the forward direction relative to the direction of travel of vehicle 100 may facilitate detection of objects that are at least partially in the forward direction relative to the direction of travel of vehicle 100. Other numbers of cameras of the fourth camera type 508 (e.g., one, three, or four) and/or other attachment locations of the camera(s) of the fourth camera type 508 (e.g., on an underside of vehicle 100 or an inside of vehicle 100) are also possible.

Further, as depicted in FIG. 10A, at least two cameras of the first camera type 502 may each be attached to vehicle 100 adjacent to a camera of the fourth camera type 508.

Also, at least two cameras of the first camera type 502 may each be attached to vehicle 100 adjacent to a camera of the third camera type 506. Moreover, at least two cameras of the fourth camera type 508 may each be attached to the vehicle adjacent to a camera of the third camera type 506. In addition, at least two cameras of the third camera type 506 may each be attached to the vehicle adjacent to a camera of the second camera type 504.

Figure 10B:
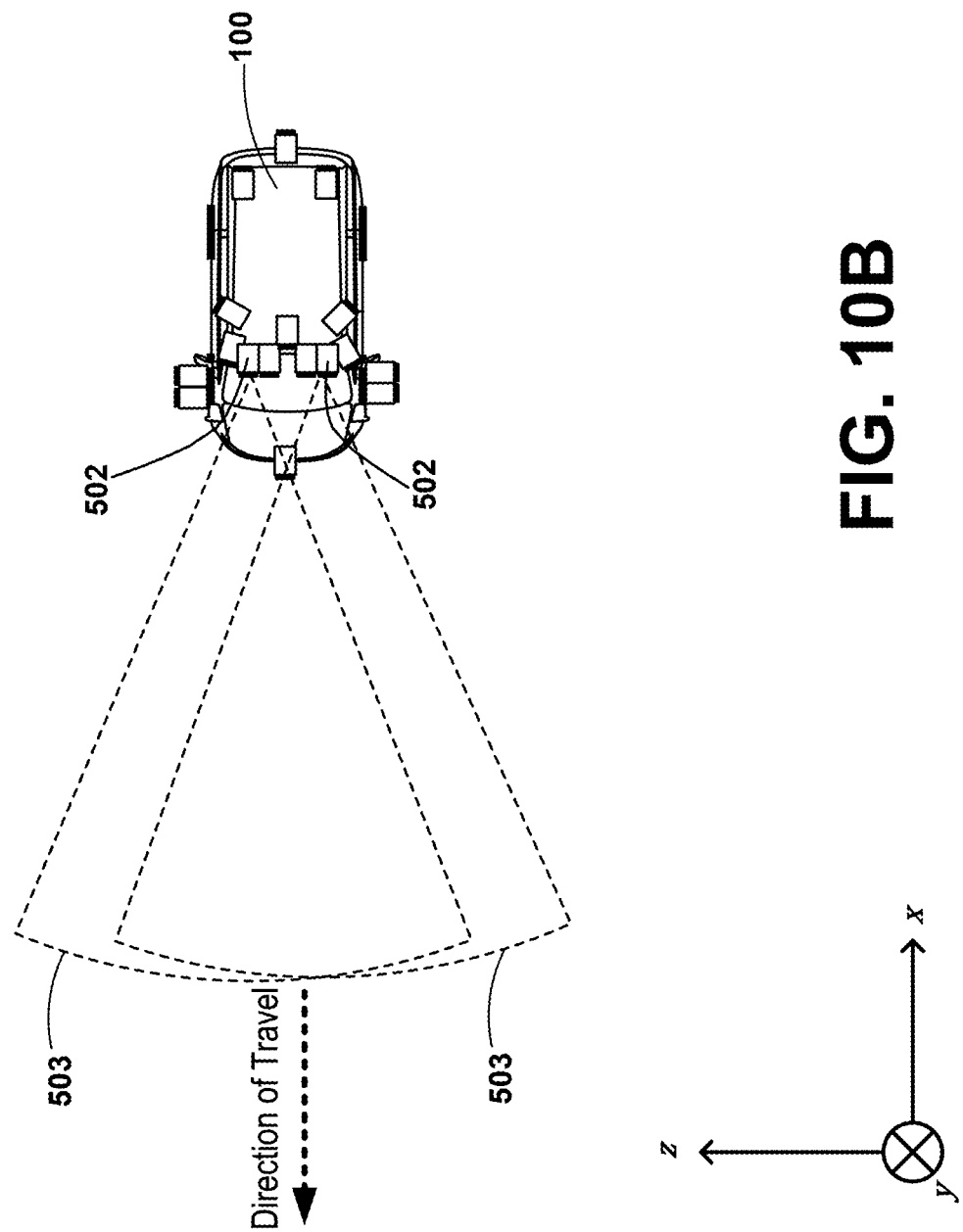
FIG. 10B is a simplified illustration of the camera system of FIG. 10A showing the cameras of the first camera type of the camera system, according to example embodiments.

FIG. 10B is a simplified illustration of the camera system 1000 of FIG. 10A showing the cameras of the first camera type 502 of the camera system 1000, according to example embodiments. As depicted in FIG. 10B, two cameras of the first camera type may each be attached to the roof of vehicle 100. Other attachment locations (e.g., above or within a tire well or near a sideview mirror) are also possible.

Figure 10C:
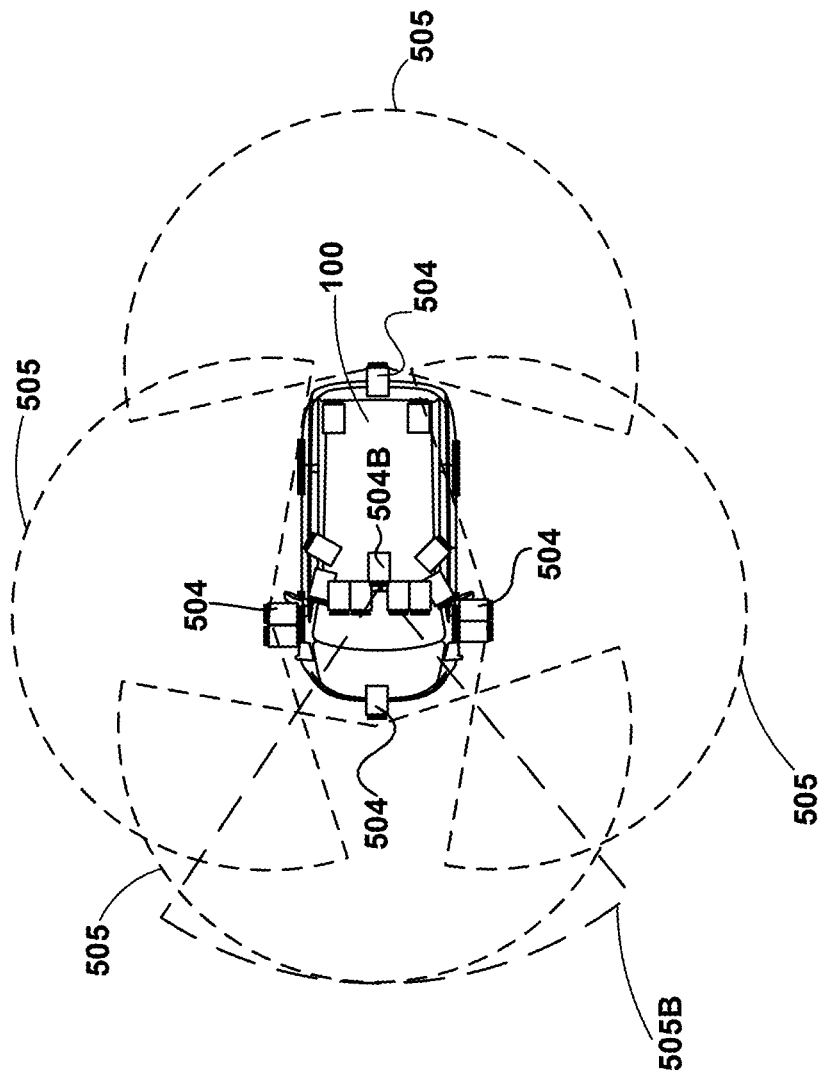
FIG. 10C is a simplified illustration of the camera system of FIG. 10A showing the cameras of the second camera type of the camera system, according to example embodiments.

FIG. 10C is a simplified illustration of the camera system 1000 of FIG. 10A showing the cameras of the second camera type 502 of the camera system 1000, according to example embodiments. As depicted in FIG. 10C, one camera of the second camera type 504 may be attached to the front bumper of vehicle 100. Further, one camera of the second camera type 504 may be attached to the rear bumper of vehicle 100. Moreover, two cameras of the second camera type 504 may each be attached to side bumpers of vehicle 100 (e.g., above the front wheel well of vehicle 100). Such a configuration may facilitate detection of objects within the second range of distances that may cross the direction of travel of vehicle 100 because the field of view for three cameras of the second camera type 504 may overlap in one or more areas in front of vehicle 100 and each camera of the second camera type 504 may be able to independently detect objects within a second range of distances from vehicle 100. Other attachment locations (e.g., within a tire well or near a sideview mirror) are also possible.

As further depicted in FIG. 10C, camera system 1000 may contain a second predetermined camera 504B of the plurality of cameras of the second camera type 504 attached to the roof of vehicle 100 with an associated second predetermined camera field of view 505B. The second predetermined camera 504B of the plurality of cameras of the second camera type 504 may be a camera of the second camera type 504 that includes a neutral density filter through which images are captured. Further, the second predetermined camera 504B of the plurality of cameras of the second camera type 504 may be oriented relative to vehicle 100 so as to capture images from pitch angles relative to vehicle 100 (e.g., rotations about the z-axis) of greater than 20° in the forward direction relative to the direction of travel of vehicle 100. Such an orientation can facilitate detection of objects, such as traffic lights, as described in greater detail below. Other attachment locations (e.g., above a tire well or near a sideview mirror) are also possible.

Figure 10D:
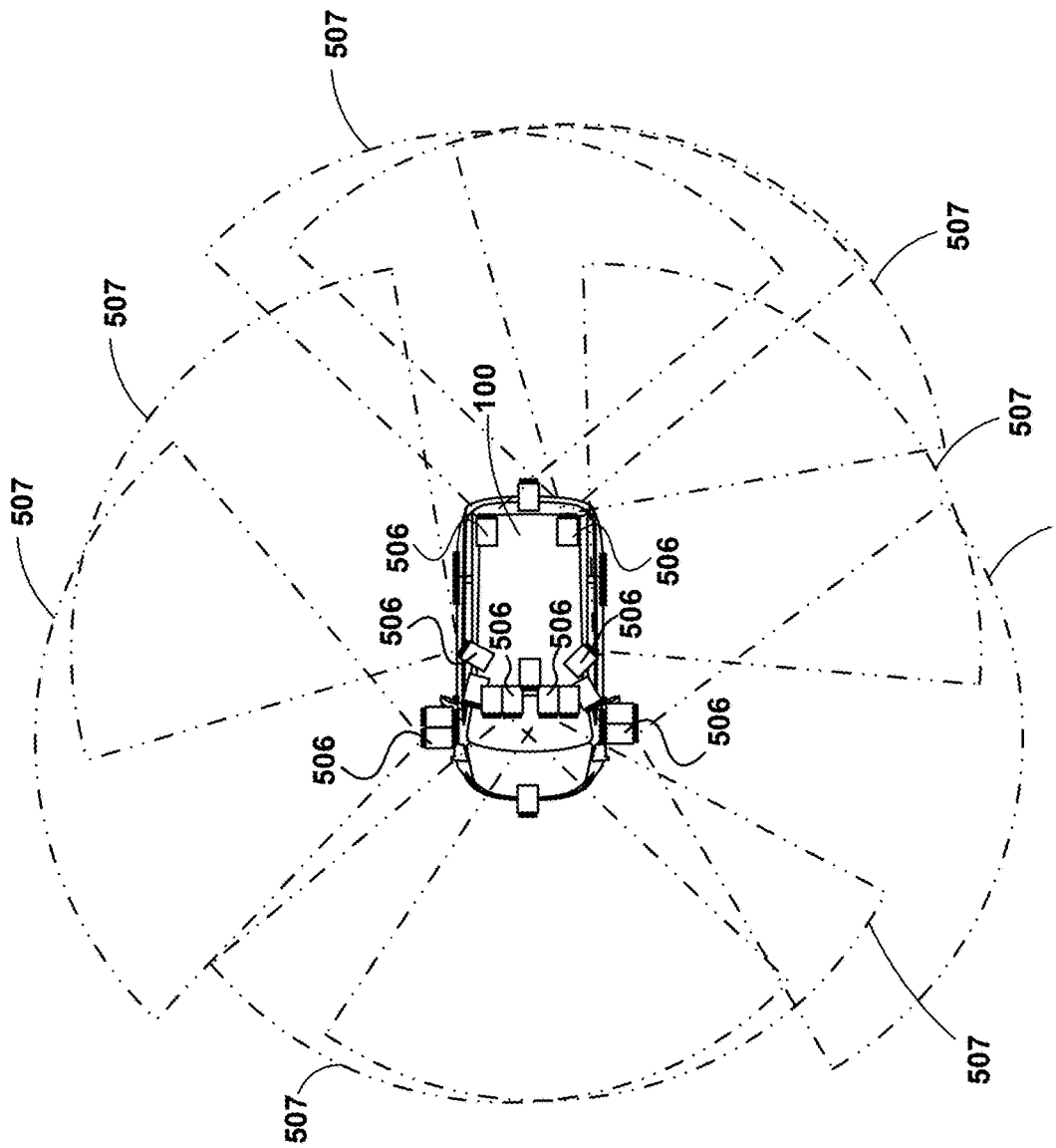
FIG. 10D is a simplified illustration of the camera system of FIG. 10A showing the cameras of the third camera type of the camera system, according to example embodiments.

FIG. 10D is a simplified illustration of the camera system 1000 of FIG. 10A showing the cameras of the third camera type 506 of the camera system 1000, according to example embodiments. As depicted in FIG. 10D, six cameras of the third camera type 506 may be attached to the roof of vehicle 100. Further, as depicted in FIG. 10D, two cameras of the third camera type 506 may each be attached to one or more side bumpers of vehicle 100 (e.g., above the front wheel well of vehicle 100). Other attachment locations (e.g., within a tire well or near a sideview mirror) are also possible.

Figure 10E:
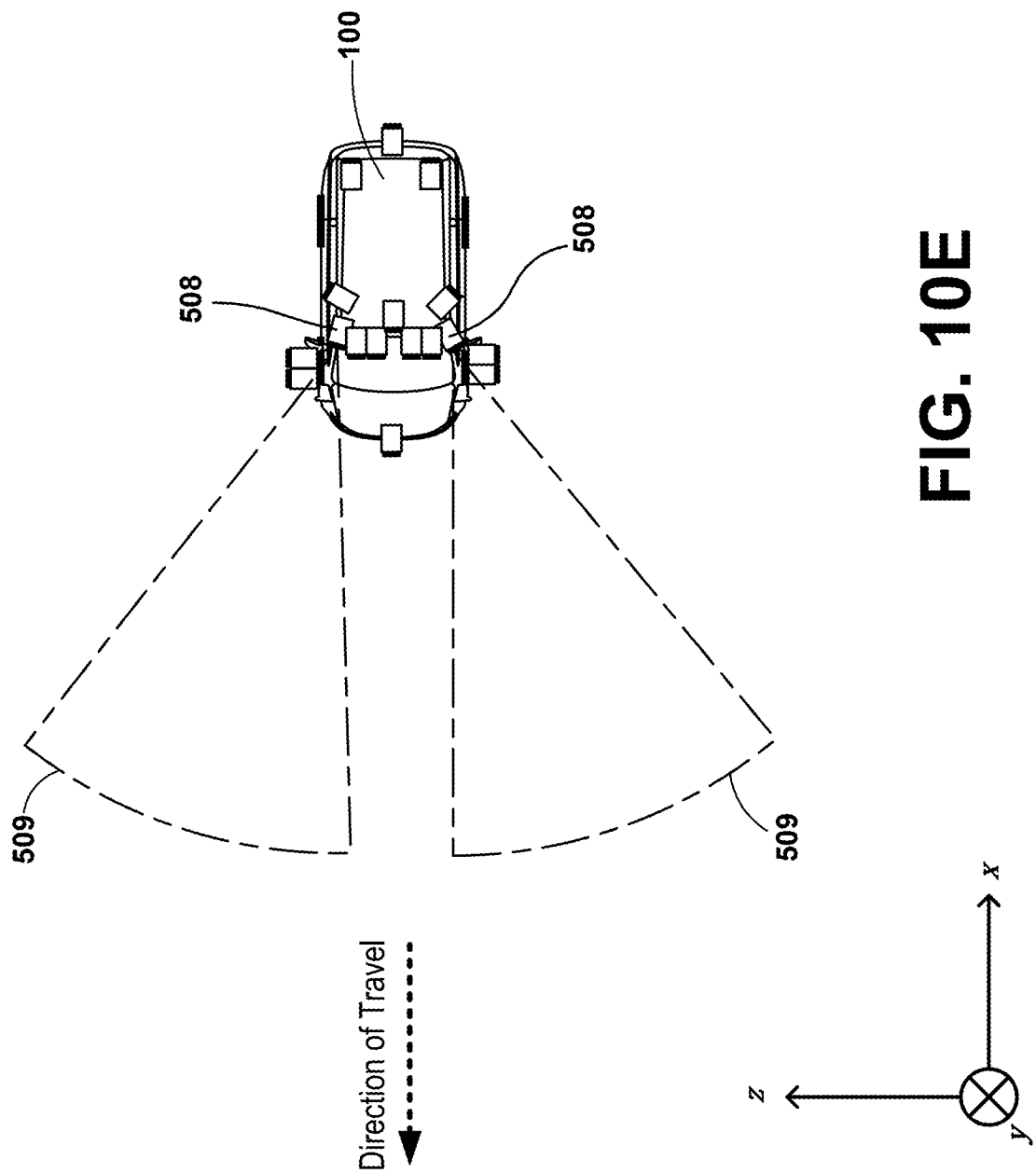
FIG. 10E is a simplified illustration of the camera system of FIG. 10A showing the cameras of the fourth camera type of the camera system, according to example embodiments.

FIG. 10E is a simplified illustration of the camera system 1000 of FIG. 10A showing the cameras of the fourth camera type 508 of the camera system 1000, according to example embodiments. As depicted in FIG. 10E, two cameras of the fourth camera type 508 may be attached to the roof of vehicle 100. Other attachment locations (e.g., above or within a tire well or near a sideview mirror) are also possible.

Figure 11A:
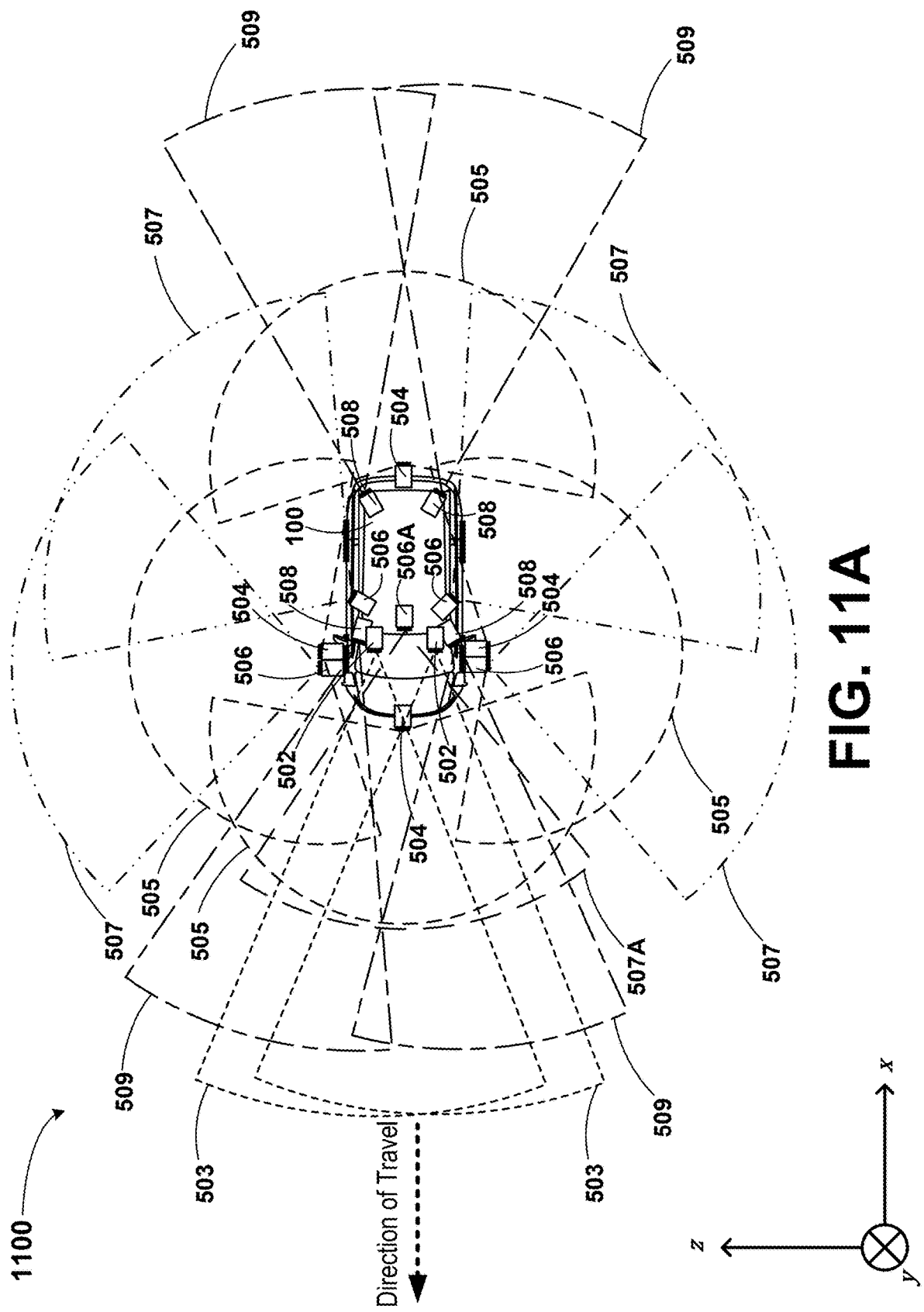
FIG. 11A is an illustration of a camera system, according to example embodiments.

FIG. 11A is an illustration of a camera system 1100, according to example embodiments. As depicted in FIG. 11A, camera system 1100 may include two cameras of the first camera type 502, each with associated a first field of view 503. These two cameras of the first camera type 502 may each be oriented in the forward direction relative to the direction of travel of vehicle 100. While the direction of travel illustrated in FIG. 11A is the negative x-direction, other directions of travel are also possible. For example, the direction of travel may alternatively be the positive x-direction (e.g., the vehicle 100 may be traveling in reverse). Further, other numbers of cameras of the first camera type 502 (e.g., one, three, four, or five) and/or other attachment locations of the camera(s) of the first camera type 502 (e.g., on an underside of vehicle 100 or an inside of vehicle 100) are also possible.

Further, there may be four cameras of the second camera type 504, each with an associated second field of view 505. One camera of the second camera type 504 may be oriented in the forward direction relative to the direction of travel of vehicle 100. Moreover, one camera of the second camera type 504 may be oriented in the backward direction relative to the direction of travel of vehicle 100. In addition, two cameras of the second camera type 504 may each be orientated in one or more sideways directions relative to the direction of travel of vehicle 100. Further, other numbers of cameras of the second camera type 504 (e.g., one, two, three, or five) and/or other attachment locations of the camera(s) of the second camera type 504 (e.g., on an underside of vehicle 100 or an inside of vehicle 100) are also possible.

As depicted in FIG. 11A, camera system 1100 may include five cameras of the third camera type 506, each with an associated third field of view 507. One camera of the third camera type 506 may be oriented in the forward direction relative to the direction of travel of vehicle 100. Further, four cameras of the third camera type 506 may be oriented in one or more sideways directions relative to the direction of travel of vehicle 100. Other numbers of cameras of the third camera type 506 (e.g., one, two, three, four, or six) and/or other attachment locations of the camera(s) of the third camera type 506 (e.g., on an underside of vehicle 100 or an inside of vehicle 100) are also possible.

Moreover, as depicted in FIG. 11A, four cameras of the fourth camera type 508, each with an associated fourth field of view 509, may be attached to vehicle 100. Two cameras of the fourth camera type 508 may be oriented at least partially in the forward direction relative to the direction of travel of vehicle 100. Moreover, two cameras of the fourth camera type 508 may be oriented in the backward direction relative to the direction of travel of vehicle 100. Such a configuration can facilitate the detection of objects within the fourth range of distances that may enter the forward-moving or rear-moving path of vehicle 100. Other numbers of cameras of the fourth camera type 508 (e.g., one, two, three, or five) and/or other attachment locations of the camera(s) of the fourth camera type 508 (e.g., on an underside of vehicle 100 or an inside of vehicle 100) are also possible.

As depicted in FIG. 11A, two cameras of the second camera type 504 may each be attached to vehicle 100 adjacent to one or more cameras of the third camera type 506. Further, two cameras of the first camera type 502 may be attached to vehicle 100 adjacent to one or more cameras of the fourth camera type 508.

Figure 11B:
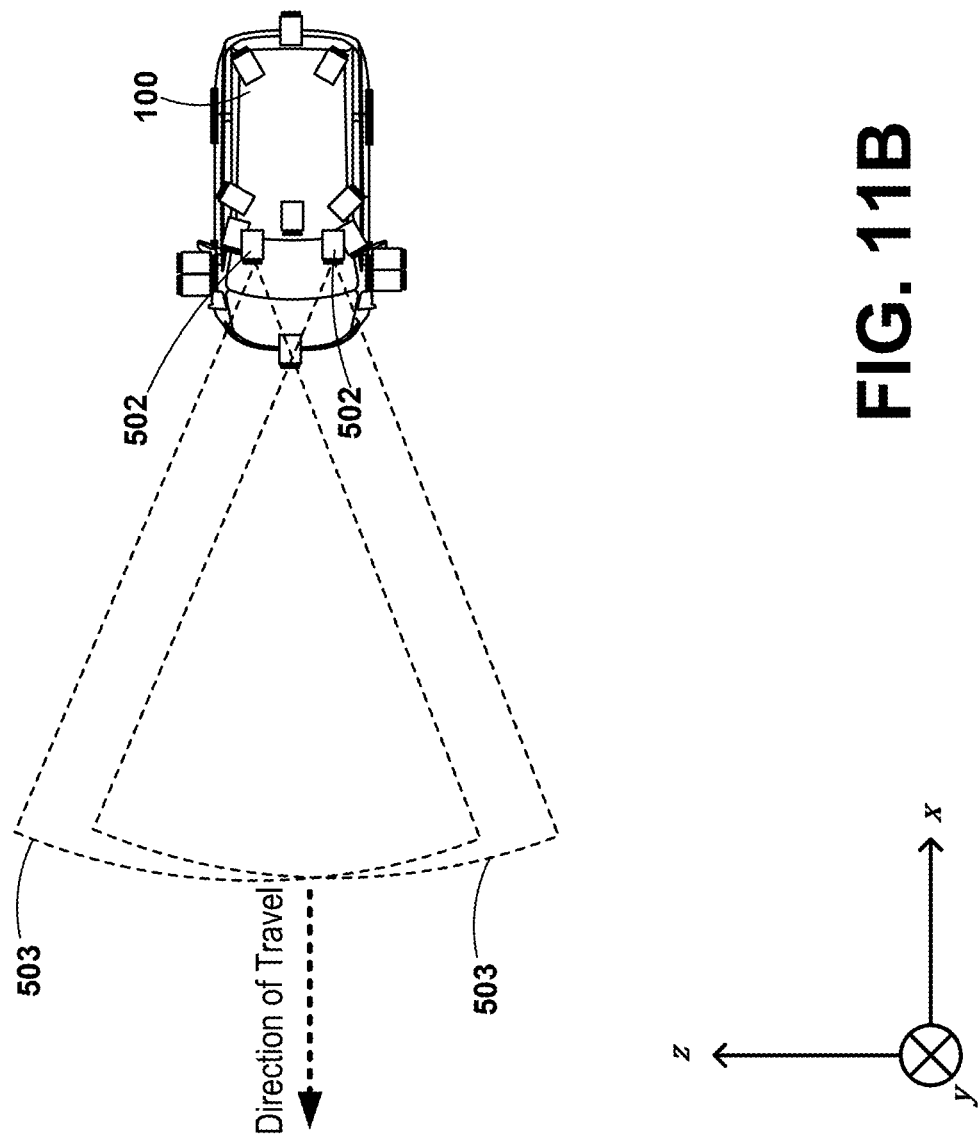
FIG. 11B is a simplified illustration of the camera system of FIG. 11A showing the cameras of the first camera type of the camera system, according to example embodiments.

FIG. 11B is a simplified illustration of the camera system 1100 of FIG. 11A showing the cameras of the first camera type 502 of the camera system 1100, according to example embodiments. As depicted in FIG. 11B, two cameras of the first camera type 502 may be attached to the roof of vehicle 100. Other attachment locations (e.g., above or within a tire well or near a sideview mirror) are also possible.

FIG. 11C is a simplified illustration of the camera system 1100 of FIG. 11A showing the cameras of the second camera type 504 of the camera system 1100, according to example embodiments. As depicted in FIG. 11C, one camera of the second camera type 504 may be attached to the front bumper of vehicle 100. Further, one camera of the second camera type 504 may be attached to the rear bumper of vehicle 100. Moreover, two cameras of the second camera type 504 may each be attached to side bumpers of vehicle 100 (e.g., above the front wheel well of vehicle 100). Other attachment locations (e.g., within a tire well or near a sideview mirror) are also possible.

Figure 11D:
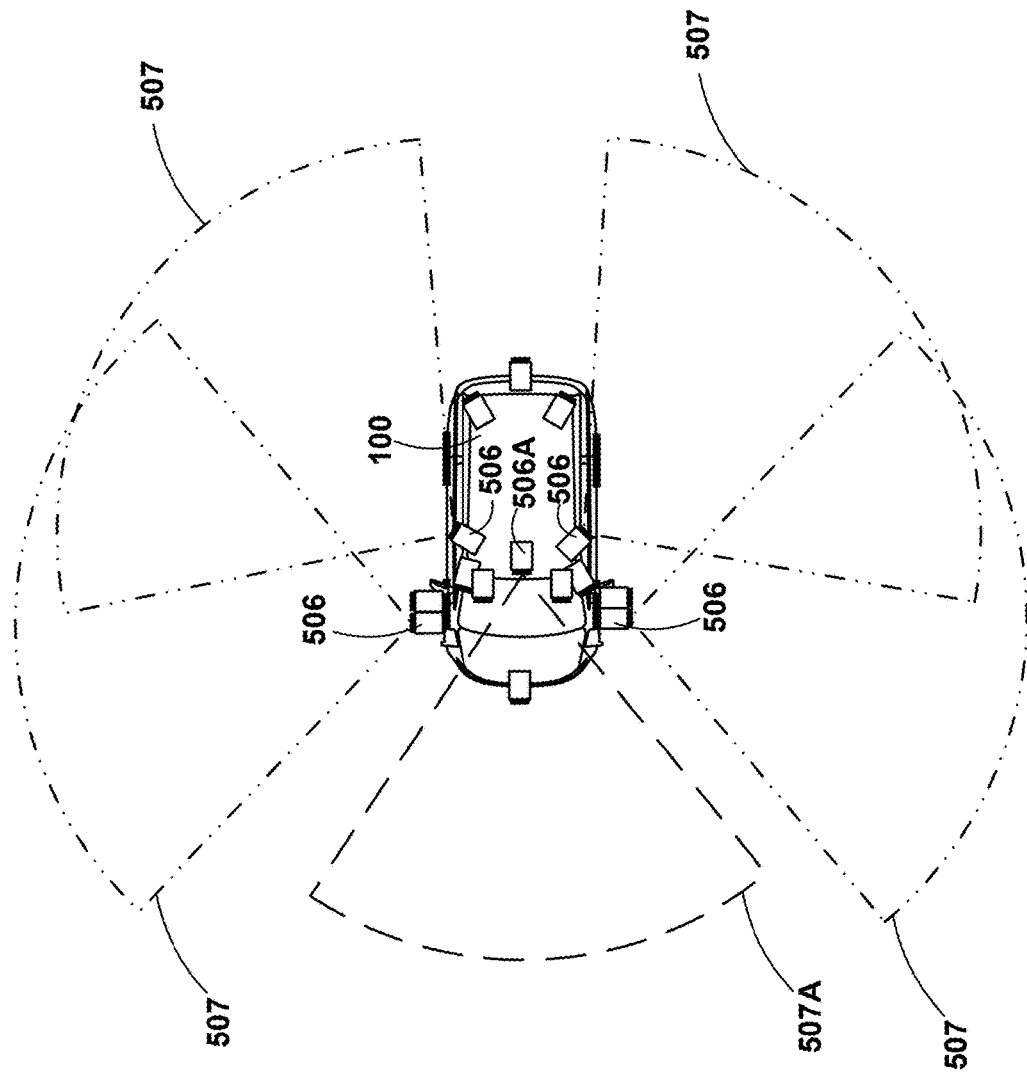
FIG. 11D is a simplified illustration of the camera system of FIG. 11A showing the cameras of the third camera type of the camera system, according to example embodiments.

FIG. 11D is a simplified illustration of the camera system 1100 of FIG. 11A showing the cameras of the third camera type 506 of the camera system 1100, according to example embodiments. As depicted in FIG. 11D, two cameras of the third camera type 506 may be attached to the roof of vehicle 100. Further, two cameras of the third camera type 506 may each be attached to side bumpers of vehicle 100 (e.g., above the front wheel well of vehicle 100). Other attachment locations (e.g., within a tire well or near a sideview mirror) are also possible.

As further depicted in FIG. 11D, camera system 1100 may contain a predetermined camera 506A of the plurality of cameras of the third camera type 506 attached to the roof of vehicle 100 with an associated third predetermined camera field of view 507A. The predetermined camera 506A of the plurality of cameras of the third camera type 506 may be a camera of the third camera type 506 that includes a neutral density filter through which images are captured. Further, the predetermined camera 506A of the plurality of cameras of the third camera type 506 may be oriented relative to vehicle 100 so as to capture images from pitch angles relative to vehicle 100 (e.g., rotations about the z-axis) of greater than 20° in the forward direction relative to the direction of travel of vehicle 100. Such an orientation can facilitate detection of objects, such as traffic lights, as described in greater detail below. Other attachment locations (e.g., above a tire well or near a sideview mirror) are also possible.

Figure 11E:
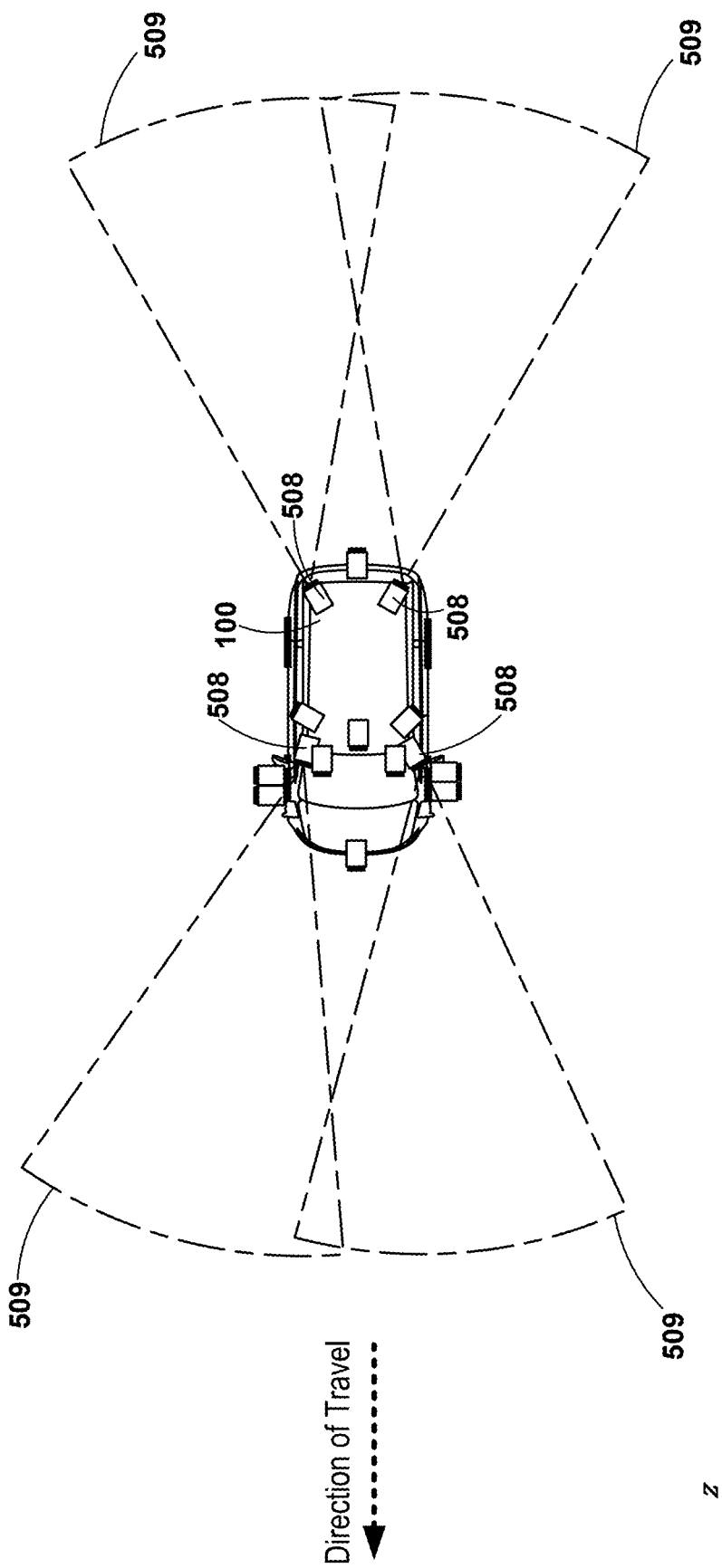
FIG. 11E is a simplified illustration of the camera system of FIG. 11A showing the cameras of the fourth camera type of the camera system, according to example embodiments.

FIG. 11E is a simplified illustration of the camera system 1100 of FIG. 11A showing the cameras of the fourth camera type 508 of the camera system 1100, according to example embodiments. As depicted in FIG. 11E, four cameras of the fourth camera type 508 may be attached to the roof of vehicle 100. Other attachment locations (e.g., above a tire well or near a sideview mirror) are also possible.

Figure 12:
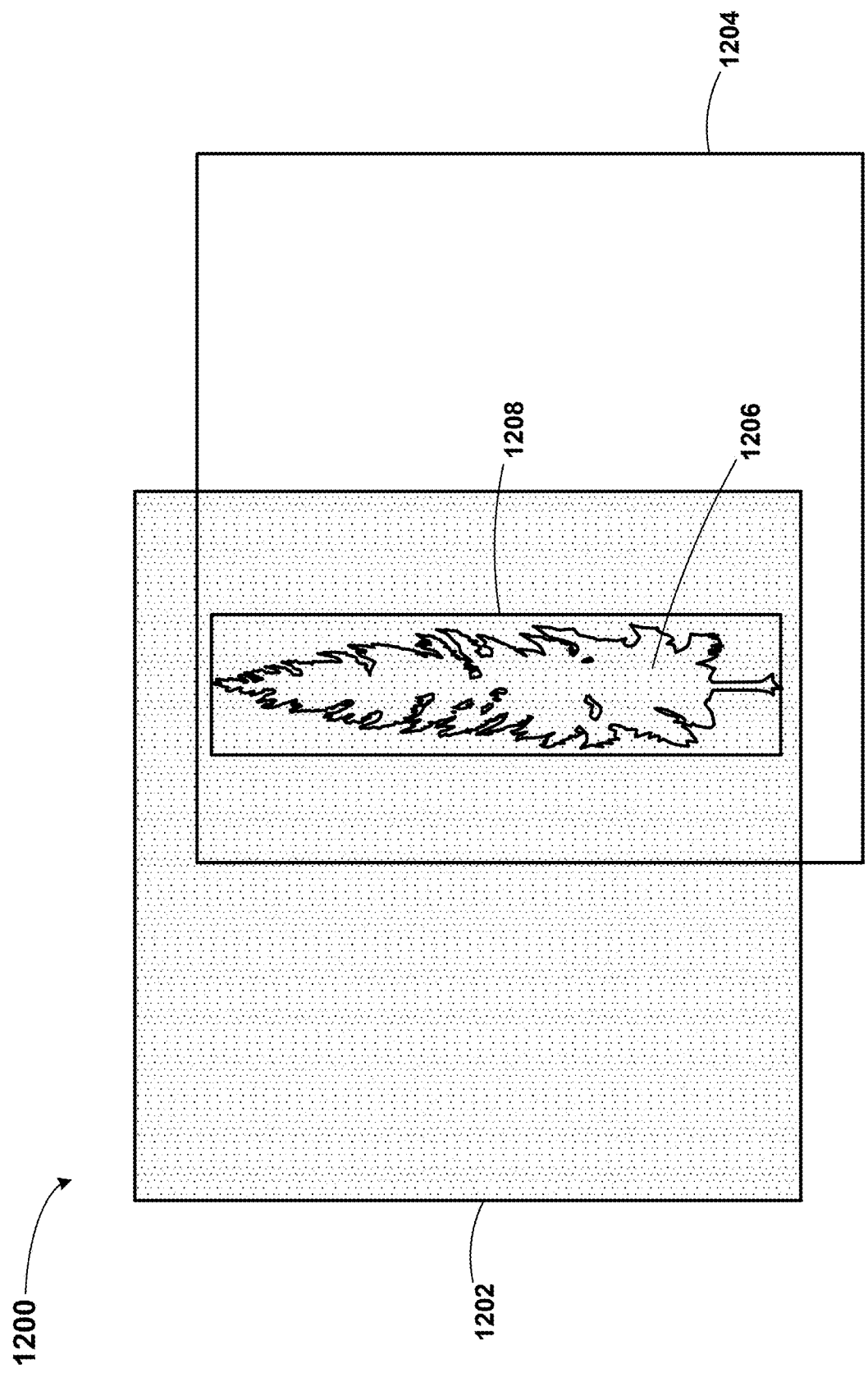
FIG. 12 is an illustration of an object recognition technique, according to example embodiments.

As described previously, information from multiple sensors and/or cameras may be gathered and combined. FIG. 12 is an illustration of an object recognition technique 1200, according to example embodiments. In some embodiments, a lidar device may be attached to a vehicle. For example, a lidar device may be attached to vehicle 100. This lidar device may generate a point cloud 1202 that is indicative of distances to objects in an environment around vehicle 100. At least some of these objects may also be contained within an image frame 1204 captured by a camera, such as a camera of the second camera type 504, that may be attached to vehicle 100. The lidar device and the camera may occupy different locations on vehicle 100. Therefore, the field of view of the camera and the field of view of the lidar device might not fully natively align. However, portions of the field of view of the camera and the field of view of the lidar device may overlap with one another. As such, a computing device may align the image frame 1204 with the point cloud 1202 to produce an aligned image frame. Doing so can enhance detection and/or recognition of an object 1206 that is within the overlapping portion 1208 of the image frame 1204 and the point cloud 1202 because the lidar device and the camera may each include information with complementary properties about objects. Information regarding a recognized object may be used by multiple systems of the vehicle 100, in various embodiments. For example, information regarding the recognized object may be used by obstacle avoidance system 144 to evaluate whether the recognized object is a potential obstacle.

Figure 13:
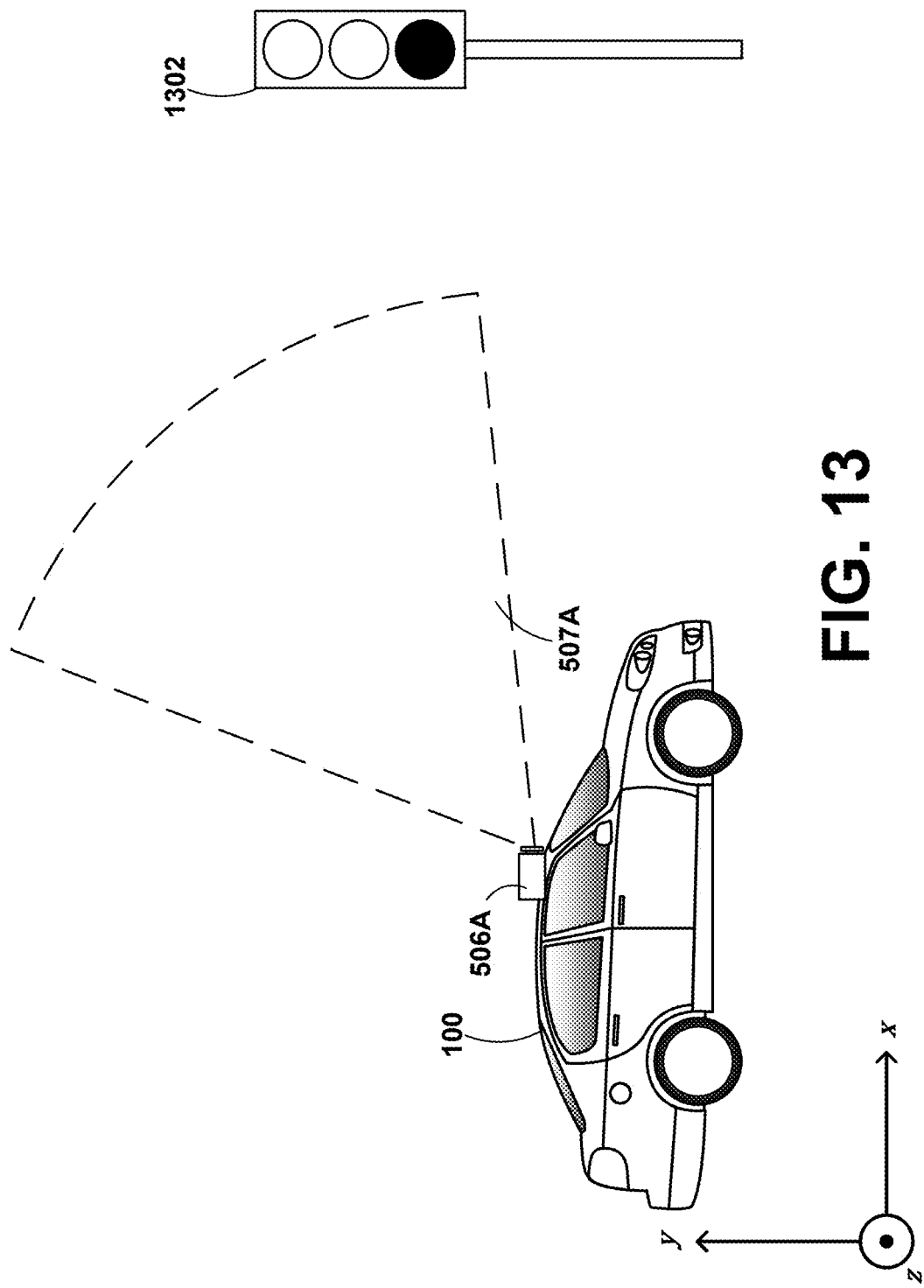
FIG. 13 is an illustration of a camera of a first modified third camera type, according to example embodiments.

FIG. 13 is an illustration of a camera of the predetermined camera 506A of the plurality of cameras of the third camera type 506, according to example embodiments. As depicted in FIG. 13, the camera of the predetermined camera 506A of the plurality of cameras of the third camera type 506 may be oriented relative to vehicle 100 so as to capture images from pitch angles relative to vehicle 100 (e.g., rotations about the z-axis) of greater than 20°. Doing so may facilitate detection of objects, such as traffic light 1302, that are located above vehicle 100 within the surrounding environment. The orientation of the camera of the predetermined camera 506A of the plurality of cameras of the third camera type 506 relative to vehicle 100 may be adjusted to detect objects closer or farther away from the road surface. For example, to facilitate the detection of objects closer to the road surface, the orientation of the predetermined camera 506A of the plurality of cameras of the third camera type 506 relative to vehicle 100 may be adjusted so as to capture images from pitch angles relative to vehicle 100 of greater than 10° or 5°. As another example, to facilitate the detection of objects farther from the road surface, the orientation of the predetermined camera 506A of the plurality of cameras of the third camera type 506 relative to vehicle 100 may be adjusted so as to capture images from pitch angles relative to vehicle 100 of greater than 25° or 20°. Doing so may facilitate detection of objects that are closer to or farther away from the road surface. The values of pitch angles relative to vehicle 100 are provided solely as examples. Other pitch angles are also possible.

In some example embodiments, a predetermined camera of the plurality of cameras of the second camera type 504 may include a neutral density filter through which images are captured. In such embodiments, the predetermined camera of the plurality of cameras of the second camera type 504 may be oriented relative to vehicle 100 so as to capture images from pitch angles relative to the vehicle of greater than 20°. Further, the predetermined camera of the plurality of cameras of the second camera type 504 may be configured to capture a pair of image frames, wherein a first image frame of the pair of image frames is captured with a first exposure time, wherein the first exposure time is set by an autoexposure setting, wherein a second image frame of the pair of image frames is captured with a second exposure time, and wherein the second exposure time is longer than $\frac{1}{60}$ seconds. This second exposure time may be longer than $\frac{1}{50}$ seconds. The second exposure time may be shorter than $\frac{1}{60}$ seconds. The use of such a camera in a camera system may reduce the maintenance associated with such a camera system by reducing the overall number of cameras within the camera system (e.g., as a single camera can exhibit multiple imaging modalities).

In some example embodiments, a lidar device may be attached to vehicle 100 and be configured to generate a point cloud indicative of distances to objects in an environment surrounding vehicle 100. In such embodiments, identifying, based on one or more second images captured by the plurality of cameras of the second camera type 504, the objects located within the second range of distances from vehicle 100 may include aligning the first image frame with the point cloud, overlapping the aligned first image frame and the second image frame to generate an overlapping image, and performing object recognition using the overlapping image and the point cloud.

In some example embodiments, the plurality of cameras of the second camera type 504 may include a camera oriented in the forward direction relative to the direction of travel of vehicle 100, a camera oriented in the backward direction relative to the direction of travel of vehicle 100, and two cameras each oriented in one or more sideways directions relative to the direction of travel of vehicle 100.

In some example embodiments, the at least one camera of the first camera type 502 may include two cameras each oriented in the forward direction relative to the direction of travel of vehicle 100.

In some example embodiments, the at least one camera of the first camera type 502 may include three cameras each oriented in the forward direction relative to the direction of travel of vehicle 100. The plurality of cameras of the second camera type 504 may include: a camera oriented in the forward direction relative to the direction of travel of vehicle 100, a camera oriented in the backward direction relative to the direction of travel of vehicle 100; and two cameras each oriented in one or more sideways directions relative to the direction of travel of vehicle 100. Further, the plurality of cameras of the third camera type 506 may include: a camera oriented in the forward direction relative to the direction of travel of vehicle 100, two cameras each oriented at least partially in the backward direction relative to the direction of travel of vehicle 100, and two cameras each oriented in the one or more sideways directions relative to the direction of travel of vehicle 100.

In some example embodiments, at least one camera of the at least one camera of the first camera type 502 may be attached to vehicle 100 adjacent to at least one camera of the plurality of cameras of the third camera type 506.

In some example embodiments, the at least one camera of the first camera type 502 may include four cameras each oriented at least partially in the forward direction relative to the direction of travel of vehicle 100. In such embodiments, the plurality of cameras of the second camera type 504 may include a camera oriented in the forward direction relative to the direction of travel of vehicle 100, two cameras each oriented in the backward direction relative to the direction of travel of vehicle 100, and two cameras each oriented in one or more sideways directions relative to the direction of travel of vehicle 100. Moreover, in such embodiments, wherein the plurality of cameras of the third camera type 506 may include a camera oriented in the forward direction relative to the direction of travel of vehicle 100, two cameras each oriented at least partially in the backward direction relative to the direction of travel of vehicle 100, and two cameras each oriented at least partially in the one or more sideways directions relative to the direction of travel of vehicle 100.

In some example embodiments, at least three cameras of the at least one camera of the first camera type 502 may each be attached to vehicle 100 adjacent to at least three cameras of the plurality of cameras of the third camera type 506. In such embodiments, at least two cameras of the plurality of cameras of the second camera type 504 may each be attached to vehicle 100 adjacent to at least two cameras of the plurality of cameras of the third camera type 506.

In some example embodiments, the at least one camera of the first camera type 502 may include three cameras each oriented at least partially in the forward direction relative to the direction of travel of vehicle 100. In such embodiments, the plurality of cameras of the second camera type 504 may include a camera oriented in the forward direction relative to the direction of travel of vehicle 100, a camera oriented in the backward direction relative to the direction of travel of vehicle 100, and two cameras each oriented in one or more sideways directions relative to the direction of travel of vehicle 100. Moreover, in such embodiments, the plurality of cameras of the third camera type 506 may include a camera oriented in the forward direction relative to the direction of travel of vehicle 100, two cameras each oriented at least partially in the backward direction relative to the direction of travel of vehicle 100, and three cameras each oriented at least partially in the one or more sideways directions relative to the direction of travel of vehicle 100.

In some example embodiments, at least one camera of the at least one camera of the first camera type 502 may be attached to vehicle 100 adjacent to at least one camera of the plurality of cameras of the third camera type 506 and at least two cameras of the plurality of cameras of the second camera type 504 may each be attached to vehicle 100 adjacent to at least two cameras of the plurality of cameras of the third camera type 506.

In some example embodiments, at least one camera of the first camera type 502 may include two cameras each oriented in the forward direction relative to a direction of travel of vehicle 100. In such embodiments, the plurality of cameras of the second camera type 504 may include a camera oriented in the forward direction relative to the direction of travel of vehicle 100, a camera oriented in the backward direction relative to the direction of travel of vehicle 100, and two cameras each oriented in one or more sideways directions relative to the direction of travel of vehicle 100. Moreover, in such embodiments, the plurality of cameras of the third camera type 506 may include two cameras each oriented at least partially in the forward direction relative to the direction of travel of vehicle 100, two cameras each oriented at least partially in the backward direction relative to the direction of travel of vehicle 100, and four cameras each oriented in the one or more sideways directions relative to the direction of travel of vehicle 100.

In some example embodiments, a camera system may include a plurality of cameras of a fourth camera type 508. The plurality of cameras of the fourth camera type 508 may include two cameras attached to vehicle 100. Each camera of the fourth camera type 508 may have a fourth field of view 509 and the fourth field of view 509 may span greater angles in yaw relative to vehicle 100 than the first field of view 503. Further, the fourth field of view 509 may span fewer angles in yaw relative to vehicle 100 than the third field of view 507. In such embodiments, the computing device may be configured to identify, based on one or more images captured by the plurality of cameras of the fourth camera type 508, objects located within a fourth range of distances. The fourth range of distances may include farther distances from vehicle 100 than are included in the third range of distances and the first range of distances may include farther distances from vehicle 100 than are included in the fourth range of distances.

In some example embodiments, at least one camera of the plurality of cameras of the second camera type 504 may include a neutral density filter through which images are captured. Such a camera may be oriented relative to vehicle 100 so as to capture images from pitch angles relative to the vehicle of greater than 5°. Moreover, such a camera may have a field of view that spans greater angles in yaw relative to vehicle 100 than at least one other camera of the second camera type 504.

In some example embodiments, at least two cameras of the at least one camera of the first camera type 502 may each be attached to vehicle 100 adjacent to at least two cameras of the plurality of cameras of the fourth camera type 508. In such embodiments, at least two cameras of the at least one camera of the first camera type 502 may each be attached to vehicle 100 adjacent to at least two cameras of the plurality of cameras of the third camera type 506. Moreover, in such embodiments, at least two cameras of the plurality of cameras of the fourth camera type 508 may each be attached to vehicle 100 adjacent to at least two cameras of the plurality of cameras of the third camera type 506. In addition, in such embodiments, at least two cameras of the plurality of cameras of the third camera type 506 may each be attached to vehicle 100 adjacent to at least two cameras of the plurality of cameras of the second camera type 502.

In some example embodiments, the at least one camera of the first camera type 502 may include two cameras each oriented in the forward direction relative to the direction of travel of vehicle 100. In such embodiments, the plurality of cameras of the second camera type 504 may include a camera oriented in the forward direction relative to the direction of travel of vehicle 100, a camera oriented in the backward direction relative to the direction of travel of vehicle 100, and two cameras each oriented in one or more sideways directions relative to the direction of travel of vehicle 100. In such embodiments, the plurality of cameras of the third camera type 506 may include one camera oriented in the forward direction relative to the direction of travel of vehicle 100 and four cameras each oriented in the one or more sideways directions relative to the direction of travel of vehicle 100.

In some example embodiments, at least one camera of the plurality of cameras of the third camera type 506 may include a neutral density filter through which images are captured and be oriented relative to vehicle 100 so as to capture images from pitch angles relative to the vehicle of greater than 20°.

In some example embodiments, a camera system may also include a plurality of cameras of a fourth camera type 508. In such embodiments, the plurality of cameras of the fourth camera type 508 may include four cameras attached to vehicle 100. Each camera of the fourth camera type 508 may have a fourth field of view 509 and the fourth field of view 509 may span greater angles in yaw relative to vehicle 100 than the first field of view 503. Further, the fourth field of view 509 may span fewer angles in yaw relative to the vehicle than the third field of view 507. Moreover, the computing device may be further configured to identify, based on one or more images captured by the plurality of cameras of the fourth camera type 508, objects located within a fourth range of distances. Such a fourth range of distances may include farther distances from vehicle 100 than are included in the third range of distances and the first range of distances may include farther distances from vehicle 100 than are included in the fourth range of distances.

A single device may have the features of at least one camera of the first camera type 502, at least one camera of the second camera type 504, at least one camera of the third camera type 506, at least one camera of the fourth camera type 508, and/or the lidar device. For example, a single device may capture images used to identify objects within the second range of distances from vehicle 100 and generate the point cloud 1202 that is indicative of distances to objects in an environment around vehicle 100. As another example, a single device may capture images used to identify objects within both the first range of distances from vehicle 100 and the second range of distances from vehicle 100. Other types of sensors may be used in addition to or instead of a camera or a lidar device within a single device, as well. For example, radar sensors may be incorporated within a single device.

Figure 14:
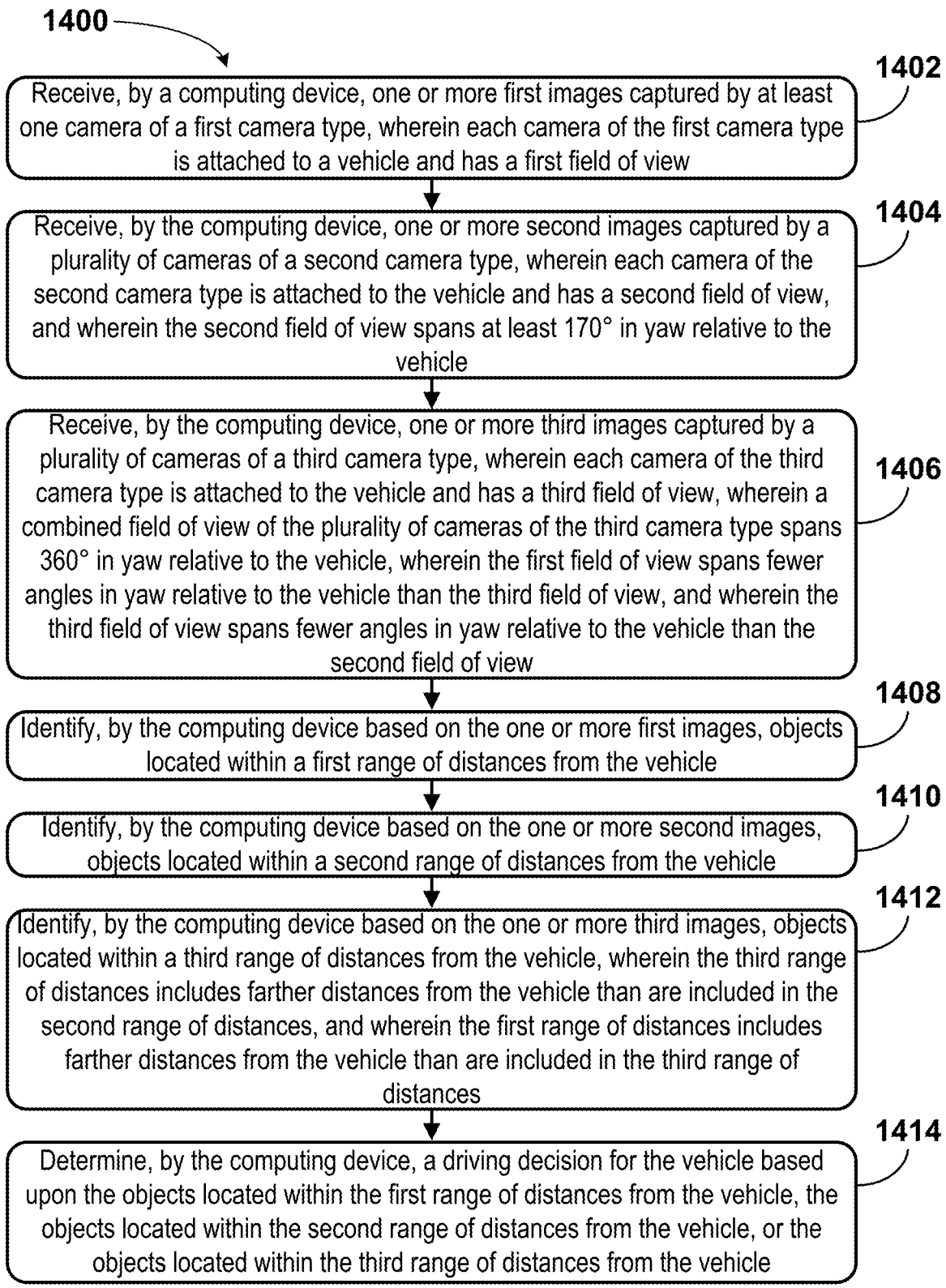
FIG. 14 is a flowchart illustration of a method, according to example embodiments.

FIG. 14 is a flowchart illustration of a method 1400, according to example embodiments. The method 1400 may be performed using images captured by the camera systems 600, 700, 800, 900, 1000, or 1100. In alternate embodiments, the method 1400 may be performed using alternate camera systems.

At block 1402, the method 1400 may include receiving, by a computing device, one or more first images captured by at least one camera of a first camera type, wherein each camera of the first camera type is attached to a vehicle and has a first field of view.

At block 1404, the method 1400 may include receiving, by the computing device, one or more second images captured by a plurality of cameras of a second camera type, wherein each camera of the second camera type is attached to the vehicle and has a second field of view, and wherein the second field of view spans at least 170° in yaw relative to the vehicle.

At block 1406, the method 1400 may include receiving, by the computing device, one or more third images captured by a plurality of cameras of a third camera type, wherein each camera of the third camera type is attached to the vehicle and has a third field of view, wherein a combined field of view of the plurality of cameras of the third camera type spans 360° in yaw relative to the vehicle, wherein the first field of view spans fewer angles in yaw relative to the vehicle than the third field of view, and wherein the third field of view spans fewer angles in yaw relative to the vehicle than the second field of view At block 1408, the method 1400 may include identifying, by the computing device based on the one or more first images, objects located within a first range of distances from the vehicle.

At block 1410, the method 1400 may include identifying, by the computing device based on the one or more second images, objects located within a second range of distances from the vehicle.

At block 1412, the method 1400 may include identifying, by the computing device based on the one or more third images, objects located within a third range of distances from the vehicle, wherein the third range of distances includes farther distances from the vehicle than are included in the second range of distances, and wherein the first range of distances includes farther distances from the vehicle than are included in the third range of distances.

At block 1414, the method 1400 may include determining, by the computing device, a driving decision for the vehicle based upon the objects located within the first range of distances from the vehicle, the objects located within the second range of distances from the vehicle, or the objects located within the third range of distances from the vehicle.

In some embodiments, the method 1400 may also include causing, by the computing device, the vehicle (e.g., vehicle 100) to perform a driving maneuver based on the driving decision.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including RAM, a disk drive, a solid state drive, or another storage medium.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A system comprising:
a vehicle;
at least one camera of a first camera type attached to the vehicle, wherein each camera of the first camera type has a first field of view;
a plurality of cameras of a second camera type attached to the vehicle, wherein each camera of the second camera type has a second field of view, and wherein the second field of view spans at least 170° in yaw relative to the vehicle;
a plurality of cameras of a third camera type attached to the vehicle, wherein each camera of the third camera type has a third field of view, wherein a combined field of view of the plurality of cameras of the third camera type spans 360° in yaw relative to the vehicle, wherein the first field of view spans fewer angles in yaw relative to the vehicle than the third field of view, and wherein the third field of view spans fewer angles in yaw relative to the vehicle than the second field of view; and
a computing device communicatively coupled to the at least one camera of the first camera type, the plurality of cameras of the second camera type, and the plurality of cameras of the third camera type, wherein the computing device is configured to:
identify, based on one or more first images captured by the at least one camera of the first camera type, objects located within a first range of distances from the vehicle;
identify, based on one or more second images captured by the plurality of cameras of the second camera type, objects located within a second range of distances from the vehicle; and
identify, based on one or more third images captured by the plurality of cameras of the third camera type, objects located within a third range of distances from the vehicle, wherein the third range of distances includes farther distances from the vehicle than are included in the second range of distances, and wherein the first range of distances includes farther distances from the vehicle than are included in the third range of distances.

2. The system of claim 1, wherein a predetermined camera of the plurality of cameras of the second camera type:
comprises a neutral density filter through which images are captured;
is oriented relative to the vehicle so as to capture images from pitch angles relative to the vehicle of greater than 20°; and
is configured to capture a pair of image frames, wherein a first image frame of the pair of image frames is captured with a first exposure time, wherein the first exposure time is set by an autoexposure setting, wherein a second image frame of the pair of image frames is captured with a second exposure time, and wherein the second exposure time is longer than $\frac{1}{60}$ seconds.

3. The system of claim 2, further comprising a light detection and ranging (lidar) device attached to the vehicle and configured to generate a point cloud indicative of distances to objects in an environment surrounding the vehicle,
- wherein identifying, based on one or more second images captured by the plurality of cameras of the second camera type, the objects located within the second range of distances from the vehicle comprises:
  - aligning the first image frame with the point cloud;
  - overlapping the aligned first image frame and the second image frame to generate an overlapping image; and
  - performing object recognition using the overlapping image and the point cloud.

4. The system of claim 1, wherein the plurality of cameras of the second camera type comprises:
- a camera oriented in a forward direction relative to a direction of travel of the vehicle;
- a camera oriented in a backward direction relative to the direction of travel of the vehicle; and
- two cameras each oriented in one or more sideways directions relative to a direction of travel of the vehicle.

5. The system of claim 1, wherein the at least one camera of the first camera type comprises two cameras each oriented in a forward direction relative to a direction of travel of the vehicle.

6. The system of claim 1,
- wherein the at least one camera of the first camera type comprises three cameras each oriented in a forward direction relative to a direction of travel of the vehicle,
- wherein the plurality of cameras of the second camera type comprises:
  - a camera oriented in the forward direction relative to the direction of travel of the vehicle;
  - a camera oriented in a backward direction relative to the direction of travel of the vehicle; and
  - two cameras each oriented in one or more sideways directions relative to the direction of travel of the vehicle, and
- wherein the plurality of cameras of the third camera type comprises:
  - a camera oriented in the forward direction relative to the direction of travel of the vehicle;
  - two cameras each oriented at least partially in the backward direction relative to the direction of travel of the vehicle; and
  - two cameras each oriented in the one or more sideways directions relative to the direction of travel of the vehicle.

7. The system of claim 6, wherein at least one camera of the at least one camera of the first camera type is attached to the vehicle adjacent to at least one camera of the plurality of cameras of the third camera type.

8. The system of claim 1,
- wherein the at least one camera of the first camera type comprises four cameras each oriented at least partially in a forward direction relative to a direction of travel of the vehicle,
- wherein the plurality of cameras of the second camera type comprises:
  - a camera oriented in the forward direction relative to the direction of travel of the vehicle;
  - two cameras each oriented in a backward direction relative to the direction of travel of the vehicle; and
  - two cameras each oriented in one or more sideways directions relative to the direction of travel of the vehicle, and
- wherein the plurality of cameras of the third camera type comprises:
  - a camera oriented in the forward direction relative to the direction of travel of the vehicle;
  - two cameras each oriented at least partially in the backward direction relative to the direction of travel of the vehicle; and
  - two cameras each oriented at least partially in the one or more sideways directions relative to the direction of travel of the vehicle.

9. The system of claim 8,
- wherein at least three cameras of the at least one camera of the first camera type are each attached to the vehicle adjacent to at least three cameras of the plurality of cameras of the third camera type, and
- wherein at least two cameras of the plurality of cameras of the second camera type are each attached to the vehicle adjacent to at least two cameras of the plurality of cameras of the third camera type.

10. The system of claim 1,
- wherein the at least one camera of the first camera type comprises three cameras each oriented at least partially in a forward direction relative to a direction of travel of the vehicle;
- wherein the plurality of cameras of the second camera type comprises:
  - a camera oriented in the forward direction relative to the direction of travel of the vehicle;
  - a camera oriented in a backward direction relative to the direction of travel of the vehicle; and
  - two cameras each oriented in one or more sideways directions relative to the direction of travel of the vehicle; and
- wherein the plurality of cameras of the third camera type comprises:
  - a camera oriented in the forward direction relative to the direction of travel of the vehicle;
  - two cameras each oriented at least partially in the backward direction relative to the direction of travel of the vehicle; and
  - three cameras each oriented at least partially in the one or more sideways directions relative to the direction of travel of the vehicle.

11. The system of claim 10,
- wherein at least one camera of the at least one camera of the first camera type is attached to the vehicle adjacent to at least one camera of the plurality of cameras of the third camera type, and
- wherein at least two cameras of the plurality of cameras of the second camera type are each attached to the vehicle adjacent to at least two cameras of the plurality of cameras of the third camera type.

12. The system of claim 1,
- wherein the at least one camera of the first camera type comprises two cameras each oriented in a forward direction relative to a direction of travel of the vehicle,
- wherein the plurality of cameras of the second camera type comprises:
  - a camera oriented in the forward direction relative to the direction of travel of the vehicle;
  - a camera oriented in a backward direction relative to the direction of travel of the vehicle; and
  - two cameras each oriented in one or more sideways directions relative to the direction of travel of the vehicle, and wherein the plurality of cameras of the third camera type comprises:
two cameras each oriented at least partially in the forward direction relative to the direction of travel of the vehicle;
two cameras each oriented at least partially in the backward direction relative to the direction of travel of the vehicle; and
four cameras each oriented in the one or more sideways directions relative to the direction of travel of the vehicle.

13. The system of claim 12, further comprising a plurality of cameras of a fourth camera type,
wherein the plurality of cameras of the fourth camera type comprises two cameras attached to the vehicle,
wherein each camera of the fourth camera type has a fourth field of view,
wherein the fourth field of view spans greater angles in yaw relative to the vehicle than the first field of view,
wherein the fourth field of view spans fewer angles in yaw relative to the vehicle than the third field of view,
wherein the computing device is further configured to identify, based on one or more images captured by the plurality of cameras of the fourth camera type, objects located within a fourth range of distances,
wherein the fourth range of distances includes farther distances from the vehicle than are included in the third range of distances, and
wherein the first range of distances includes farther distances from the vehicle than are included in the fourth range of distances.

14. The system of claim 12, wherein at least one camera of the plurality of cameras of the second camera type:
comprises a neutral density filter through which images are captured,
is oriented relative to the vehicle so as to capture images from pitch angles relative to the vehicle of greater than 5°, and
has a field of view that spans greater angles in yaw relative to the vehicle than at least one other camera of the second camera type.

15. The system of claim 13,
wherein at least two cameras of the at least one camera of the first camera type are each attached to the vehicle adjacent to at least two cameras of the plurality of cameras of the fourth camera type,
wherein at least two cameras of the at least one camera of the first camera type are each attached to the vehicle adjacent to at least two cameras of the plurality of cameras of the third camera type,
wherein at least two cameras of the plurality of cameras of the fourth camera type are each attached to the vehicle adjacent to at least two cameras of the plurality of cameras of the third camera type, and
wherein at least two cameras of the plurality of cameras of the third camera type are each attached to the vehicle adjacent to at least two cameras of the plurality of cameras of the second camera type.

16. The system of claim 1,
wherein the at least one camera of the first camera type comprises two cameras each oriented in a forward direction relative to a direction of travel of the vehicle,
wherein the plurality of cameras of the second camera type comprises:
a camera oriented in the forward direction relative to the direction of travel of the vehicle;
a camera oriented in a backward direction relative to the direction of travel of the vehicle; and
two cameras each oriented in one or more sideways directions relative to the direction of travel of the vehicle, and
wherein the plurality of cameras of the third camera type comprises:
one camera oriented in the forward direction relative to the direction of travel of the vehicle; and
four cameras each oriented in the one or more sideways directions relative to the direction of travel of the vehicle.

17. The system of claim 16, wherein at least one camera of the plurality of cameras of the third camera type:
comprises a neutral density filter through which images are captured; and
is oriented relative to the vehicle so as to capture images from pitch angles relative to the vehicle of greater than 20°.

18. The system of claim 16, further comprising a plurality of cameras of a fourth camera type,
wherein the plurality of cameras of the fourth camera type comprises four cameras attached to the vehicle,
wherein each camera of the fourth camera type has a fourth field of view,
wherein the fourth field of view spans greater angles in yaw relative to the vehicle than the first field of view,
wherein the fourth field of view spans fewer angles in yaw relative to the vehicle than the third field of view,
wherein the computing device is further configured to identify, based on one or more images captured by the plurality of cameras of the fourth camera type, objects located within a fourth range of distances,
wherein the fourth range of distances includes farther distances from the vehicle than are included in the third range of distances, and
wherein the first range of distances includes farther distances from the vehicle than are included in the fourth range of distances.

19. A method comprising:
receiving, by a computing device, one or more first images captured by at least one camera of a first camera type, wherein each camera of the first camera type is attached to a vehicle and has a first field of view;
receiving, by the computing device, one or more second images captured by a plurality of cameras of a second camera type, wherein each camera of the second camera type is attached to the vehicle and has a second field of view, and wherein the second field of view spans at least 170° in yaw relative to the vehicle;
receiving, by the computing device, one or more third images captured by a plurality of cameras of a third camera type, wherein each camera of the third camera type is attached to the vehicle and has a third field of view, wherein a combined field of view of the plurality of cameras of the third camera type spans 360° in yaw relative to the vehicle, wherein the first field of view spans fewer angles in yaw relative to the vehicle than the third field of view, and wherein the third field of view spans fewer angles in yaw relative to the vehicle than the second field of view;
identifying, by the computing device based on the one or more first images, objects located within a first range of distances from the vehicle;
identifying, by the computing device based on the one or more second images, objects located within a second range of distances from the vehicle;

identifying, by the computing device based on the one or more third images, objects located within a third range of distances from the vehicle, wherein the third range of distances includes farther distances from the vehicle than are included in the second range of distances, and wherein the first range of distances includes farther distances from the vehicle than are included in the third range of distances; and determining, by the computing device, a driving decision for the vehicle based upon the objects located within the first range of distances from the vehicle, the objects located within the second range of distances from the vehicle, or the objects located within the third range of distances from the vehicle.

20. A non-transitory, computer-readable medium, having stored thereon program instructions that, when executed by a processor, cause the processor to perform operations comprising:

receiving one or more first images captured by at least one camera of a first camera type, wherein each camera of the first camera type is attached to a vehicle and has a first field of view;

receiving one or more second images captured by a plurality of cameras of a second camera type, wherein each camera of the second camera type is attached to the vehicle and has a second field of view, and wherein the second field of view spans at least 170° in yaw relative to the vehicle;

receiving one or more third images captured by a plurality of cameras of a third camera type, wherein each camera of the third camera type is attached to the vehicle and has a third field of view, wherein a combined field of view of the plurality of cameras of the third camera type spans 360° in yaw relative to the vehicle, wherein the first field of view spans fewer angles in yaw relative to the vehicle than the third field of view, and wherein the third field of view spans fewer angles in yaw relative to the vehicle than the second field of view;

identifying, based on the one or more first images, objects located within a first range of distances from the vehicle;

identifying, based on the one or more second images, objects located within a second range of distances from the vehicle;

identifying, based on the one or more third images, objects located within a third range of distances from the vehicle, wherein the third range of distances includes farther distances from the vehicle than are included in the second range of distances, and wherein the first range of distances includes farther distances from the vehicle than are included in the third range of distances; and determining a driving decision for the vehicle based upon the objects located within the first range of distances from the vehicle, the objects located within the second range of distances from the vehicle, or the objects located within the third range of distances from the vehicle.

* * * * *